United States Patent
Okada et al.

(10) Patent No.: US 6,727,954 B1
(45) Date of Patent: Apr. 27, 2004

(54) ELECTRONIC CAMERA AND IMAGE PROCESSING SYSTEM

(75) Inventors: Hiroyuki Okada, Izumi (JP); Masayuki Ueyama, Takarazuka (JP); Minoru Kuwana, Osaka (JP); Shinya Matsuda, Kyoto (JP); Tetsuro Kanbara, Takaishi (JP); Takashi Matsuo, Itami (JP); Takashi Kondo, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/372,317

(22) Filed: Aug. 11, 1999

(30) Foreign Application Priority Data

| Aug. 12, 1998 | (JP) | 10-228405 |
| Aug. 12, 1998 | (JP) | 10-228406 |
| Aug. 12, 1998 | (JP) | 10-228407 |
| Aug. 12, 1998 | (JP) | 10-228408 |

(51) Int. Cl.$^7$ .................. H04N 5/225; H04N 5/232; H04N 5/238; G03B 13/00
(52) U.S. Cl. .................. 348/374; 348/340; 348/357; 348/369; 348/373; 348/375; 318/282
(58) Field of Search .................. 348/219.1, 340, 348/357, 369, 373, 374, 375; 318/282

(56) References Cited

U.S. PATENT DOCUMENTS

| 4,225,105 | A | * | 9/1980 | Nakamura | 248/184.1 |
| 4,225,881 | A | * | 9/1980 | Tovi | 348/151 |
| 4,855,823 | A | * | 8/1989 | Struhs et al. | 348/151 |
| 4,866,355 | A | * | 9/1989 | The | 318/282 |
| 4,866,470 | A | * | 9/1989 | Arai et al. | 396/540 |
| 4,920,418 | A | * | 4/1990 | Robinson | 348/219.1 |
| 4,922,275 | A | * | 5/1990 | Hughes | 396/427 |
| 4,970,540 | A | * | 11/1990 | Vasey et al. | 396/55 |
| 5,159,368 | A | * | 10/1992 | Zemlin | 396/427 |
| 5,170,255 | A | * | 12/1992 | Yamada et al. | 348/208.11 |
| 5,282,043 | A | * | 1/1994 | Cochard et al. | 348/219.1 |
| 5,289,090 | A | * | 2/1994 | Miller et al. | 318/282 |
| 5,289,091 | A | * | 2/1994 | Wada | 318/282 |
| 5,561,460 | A | * | 10/1996 | Katoh et al. | 348/219.1 |
| 5,612,732 | A | * | 3/1997 | Yuyama et al. | 348/14.01 |
| 5,801,771 | A | * | 9/1998 | Ohwaki et al. | 348/211.7 |
| 5,808,670 | A | * | 9/1998 | Oyashiki et al. | 348/143 |
| 5,808,679 | A | * | 9/1998 | Shih | 348/335 |
| 5,838,368 | A | * | 11/1998 | Masunaga et al. | 348/211.9 |
| 5,877,806 | A | * | 3/1999 | Kawano | 348/219.1 |
| 5,907,730 | A | * | 5/1999 | Tseng et al. | 396/428 |
| 5,929,904 | A | * | 7/1999 | Uchida | 348/211.7 |
| 5,930,544 | A | * | 7/1999 | Tseng et al. | 396/529 |
| 5,969,757 | A | * | 10/1999 | Okada et al. | 348/219.1 |
| 6,018,363 | A | * | 1/2000 | Horii | 348/219.1 |
| 6,072,529 | A | * | 6/2000 | Mutze | 348/351 |
| 6,278,480 | B1 | * | 8/2001 | Kurahashi et al. | 348/59 |
| 6,445,417 | B1 | * | 9/2002 | Yoshida et al. | 348/374 |
| 6,473,121 | B1 | * | 10/2002 | Shimada | 349/219.1 |
| 6,577,339 | B1 | * | 6/2003 | Thompson et al. | 348/211.14 |

FOREIGN PATENT DOCUMENTS

| JP | 02305075 A | * | 12/1990 | H04N/5/225 |
| JP | 05284502 A | * | 10/1993 | H04N/7/18 |
| JP | 06141246 | | 5/1994 | |

* cited by examiner

*Primary Examiner*—Andrew Christensen
*Assistant Examiner*—Brian Genco
(74) *Attorney, Agent, or Firm*—Sidley Austin Brown & Wood LLP

(57) ABSTRACT

An electronic camera is provided with an image pickup unit in a casing at a position opposite to an opening of the casing. The image pickup unit includes an image pickup device and an optical system. The electronic camera is further provided with a rotating mechanism for rotating the image pickup unit, a changer for changing over a photographing possible state and a photographing impossible state, and a controller for controlling the rotating mechanism to rotate the image pickup unit into a target position in response to the changer.

6 Claims, 39 Drawing Sheets

FIG. 31

- INFORMATION CONCERNING PHOTOGRAPHING MODE
- PHOTOGRAPHING DATE
- IMAGE TITLE
- EXPOSURE TIME SS

:
  :

~AR1

- IMAGE DATA OF PHOTOGRAPHED IMAGE (THUMBNAIL IMAGE)
- JPEG COMPRESSED IMAGE DATA

~AR2

ELECTRONIC CAMERA AND IMAGE PROCESSING SYSTEM

This application is based on patent application Nos. 10-228405, 10-228406, 10-228407, and 10-228408 filed in Japan, the contents of which are hereby incorporated by references.

BACKGROUND OF THE INVENTION

This invention relates to an electronic camera for picking up an object image by an image pickup device by converting it into an image signal, and an image processing system for processing image signals.

Conventionally, in the field of electronic cameras, there have been proposed electronic cameras which generate partial images for a whole object. Specifically, an object image is divided into a plurality of sections which are in turn enlarged each section. These enlarged partial images are combined in such a manner as to adhere them together in order to enhance the effective resolution of image pickup devices such as CCD (charge coupled device). Generally, such cameras have a photographing mode in which normal photographing is performed (hereinafter, "normal photographing mode") and the one in which a photographing image having a higher resolution than the image obtained by the normal photographing mode can be obtained (hereinafter, "high-resolution photographing mode"). When the high-resolution photographing mode is set, partial images for a whole object are generated.

In one of such known electronic cameras, an image pickup unit having a zoom lens is so provided in a camera main body as to be rotatable along horizontal and vertical planes, and an object image is picked up by being divided into a plurality of partial images by changing the direction of the optical axis of the image pickup unit, and being optically enlarged by changing the zooming ratio of the zoom lens.

The above known electronic cameras are constructed such that the partial images of the object are picked up by automatically changing the direction of the optical axis of the image pickup unit in the high-resolution photographing mode, and the optical axis of the image pickup unit is fixed to front direction in the normal photographing mode to perform substantially the same photographing as usual cameras. Accordingly, a photographer cannot perform photographing by orienting the optical axis of the image pickup unit in a desired direction in the normal photographing mode.

However, if the photographer were, for example, allowed to freely set the direction of the optical axis of the image pickup unit as he can freely set the zooming ratio of the zoom lens, it would be convenient since the photographing method and operability in the normal photographing mode can take a wider variety. This further enables an effective use of the optical axis changing function of the image pickup unit.

If, however, the photographer were simply enabled to freely set the direction of the optical axis of the image pickup unit, it might reduce operability on the contrary since the photographer has to orient the direction of the optical axis of the image pickup in the front direction of the camera unit every time normal photographing is performed. Accordingly, it is preferable to provide such a mechanism as reset the image pickup unit to a specified reference position (e.g., position where the optical axis is oriented in the front direction of the camera). In such a case, a reset button may be provided and the image pickup unit may be reset to its reference position by operating this reset button. This, however, results in a problem of increasing the number of operable members of the camera main body. Thus, it is more preferable to automatically reset the image pickup unit to its reference position in link with the occurrence of a specific photographing event such as the activation of the camera by a power switch or the end of the photographing in response to an instruction for exposure.

Further, if the photographer were allowed to freely set the direction of the optical axis of the image pickup unit, the power switch might be turned off with the optical axis of the image pickup unit still oriented in a desired direction and the camera might be stored in a camera case in such a state. In view of lens protection of the image pickup unit while the camera is stored, it is preferable to provide a protection cover for an exposed portion of the lens of the image pickup unit.

According to known lens protection methods for cameras, a protection cap is mounted on the leading end of the lens, the lens is made retractable into the camera main body, or a barrier or a slide cover is provided at the opening in the front surface of the camera main body. The protection method by the protection cap is difficult to employ since the lens cannot be protected once the protection cap is lost. The protection method by the barrier or slide cover makes the opening construction of the front surface of the camera main body complicated and makes it necessary to provide a driving member for the barrier or slide cover near the image pickup unit in addition to a driving member for the image pickup unit. This contradicts an attempt to make the camera smaller and less expensive.

In the known electronic cameras, a whole image is picked up when partial images are picked up. Combination of partial images into a whole image is performed on a separate image processor such as a personal computer. In conventional image processing, relative positions of partial images are determined based on image data in boundary portions of adjoining partial images. This combination manner is likely to fail to produce a whole image having a rectangular shape. Accordingly, it is necessary to calculate a joining region of each partial image for combination, which consequently makes the combination operation complicated. If adjoining partial images do not have consistent image data in their respective boundary portions, further, accurate combination of the partial images cannot be accomplished because their relative combination positions cannot be calculated. Furthermore, a whole image which partial images are combined into is produced on a separate image processor, and thus not displayed on a display device provided on the electronic camera. Accordingly, the photographer cannot confirm or check an expected whole image on the electronic camera.

There have been proposed electronic cameras provided with the function of bracket-photographing of photographing a fixed number of images continuously each time a release button is pressed. However, the bracket-photographing has not been fully performed because of complicated operations and unnecessary consumption of memory area. Accordingly, the photographers have strongly demanded easier operation and efficient memory use for the bracket-photographing.

SUMMARY OF THE INVENTION

It is an object of the present invention to provide an electronic camera and image processing system which have overcome the problems residing in the prior art.

According to an aspect of the present invention, an electronic camera is provided with an image pickup unit in a casing at a position opposite to an opening formed in the casing. The image pickup unit includes an image pickup device for converting an optical image of an object into an image signal, and an optical system for introducing the optical image onto the image pickup device. The electronic camera is further provided with a rotating mechanism for rotating the image pickup unit, a changer for changing over a photographing possible state and a photographing impossible state, and a controller for controlling the rotating mechanism to rotate the image pickup unit into a target position in response to the changer.

According to another aspect of the present invention, an electronic camera is provided with an image pickup unit for executing a continuous photographing of picking up a whole image of an object and a specified number of partial images of the object continuously, a memory for storing picked up images, and a photography controller for controlling the image pickup unit to execute the continuous photographing, and send picked up whole image and partial images to the memory together with information concerning a relationship between the picked up whole image and the picked up partial images.

According to still another aspect of the present invention, an electronic camera is provided with an image pickup unit for executing a bracket-photographing of picking up a specified number of images continuously, a first memory for storing the specified number of images picked up in the bracket-photographing, a display device for displaying an image stored in the first memory, a selector for enabling a user to select a desired image among the specified number of images stored in the first memory based on displayed images on the display device, and a second memory for storing a selected image.

According to yet another aspect of the present invention, an image processing system comprises a memory for storing a whole image of an object and partial images of the object, an area calculator for adjusting the size of each of the whole image and the partial images, and calculates areas of the whole image that match with partial images, respectively, and an image combining device for combining partial images with one another in accordance with calculated areas.

These and other objects, features and advantages of the present invention will become more apparent upon a reading of the following detailed description and accompanying drawings.

BRIEF DESCRIPTION OF THE DRAWINGS

FIG. 31 is a diagram showing a configuration of an image file;

DETAILED DESCRIPTION OF THE PREFERRED EMBODIMENTS OF THE INVENTION

Figure 1:
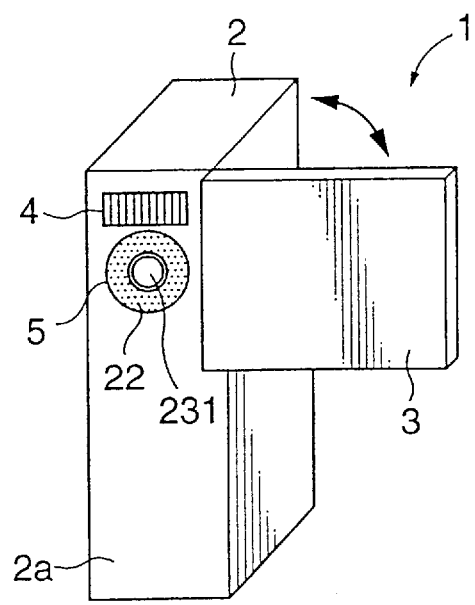
FIG. 1 is a perspective view showing an external configuration of an electronic camera according to an embodiment of the invention, when viewed from front.
Figure 2:
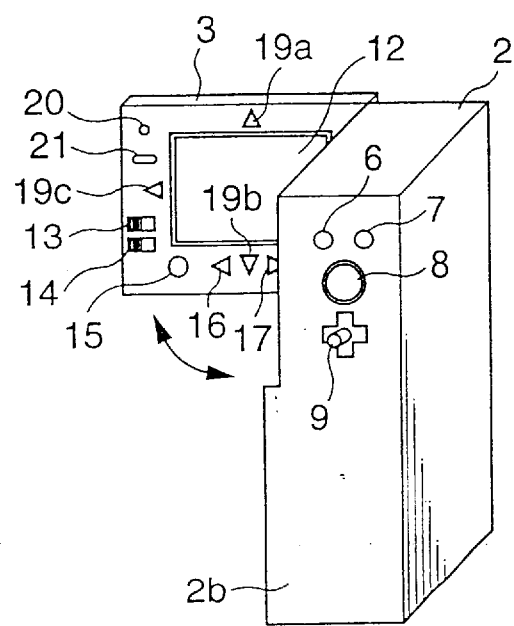
FIG. 2 is a perspective view showing an external configuration of the electronic camera, when viewed from behind.
Figure 3:
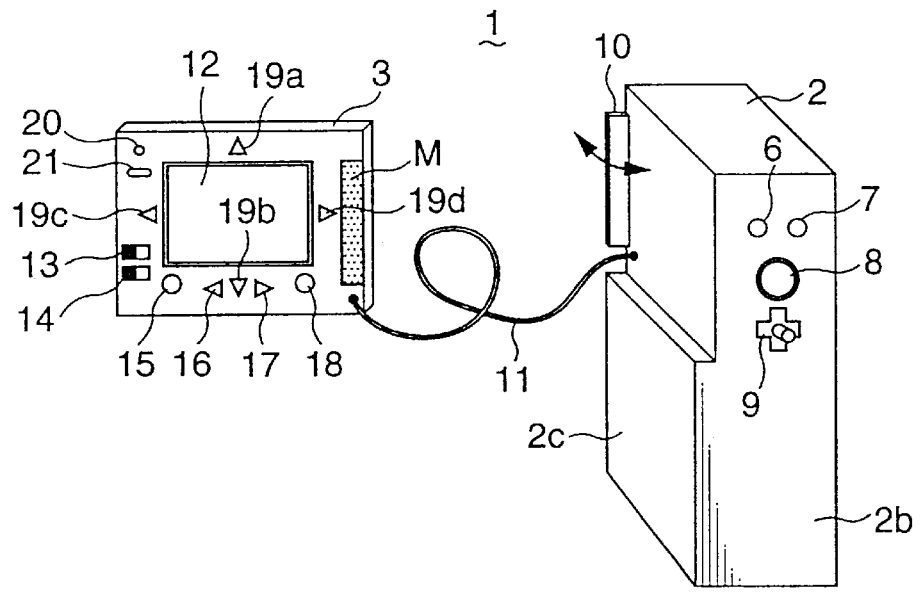
FIG. 3 is a perspective view showing the state of the electronic camera that a display device is detached from a camera main body.

An electronic camera embodying the invention will be described with reference to FIGS. 1 to 4. An electronic camera 1 is provided with an image pickup unit 22. The image pickup unit 22 is integrally comprised of a taking lens including a zoom lens and an image pickup device including a Charge Coupled Device or CCD. The image pickup unit 22 is so supported as to be rotatable in any direction with respect to a front direction of a main body 2 of the camera, i.e., a direction normal to a front surface 2a of the camera main body 2. By controlling the position of the image pickup unit 2, i.e., direction of its optical axis, an object can be photographed in a desired direction within a specified angle range with respect to the front direction.

Further, this camera 1 has a photographing mode in which normal photographing is performed (hereinafter, "normal photographing mode") and the one in which a photographing image having a higher resolution than the image obtained by the normal photographing mode can be obtained (hereinafter, "high-resolution photographing mode")

In the normal photographing mode, one frame of photographed image is stored in a flash memory as a storage medium in one exposure. In this embodiment, a specified number (e.g., 3 times) of exposure controls are performed at specified intervals (e.g., at intervals of 0.1 seconds) in one exposure as described later, i.e., a plurality of images are continuously picked up. A predetermined one (e.g., the first one) of these picked images is automatically stored in the flash memory. A photographer is also enabled to designate his desired image (e.g., second image) in order to replace the automatically stored image by it or additionally store it in the flash memory.

The aforementioned photographing control in the normal photographing mode is similar to a bracket-photographing function of a silver halide camera. This embodiment differs from the silver halide camera in that bracket-photographing is performed when the photographer sets a corresponding mode in the silver halide camera, whereas it is constantly performed in the normal photographing mode in this embodiment. Accordingly, bracket-photographing in the normal photographing mode is referred to as "automatic bracket-photographing" in order to distinguish it from bracket-photographing in the silver halide camera in the description below.

Figure 5:
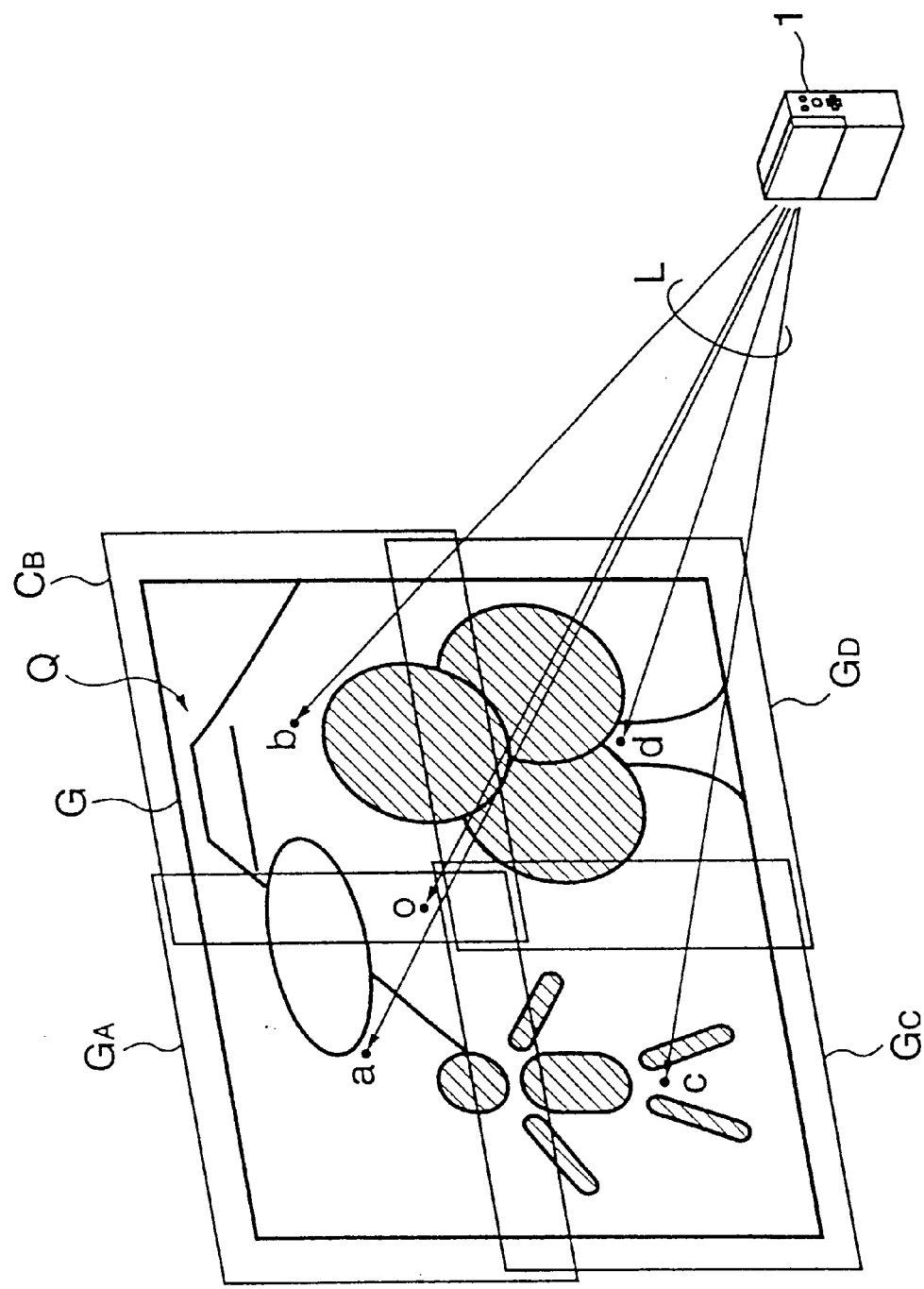
FIG. 5 is a diagram showing a relationship between an object and a photographing range in a high-resolution photographing mode.

In the high-resolution photographing mode, a whole image G of an object Q and partial images $G_A$, $G_B$, $G_C$, $G_D$ substantially corresponding to the four sections of the object Q are picked up as shown in FIG. 5, and a whole object image having a higher resolution than the whole image G can be generated by adhering and combining the four partial images $G_A$, $G_B$, $G_C$, $G_D$ together based on the whole image G. Specifically, in the high-resolution photographing mode, the whole image G of the object Q is picked up by one exposure in which the direction of the optical axis of the image pickup unit 22 is oriented in front direction (direction o in FIG. 5), and the partial images $G_A$, $G_B$, $G_C$, $G_D$ are picked up by performing an image pickup operation four times while automatically changing the direction of the optical axis of the image pickup unit 22 to specified directions (directions a, b, c, d in FIG. 5) and the magnification thereof to a specified value (about 1.8 to 1.9 times).

Although the object Q is divided into four sections in this embodiment, the number of sections is not limited to four, but may be any suitable number. Further, in this embodiment, in order to alleviate a burden of image processing, the electronic camera 1 only picks up the partial images $G_A$, $G_B$, $G_C$, $G_D$ of the object Q, which are then combined together by an image processing system such as a computer.

Referring back to FIG. 1, the electronic camera 1 has a vertically long box-shape, and one side surface 2a of the camera main body 2 having a narrower width serves as the front surface of the camera main body 2, and the other side surface 2b thereof serves as the rear surface of the camera main body 2. In an upper part of one side surface 2c at the left side when viewed from behind the camera 1, a display device 3 formed by an LCD (liquid crystal display) and having a display screen (hereinafter, "LCD device 3") is provided openably and closably, and detachably with respect to the camera main body (see FIGS. 2 and 3). Specifically, a mount plate 10 made of a magnetic material such as iron or nickel is openably and closably mounted on the front end of the upper part of the side surface 2c by an unillustrated hinge mechanism, whereas a strong magnet M is embedded at the right end of a display surface of the LCD device 3. The LCD device 3 is detachably mounted on the mount plate 10 by the attraction of this magnet M.

The camera main body 2 and the LCD device 3 are electrically connected via a cable 11 which can be accommodated in the camera main body 2 by an unillustrated take-up mechanism. Power and display image data are sent from the camera main body 2 to the LCD device 3 via this cable 11, and signals corresponding to the operation of a variety of switches provided in the LCD device 3 to be described later are sent from the LCD device 3 to the camera main body 2 via the cable 11. In other words, photographing can be remote-controlled by detaching the LCD device 3 from the camera main body 2.

Figure 4:
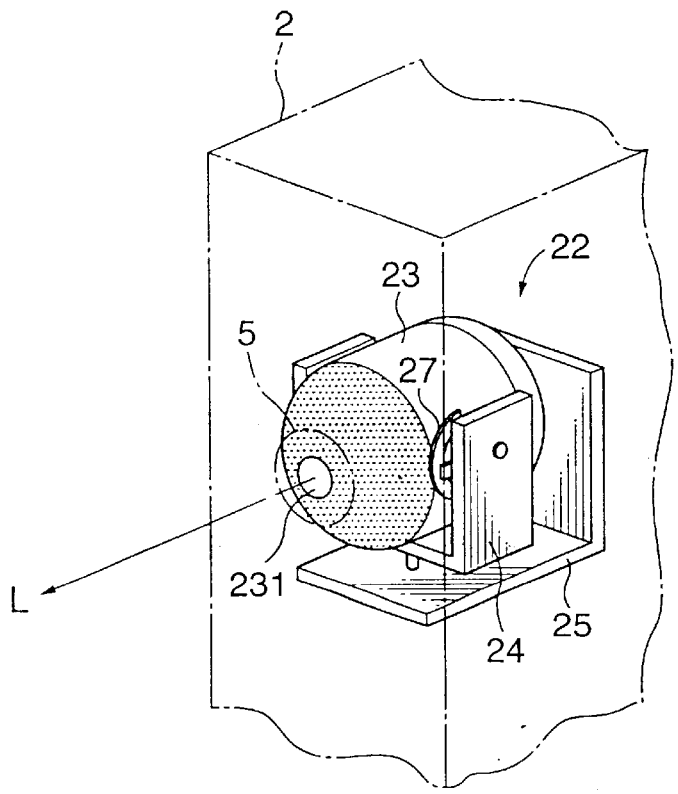
FIG. 4 is an perspective view showing an image pickup unit arranged in the camera main body.

A flash device 4 is provided in a specified position at the top of the front surface 2a of the camera main body 2. Also, an opening 5 is formed in a casing of the camera main body 2 to expose a taking lens 231 of the image pickup unit 22 provided below the flash device 4. The image pickup unit 22 is provided such that the direction of its optical axis L can be changed to a position facing the opening 5 inside the camera main body 2 as shown in FIG. 4. The construction of the image pickup unit 22 is described later.

A pair of operation buttons 6, 7 (hereinafter, "zooming buttons 6, 7") for changing a focal length of the taking lens 231 are provided side by side in specified positions at the top of the rear surface 2b of the camera main body 2, and a release button 8 for instructing the photographing operation is provided therebelow. Further, an operation lever 9 for manually adjusting or designating the direction of the optical axis of the image pickup unit 22 (hereinafter, "optical axis changing lever 9") is provided below the release button 8. The optical axis changing lever 9 is a multi-functional lever also used to change an image displayed on the LCD device 3 among of a plurality of images photographed in the automatic bracket-photographing as described later and to change a reproduced frame to be displayed on the LCD device 3 in reproduction mode.

The flash device 4 is comprised of a xenon discharge tube and automatically emits flashes of light at the time of low brightness. The opening 5 specifies a range within which the taking lens 231 of the image pickup unit 22 can be exposed (i.e., a changeable range of the direction of the optical axis where photographing can be performed). In this embodiment, the direction of the optical axis of the taking lens 231 is changeable in a range of ±20° with respect to the front direction in horizontal and vertical planes. Accordingly, the rotation of the image pickup unit 22 is controlled within a range in which the taking lens 231 can be exposed through the opening 5 in a photographing possible state. On the other hand, in a photographing impossible state, the image pickup unit 22 is rotated to a specified position where the taking lens 231 is not exposed through the opening 5 (e.g., specified position where the direction of the optical axis of the taking lens 231 extends obliquely downward) so as to close the opening 5 by a main body 23 of the image pickup unit 22.

The zooming button 6 is an operable member for changing the focal length of the taking lens 231 toward a telephoto limit, whereas the zooming button 7 is the one for changing it toward a wide-angle limit. When the zooming button 6 or 7 continues to be operated, the focal length of the taking lens 231 is continuously changed in a corresponding direction at a specified changing rate. When the zoom button 6 or 7 is released, the focal length of the taking lens 231 is set at the one attained at this stage.

The operation of the release button 8 is detected by switches S1, S2 to be described later. The switch S1 is turned on when the release button 8 is pressed halfway, thereby performing photographing preparation (preparation of focusing and setting of exposure control values). The switch S2 is turned on when the release button 8 is fully pressed, thereby performing an exposure control at the set exposure control values. Since the automatic bracket-photographing is performed in the normal photographing mode as described above, the exposure control is repeated by a specified number of times at specified intervals set in advance. Further, in the high-resolution photographing mode, the exposure control is performed by a specified number of times by automatically changing the direction of the optical axis and magnification of the taking lens 231.

The optical axis changing lever 9 is inclinable in four directions: upward, downward, leftward and rightward, and the direction of the optical axis of the image pickup unit 22 can be changed or designated to a direction corresponding to the inclination of the lever 9. For example, if the lever 9 is inclined upward, the image pickup unit 22 is rotated in a direction of elevation angle at a specified rate until the lever 9 is released. If the lever 9 is inclined downward, the image pickup unit 22 is rotated in a direction of depression angle at a specified rate until the lever 9 is released. When the direction of the optical axis of the image pickup unit 22 is changed beyond its permissible range (±20° with respect to the front direction), the rotation thereof is automatically stopped at the timing when it reaches a limit position of the permissible range.

An LCD panel 12 is provided in the middle of the rear surface of the LCD device 3. A record/reproduction mode switch 13, a photographing mode switch 14, a bracket-photographing confirmation button 15, zooming buttons 16, 17, a release button 8, optical axis changing buttons 19a to 19d, a delete button 20 and a main switch 21 are provided around the LCD panel 12 so that the photographer can remote-control the photographing operation while viewing a live-view image displayed on the LCD panel 12. Similar to the optical axis changing lever 9, the optical axis changing buttons 19a to 19d are multi-functional buttons.

The record/reproduction mode switch 13 is provided in a lower position at the left margin of the LCD device 3 for switchingly setting a record mode in which photographing is performed and a reproduction mode in which images recorded in the flash memory are reproduced and displayed on the LCD panel 12. The switch 13 is formed of a two-contact slide switch. For example, the record mode is set when a grip of the switch 13 is slid to the left, whereas the reproduction mode is set when it is slid to the right.

The photographing mode switch 14 is provided below the switch 13 for switchingly setting the normal photographing mode and the high-resolution photographing mode described above. Similar to the switch 13, the switch 14 is also formed of a two-contact slide switch. For example, the normal photographing mode is set when a grip of the switch 14 is slid to the left, whereas the high-resolution photographing mode is set when it is slid to the right.

The bracket-photographing confirmation button 15 is provided in a bottom end position of the left margin of the LCD device 3 for setting and canceling a mode in which a content of an image photographed by the automatic bracket-photographing in the normal photographing mode is confirmed and the recorded image is changed (hereinafter, "confirmation mode"). The button 15 is also a multi-functional button which functions as an operation button for designating a change of attributes of the recorded image photographed in the high-resolution photographing mode when the reproduction mode is set. In order to identify the plurality of partial images $G_A$, $G_B$, $G_C$, $G_D$ of the object Q photographed in the high-resolution photographing mode as those adhered and combined together to generate a whole object image, an information concerning the photographing mode is stored as an attribute data in the flash memory. To change the attributes of the image photographed in the high-resolution photographing mode is to change the content of the information concerning the photographing mode so that the respective partial images $G_A$, $G_B$, $G_C$, $G_D$ can be equivalently treated as images photographed in the normal photographing mode.

The bracket-photographing confirmation button 15 is formed of a push switch. If the button 15 is pushed immediately after the photographing is completed in the record mode, the confirmation mode is alternately set and canceled thereafter every time the button 15 is pushed. Further, if the button 15 is pushed immediately after the photographing is completed in the reproduction mode, an image file corresponding to the image photographed in the high-resolution photographing mode and being displayed on the LCD device 3 is changed to the one of the image photographed in the normal photographing mode thereafter every time the button 15 is pushed.

The zooming buttons 16, 17 are operation buttons which are provided in the middle of the bottom margin of the LCD device 13 and have the same functions as the zooming buttons 6, 7 provided on the camera main body 2. The release button 18 is an operation button which is provided in a right end position at the bottom margin of the LCD device 3 and has the same function as the release button 8 provided on the camera main body 2.

The optical axis changing buttons 19a to 19d are operation buttons which are provided substantially in the middle of the top, bottom, left and right margins of the LCD device 3, respectively and have the same functions as the optical axis changing lever 9 provided on the camera main body 2. The operation of the respective buttons 19a to 19d corresponds to the inclination of the lever 9 to the above, to the below, to the left and to the right. For example, if the button 19a is pushed in the record mode, the image pickup unit 22 is rotated in the direction of elevation angle at a specified rate until being released. If the button 19b is pushed, the image pickup unit 22 is rotated in the direction of depression angle at the specified rate until being released. The buttons 19a to 19d are similar to the optical axis changing lever 9 in that the direction of the optical axis of the image pickup unit 22 is manually changed within the permissible range (±20° with respect to the front direction).

The delete button 20 is an operation button which is provided in a top end position of the left margin of the LCD device 3 and used to designate the deletion of the image recorded in the flash memory. The main switch 21 is provided below the delete button 20 for starting and stopping a power supply.

Figure 6:
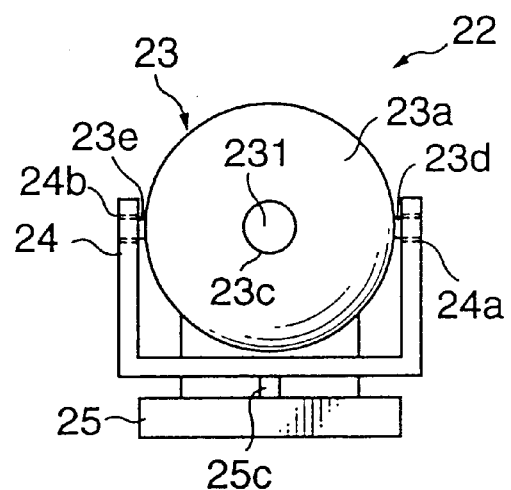
FIG. 6 is a front view of the image pickup unit.
Figure 7:
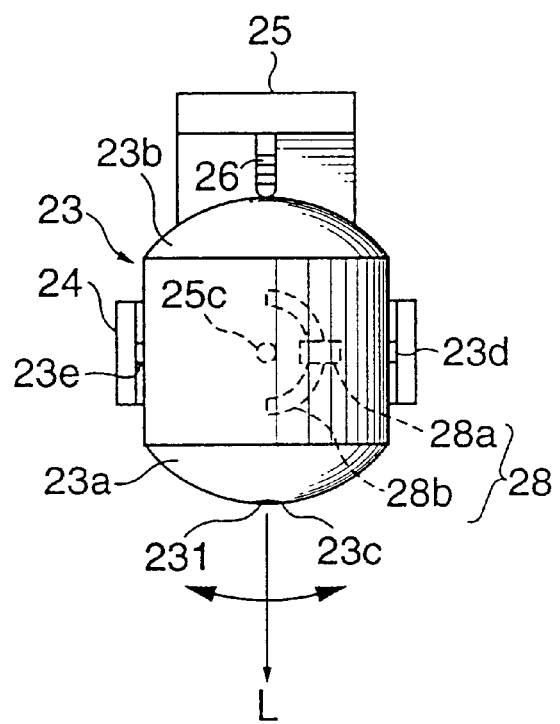
FIG. 7 is a plan view of the image pickup unit.
Figure 8:
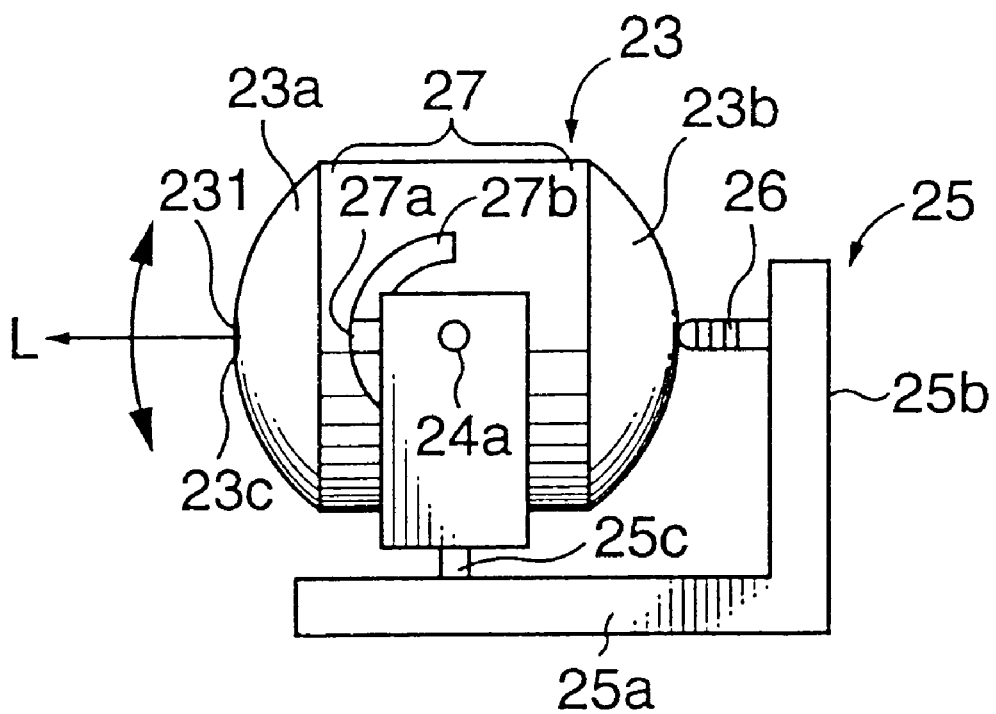
FIG. 8 is a right side view of the image pickup unit.

FIGS. 6, 7, and 8 are a front view, a plan view and a right side view of the image pickup unit 22.

The image pickup unit 22 includes the unit main body 23, a U-shaped first support frame 24 for pivotally supporting the unit main body 23 along vertical direction, an L-shaped second support frame 25 for pivotally supporting the unit main body 23 along horizontal direction, a driving member 26 for rotating the unit main body 23 upward, downward, leftward and rightward, and position detecting members 27, 28 for detecting the rotational position of the unit main body 23.

The unit main body 23 has a capsule-like shape in which the opposite ends of a cylinder are covered by semispherical surfaces, and a round window 23c for exposing the taking lens 231 is formed in the middle of one semispherical surface. The taking lens 231 is so arranged on a center longitudinal axis as to face the window 23c inside the unit main body 23, and an image pickup device having an unillustrated CCD or like image pickup device is arranged behind the taking lens 231.

Figure 9:
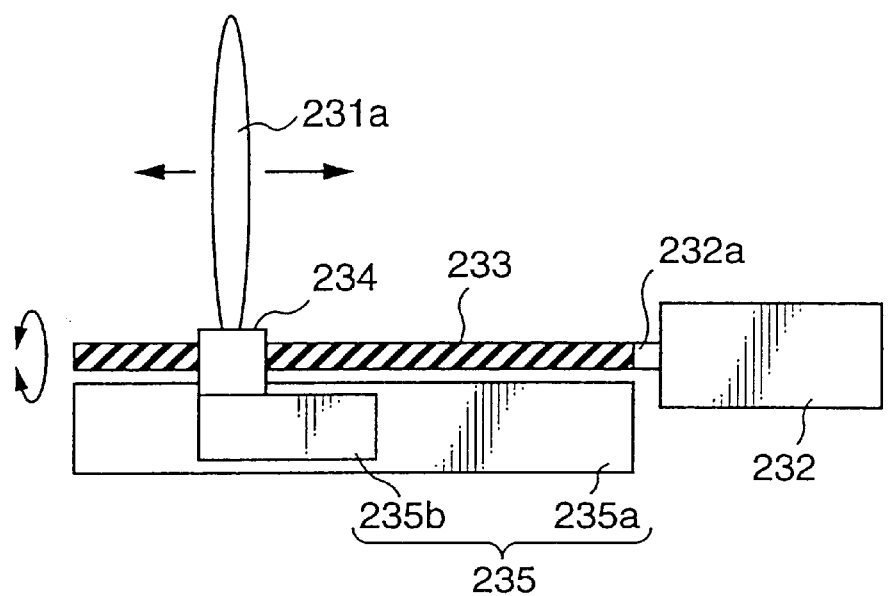
FIG. 9 is a diagram showing a mechanism for detecting a focal length of a taking lens.

The taking lens 231 is comprised of a zoom lens whose focal length is changeable within a range of, e.g., 5 mm to 15 mm. The taking lens 231 includes a lens 231a movable along the optical axis for changing the focal length as shown in FIG. 9, and the focal length is controlled by controlling the position of the lens 231a. This focusing lens 231a is secured to a nut member 234 screwed onto a bar-shaped screwed member 233 directly coupled with a rotor 232a of an electric motor 232 (hereinafter, "zoom motor 232"). When the zoom motor 232 is driven, the screw member 233 is rotated, thereby causing the nut member 234 to make a linear movement along the extension of the screw member 233. As a result, the lens 231a is moved forward and backward along the optical axis.

There is also provided an encoder 235 for detecting the position of the lens 231a being linearly moved by the zoom motor 232. The encoder 235 is comprised of a code plate 235a provided below the screw member 233 and a brush 235b secured to the nut member 234 and including a plurality of contact pieces having their leading ends held in pressing contact with the code plate 235a. When the lens 231a makes a linear movement by being driven by the zoom motor 232, the brush 235b slides over the code plate 235a, and a code signal (e.g., 4-bit signal) representing the position of the lens 231a is outputted from the brush 235b. The position of the lens 231 (i.e., focal length corresponding to this position) is detected by decoding this signal. It should be noted that the focal length can be detected every 1 mm in the range of 5 mm to 15 mm.

In addition to the CCD, the image pickup device includes a signal processing circuit for applying a specified analog signal processing to an image signal (analog signal) outputted from the CCD. This signal processing circuit includes a CDS circuit (correlative double sampling circuit) for reducing a sampling noise of the image signal and an AGC circuit (automatic gain adjusting circuit) for amplifying the image signal.

Pins 23d, 23e project substantially in the middle of the opposite side surfaces of the cylinder portion of the unit main body 23. The unit main body 23 is supported by the first support frame 24 so as to be pivotal in the vertical plane by loosely fitting the pins 23d, 23e into holes 24a, 24b (see FIG. 6) formed in specified positions at the opposite ends of the first support frame 24. Unillustrated holes are formed substantially in the middle of the lower surface of the cylinder portion of the unit main body 23 and substantially in the middle of the first support frame 24. A pin 25c projecting from a specified position of a long side portion 25a of the second support frame 25 is loosely fitted into these holes, so that the unit main body 23 and the first support frame 24 are rotatably supported in the horizontal plane.

Figure 10:
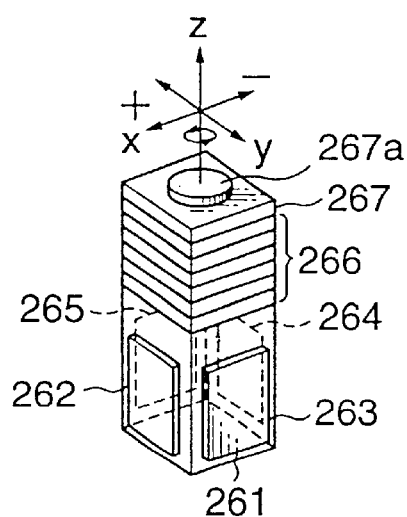
FIG. 10 is a perspective view showing a construction of a driving member for driving the image pickup unit.

Further, the driving member 26 projects from a specified upper position of a short side portion 25b of the second support frame 25, and the leading end thereof is in contact with the middle of the rear semispherical surface 23b of the unit main body 23. The driving member 26 is, as shown in FIG. 10, such that piezoelectric devices 262 to 265 such as PZTs are adhered to four side surfaces of an elastic member 261 in the form of a square column and a laminated piezoelectric device 266 and a contact piece 267 are adhered to the upper end surface of the elastic member 261. A projection 267a to be brought into contact with the semispherical surface 23b of the unit main body 23 is formed on the contact piece 267.

If orthogonal coordinate systems xyz is set for the driving member 26 as shown in FIG. 10, a pair of piezoelectric devices 262, 264 provided along x-axis are a driving source for vibrating the leading end of the driving member 26 in xz-plane; a pair of piezoelectric devices 263, 265 provided along y-axis are a driving source for vibrating it in yz-plane. More specifically, upon application of sinusoidal voltages, whose phases are mutually inverted, to the piezoelectric devices 262, 264, the piezoelectric device 264 expands while the piezoelectric device 262 contracts, thereby inclining the leading end of the driving member 26 in (+)x-direction. Conversely, when the piezoelectric device 264 contracts while the piezoelectric device 262 expands, the leading end of the driving member 26 is inclined in (−)x-direction. Accordingly, the leading end of the driving member 26 vibrates in xz-plane. Similarly, upon application of sinusoidal voltages, whose phases are mutually inverted, to the piezoelectric devices 263, 265, the leading end of the driving member 26 vibrates in yz-plane by a similar mechanism.

Further, the laminated piezoelectric device 266 is a driving source for expanding the driving member 26 in z-direction. In other words, upon application of a sinusoidal voltage to the piezoelectric device 266, it expands and contracts along its thickness, thereby vibrating the leading end of the driving member 26 along z-axis.

Figure 11:
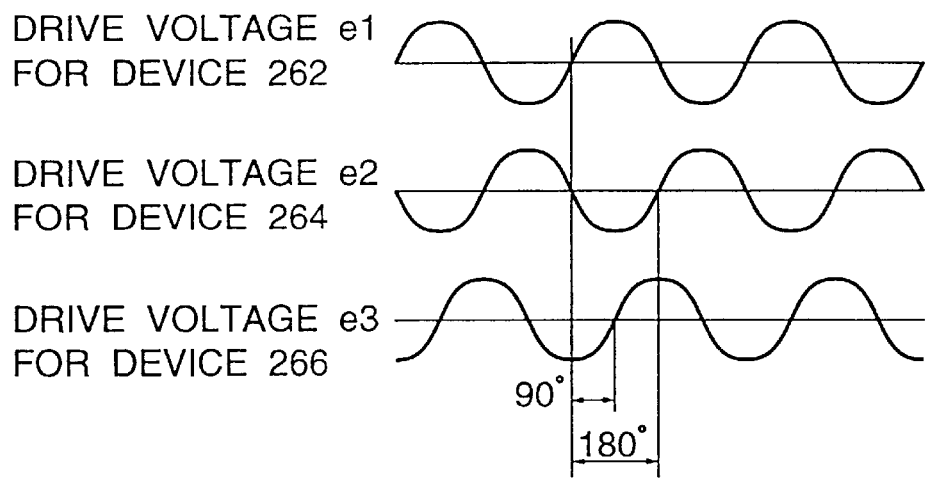
FIG. 11 is a chart showing waveforms of drive voltages to be applied to piezoelectric devices of driving members.

Thus, if sinusoidal voltages e1,e2 whose phases are mutually inverted are applied to the piezoelectric devices 262, 264 and a sinusoidal voltage e3 whose phase is delayed by 90° from the drive voltage e1 applied to the piezoelectric device 262 is applied to the laminated piezoelectric device 266 as shown in FIG. 11, the leading end of the driving member 26 makes such a motion which is a combination of the x-axis vibration and the z-axis expansion/contraction, i.e., makes an elliptical motion in xz-plane (see rotation of arrow in FIG. 10). If sinusoidal voltages whose phases are mutually inverted are applied to the piezoelectric devices 263, 265 and a sinusoidal voltage whose phase is delayed by 90° from the drive voltage applied to the piezoelectric device 263 is applied to the laminated piezoelectric device 266, the leading end of the driving member 26 also makes an elliptical motion in yz-plane by a similar mechanism. If the phase of the drive voltage applied to the laminated piezoelectric device 266 is advanced by 90° with respect to the drive voltage applied to the piezoelectric device 262 or 263, the rotating direction of the elliptical motion in xz- or yz-plane is reversed from the one in the case where the phase is delayed by 90°.

Accordingly, if xz-plane coincides with the horizontal plane, the contact piece 267 of the driving member 26 held in contact with the rear semispherical surface 23b of the unit main body 23 makes an elliptical motion, for example, in counterclockwise direction in the horizontal plane by driving the piezoelectric devices 262, 264 by the sinusoidal voltages e1, e2 whose phases are mutually inverted and driving the laminated piezoelectric device 266 by the sinusoidal voltage e3 whose phase is delayed by 90° from the drive voltage e1 applied to the piezoelectric device 262. This elliptical motion causes the unit main body 23 to rotate clockwise about the pin 25c in the horizontal plane. If the phase of the drive voltage e3 applied to the laminated piezoelectric device 266 is advanced 90° from the drive voltage e1 to the piezoelectric device 262, the contact piece 267 of the driving member 26 makes a clockwise elliptical motion in the horizontal plane. This elliptical motion causes the unit main body 23 to rotate counterclockwise about the pin 25c in the horizontal plane.

On the other hand, the unit main body 23 rotates clockwise (or counterclockwise) about the pins 23d, 23e in the vertical plane by a similar mechanism if the piezoelectric devices 263, 265 are driven by the sinusoidal voltages whose phases are mutually inverted and the laminated piezoelectric device 266 is driven by the sinusoidal voltage whose phase is delayed (or advanced) by 90° from the drive voltage applied to the piezoelectric device 263.

The position detecting member 27 is provided at the right side of the unit main body 23 when viewed from the front, and the position detecting member 28 is provided at the lower side of the unit main body 23 (see FIGS. 7 and 8). The position detecting member 27 detects the rotational position of the unit main body 23 in yz-plane (vertical plane), whereas the position detecting member 28 detects the rotational position in xz-plane (horizontal plane).

Figure 12:
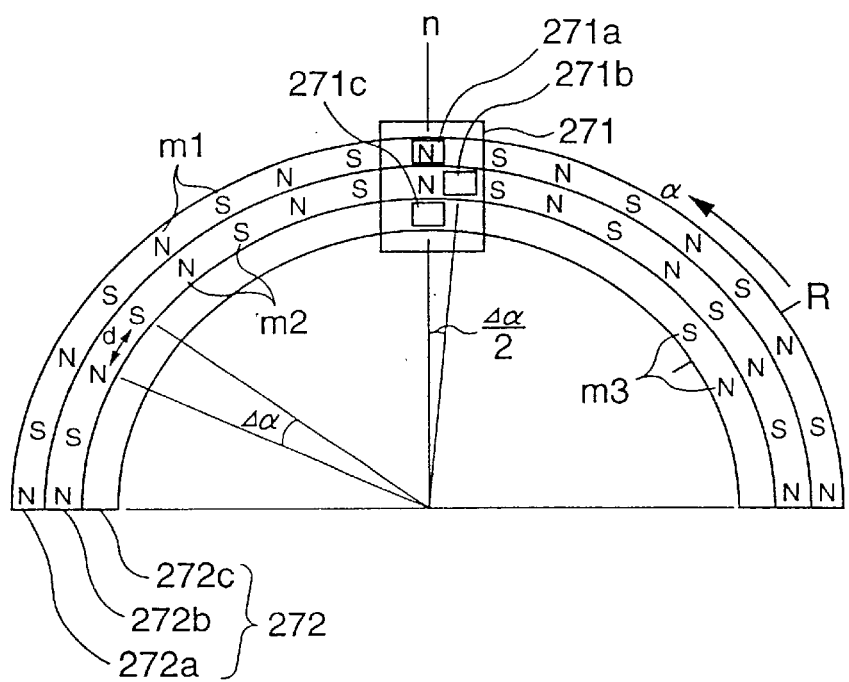
FIG. 12 is a diagram showing a construction of a position detecting member.

The position detecting member 27 is comprised of a magnetic head 271, an arcuate magnetic scale 272 and an unillustrated position detecting circuit as shown in FIG. 12.

The magnetic scale 272 is secured to the right side of the unit main body 23, whereas the magnetic head 271 is mounted in such a position of an end of the first support frame 24 as to face the magnetic scale 272, so that the magnetic head 271 relatively moves on the magnetic scale 272 when the unit main body 23 rotates in the vertical plane. The position detecting circuit is provided in a specified position in the camera main body 2.

The magnetic scale 272 includes three tracks 272a, 272b, 272c. In the outer two tracks 272a, 272b, a plurality of magnetic poles comprised of S-polarity and N-polarity are alternately formed at specified angular intervals $\Delta\alpha$ (e.g., angular position where a distance d between magnetic poles m2 is 200 $\mu$m) such that the adjacent magnetic poles m1, m2 have the same polarities in the two tracks.

A boundary position between adjacent S- and N-polarities of the magnetic pole m1 formed in the track 272a corresponds to a gauge position of the arcuate scale, and a position boundary between adjacent S- and N-polarities of the magnetic pole m2 formed in the track 272b also corresponds to a gauge position of the arcuate scale. The two tracks 272a, 272b corresponding to the same scale are provided to make the rotating direction of the image pickup unit 22 detectable and make an angle of rotation $\alpha$ detectable at intervals of $\Delta\alpha/2$. More specifically, an rotation amount (or angle of rotation $\alpha$) from a reference position R can be detected by detecting the respective boundary positions of the magnetic poles m1 of the track 272a or the respective boundary positions of the magnetic poles m2 of the track 272b. The rotation amount is detected at angular intervals of $\Delta\alpha/2$ by electrically phase-shifting the detection timings of the former boundary positions and those of the latter boundary positions by $\pi/2$.

If the position of the image pickup unit 22 where the optical axis L thereof is oriented in the front direction is referred to as "center position", the reference position R is such a position attained when the image pickup unit 22 is rotated downward by 40° from the center position in the vertical plane.

In the innermost track 272c, a magnetic pole m3 comprised of a pair of S- and N-polarities is formed in a specified position at one end. The magnetic pole m3 is formed in the track 272c to give the reference position R for the scales of the tracks 272a, 272b. Accordingly, the magnetic pole m3 also has the same polarities as the adjacent magnetic poles m2 in the track 272b. The magnetic head 271 include magnetic resistors 271a, 271b, 271c for detecting the magnetic poles formed in the respective tracks 272a, 272b and 272c of the magnetic scale 272. The magnetic resistors 271a, 271c are so arranged as to be in the same rotational position (rotational position n in FIG. 12) on the magnetic scale 272, and the magnetic resistor 271b is arranged in a position shifted clockwise by half the angular interval of $\Delta\alpha$ with respect to the magnetic resistors 271a, 271c. The magnetic resistor 271b is displaced from the magnetic resistor 271a to electrically phase-shift the detection timings of the boundary positions of the magnetic poles m1 of the track 272a and those of the boundary positions of the magnetic poles m2 of the track 272b by $\pi/2$.

Figure 13:
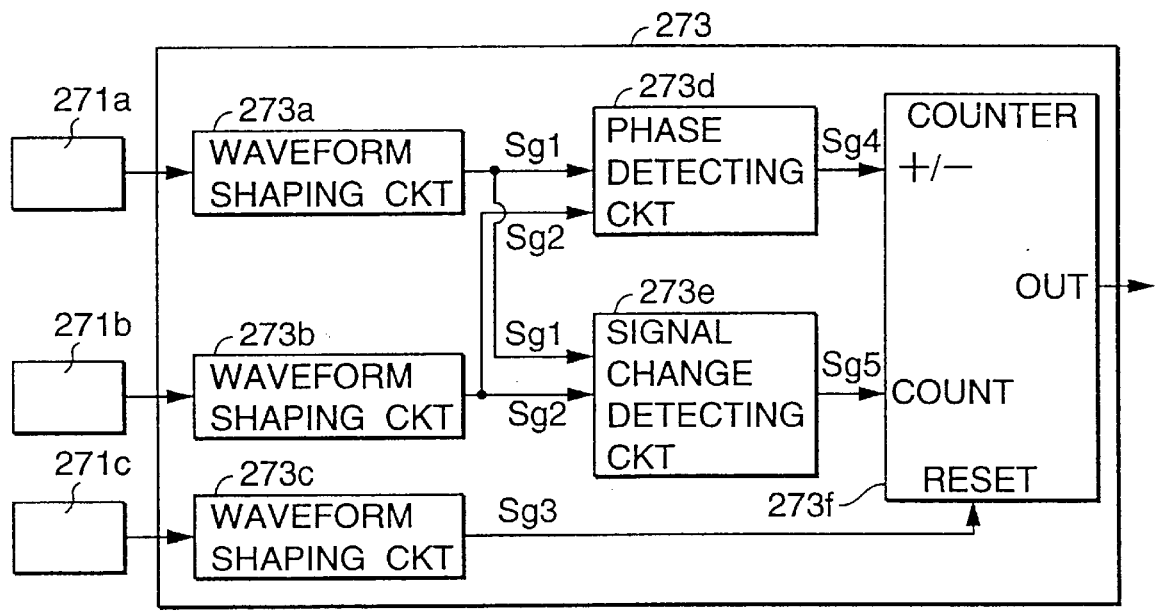
FIG. 13 is a block diagram showing a construction of a position detecting circuit.

FIG. 13 is a block diagram showing a position detecting circuit. A position detecting circuit 273 includes three waveform shaping circuits 273a, 273b, 273c, a phase detecting circuit 273d, a signal change detecting circuit 273e and a counter 273f. To the waveform shaping circuits 273a, 273b, 273c are inputted magnetic pole detection signals from the resistors 271a, 271b, 271c, respectively. Output signals Sg1, Sg2 of the waveform shaping circuits 273a, 273b are both inputted to the phase detecting circuit 273d and the signal change detecting circuit 273e, whereas an output signal Sg3 of the waveform shaping circuit 273c is inputted to a reset terminal of the counter 273f. Further, an output signal Sg4 of the phase detecting circuit 273 is inputted to a (+/−)-terminal of the counter 273f, and an output signal Sg5 of the signal change detecting circuit 273e is inputted to a count terminal of the counter 273f. An angular data (i.e., a data on the rotational angle a from the reference position R in FIG. 12) is outputted from an output terminal of the counter 273f.

When the magnetic head 271 relatively moves on the magnetic scale 272 as the image pickup unit 22 rotates, magnetic fields formed by the magnetic poles m1, m2, m3 on the tracks 272a, 27ab, 272c are detected by the magnetic resistors 271a, 271b, 271c. Since the N- and S-polarities are alternately formed in the magnetic poles m1, m2 of the tracks 272a, 272b, signals which change like a sine wave in specific cycles are outputted from the magnetic resistors 271a, 271b. Further, since the pair of N- and S-polarities are formed in the specified position of the track 272c, the magnetic resistor 271c outputs a signal which changes like a sine wave only in one cycle when it passes the position where the magnetic pole m3 is formed.

The waveform shaping circuits 273a, 372b, 372c shape the signals having a sinusoidal waveform outputted from the magnetic resistors 271a, 271b, 271c into signals having a rectangular waveform. The phase detecting circuit 273d detects a phasic relationship between the output signal Sg1 of the waveform shaping circuit 273a and the output signal Sg2 of the waveform shaping circuit 273b (e.g., whether the phase of the signal Sg1 is delayed or advanced from that of the signal Sg2). The detection signal Sg4 of the phasic relationship indicates a relative moving direction of the magnetic head 271 with respect to the magnetic scale 272 (i.e., the rotating direction of the image pickup unit 22).

The signal change detecting signal 273e detects changes in the output signals Sg1, Sg2 (e.g., change in the detected polarity from S-polarity to N-polarity), and the output signal Sg5 thereof represents a moved amount of the magnetic head 271 with respect to the magnetic scale 272 every 100 μm (or every Δα/2).

Figure 14:
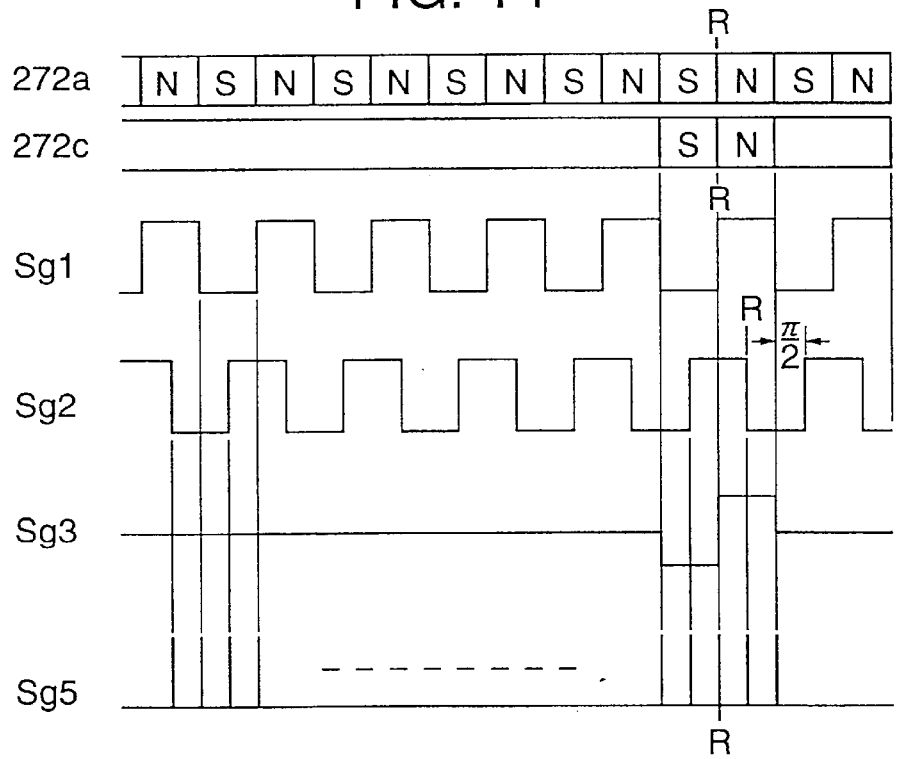
FIG. 14 is a chart showing waveforms of output signals of the position detecting circuit.

Since the detecting positions of the magnetic resistors 271a, 271b are set in the magnetic head 271 such that the phases of the output signals thereof are shifted from each other by 90°, the phase of the output signal Sg1 of the waveform shaping circuit 273a is shifted from that of the output signal Sg2 of the waveform shaping circuit 273b by π/2 as shown in FIG. 14. Depending upon whether the magnetic head 271 moves clockwise or counterclockwise with respect to the magnetic scale 272, the phasic relationship of the signals Sg1, Sg2 is reversed. More specifically, when the magnetic head 271 moves clockwise with respect to the magnetic scale 272, the phase of the signal Sg1 is delayed from that of the signal Sg2 (see the detection timing of the reference position R in FIG. 14) since the magnetic head 271 moves on the magnetic scale 272 from the right to the left in FIG. 14. On the other hand, when the magnetic head 271 moves counterclockwise with respect to the magnetic scale 272 (the magnetic head 271 moves on the magnetic scale 272 from the left to the right in FIG. 14), the phase of the signal Sg1 is advanced from that of the signal Sg2.

Accordingly, the phase detecting circuit 273b outputs a high-level signal, for example, when the phase of the signal Sg1 is advanced from that of the signal Sg2 (when the image pickup unit 22 rotates counterclockwise), while outputting a low-level signal when the phase of the signal Sg1 is delayed from that of the signal Sg2 (when the image pickup unit 22 rotates clockwise). It should be noted that the phase detecting circuit 273d may output high-level and low-level signals in reversed cases.

The signal change detecting circuit 273e detects the rise and fall of the output signals Sg1, Sg2 of the waveform shaping circuits 273a, 273b, and outputs pulse signals upon every detection. Pulse trains representing changes in the signals Sg1, Sg2 correspond the movement of the magnetic head 271 on the magnetic scale 272 every 200 μm. Since the pulse train corresponding to the signal Sg1 and the one corresponding to the signal Sg2 are shifted from each other by π/2, the pulse-train signal Sg5 outputted from the signal change detecting circuit 273e represents detection of the movement of the magnetic head 271 on the magnetic scale 272 every 100 μm (i.e., the rotation of the image pickup unit 22 is detected every angle Δα/2).

Accordingly, the counter 273f counts a pulse number Nm inputted to the count terminal after resetting the count value upon receipt of the signal Sg3 detecting the reference position R from the waveform shaping circuit 273c; multiplies this count value by the angle Δα/2 to calculate the rotational angle α of the image pickup unit 22 from the reference position R; and this angle data is outputted from the output terminal. Further, the rotating direction of the image pickup unit 22 is discriminated based on the level of the signal Sg4 inputted to the (+/−)-terminal, and the rotating direction data is also outputted from the output terminal.

The position detecting member 28 has substantially the same construction as the position detecting member 27 and detects the rotational position of the image pickup unit 22 in the horizontal plane by substantially the same mechanism as above. The reference position R in the position detecting member 28 is a position which the image pickup unit 22 reaches after rotating by 40° to the right from the center position in the horizontal plane.

Figure 15:
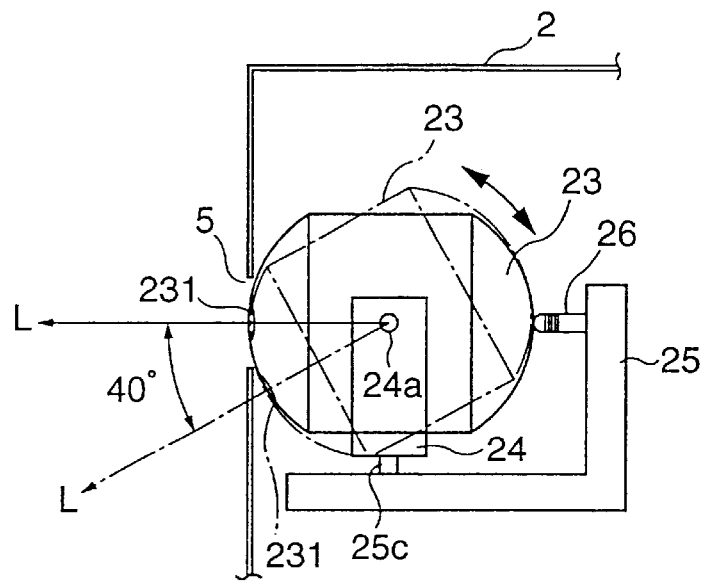
FIG. 15 is a diagram showing a set position of the image pickup unit when a main switch is turned on and off.
Figure 16:
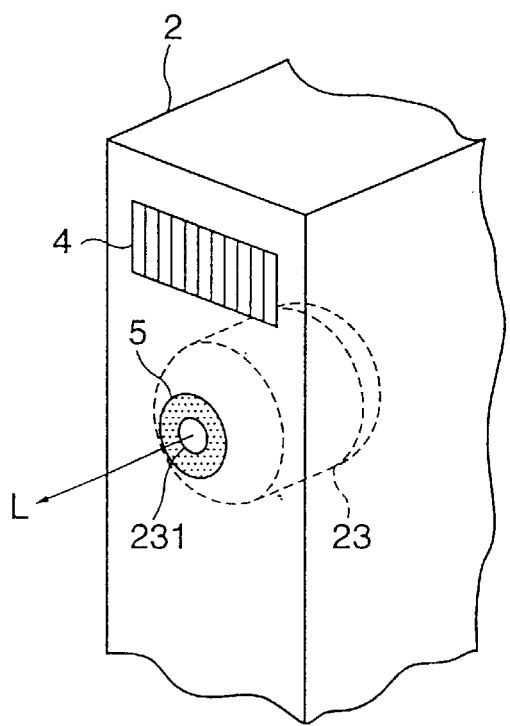
FIG. 16 is a perspective view showing the image pickup unit when set in its center position.

In the above construction, when the main switch 21 is turned on, the record mode is initially set and the image pickup unit 22 is automatically set in the center position (i.e., position where the taking lens 231 is exposed through the opening 5 and the optical axis L thereof is oriented in the front direction) as shown in solid line in FIG. 15 and FIG. 16. In the record mode, a photographer performs photographing after setting the image pickup unit 22 in a desired position within the range of ±20° (corresponding to the aforementioned permissible range) to the above, below, right or left from the center position by operating the optical axis changing lever 9 or the optical axis changing buttons 19a to 19d.

Figure 17:
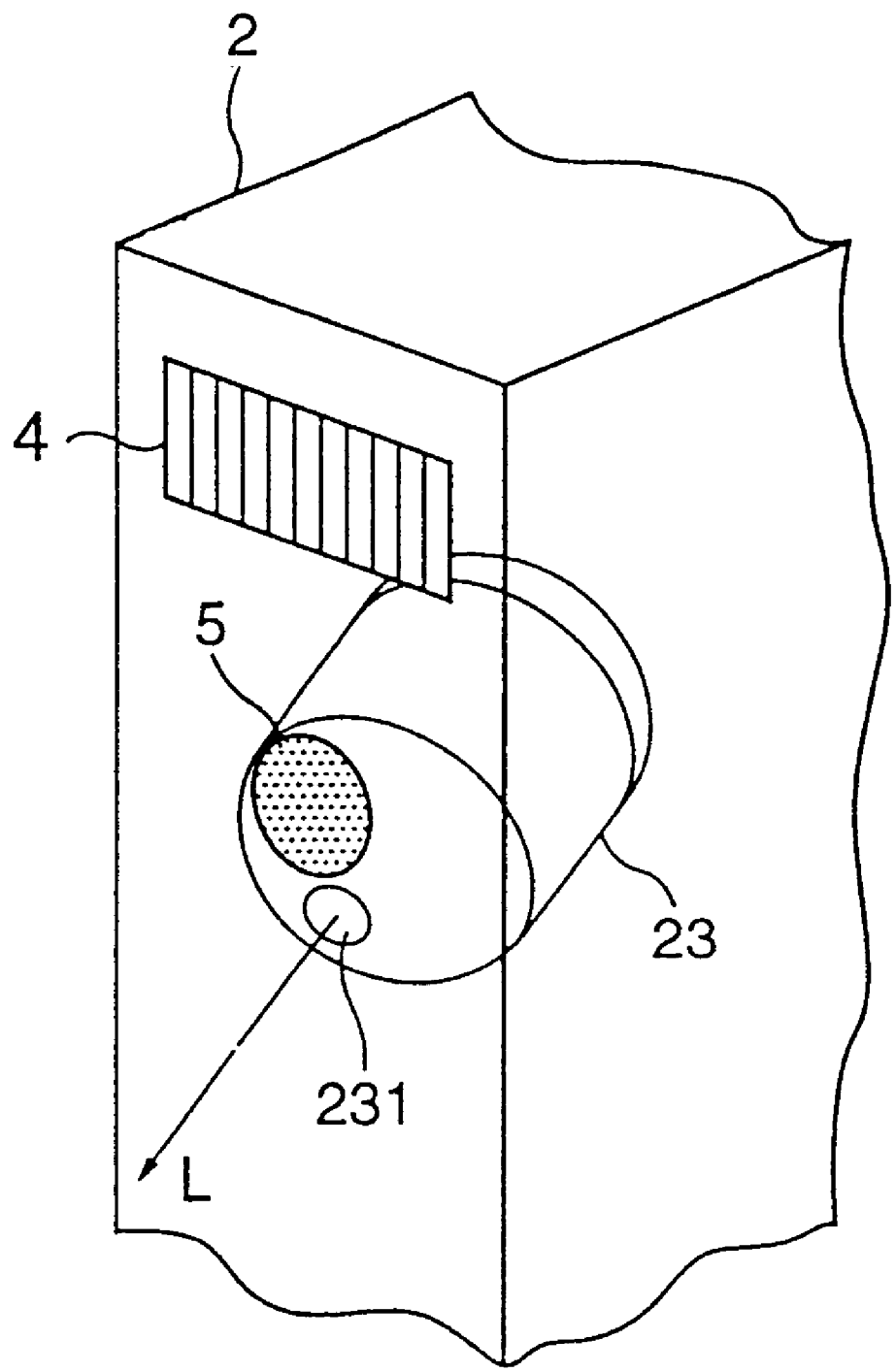
FIG. 17 is a perspective view showing the image pickup unit when set in a position to close an opening formed in a front surface of the camera main body.

When the main switch 21 is turned off, the image pickup unit 22 is automatically set in a position rotated downward by about 40° from the center position as shown in phantom line in FIG. 15, and the opening 5 is closed by a portion of the front semispherical surface 23a of the unit main body 23. It should be noted that the opening 5 may be covered by a portion of the front semispherical surface 23a of the unit main body 23 by rotating the image pickup unit 22 by about 40° in a direction other than the downward direction from the center position. In this embodiment, in order to facilitate the drive control for the image pickup unit 22, the image pickup unit 22 is rotated until the reference positions R are detected by the position detecting members 27, 28, and is set in a position attained by rotating the image pickup unit 22 downward to the right by 40° as shown in FIG. 17.

Since the opening 5 is closed by the unit main body 23 without fitting it with a barrier or slide cover, a mechanism for closing the opening 2 can be simplified and the unit main body 23 can be securely contained in the camera main body 2 when the camera 1 is stored. Therefore, adherence of smear and dirt to the taking lens 231 and the entrance of unnecessary light into the image pickup device through the taking lens 231 can be prevented by a simple construction.

Although the piezoelectric devices are used as the driving members for the image pickup unit 22 in this embodiment, a stepping motor or like motor may be used for this purpose. In such a case, the image pickup unit 22 may be directly driven by directly coupling a rotor of a stepping motor with rotatable shafts of the image pickup unit 22 in the vertical and horizontal planes. Alternatively, a torque of the stepping motor may be transmitted to the rotatable shafts via a torque switching/transmitting member comprised of gear(s) and cam(s) to indirectly drive the image pickup unit 22.

Figure 18:
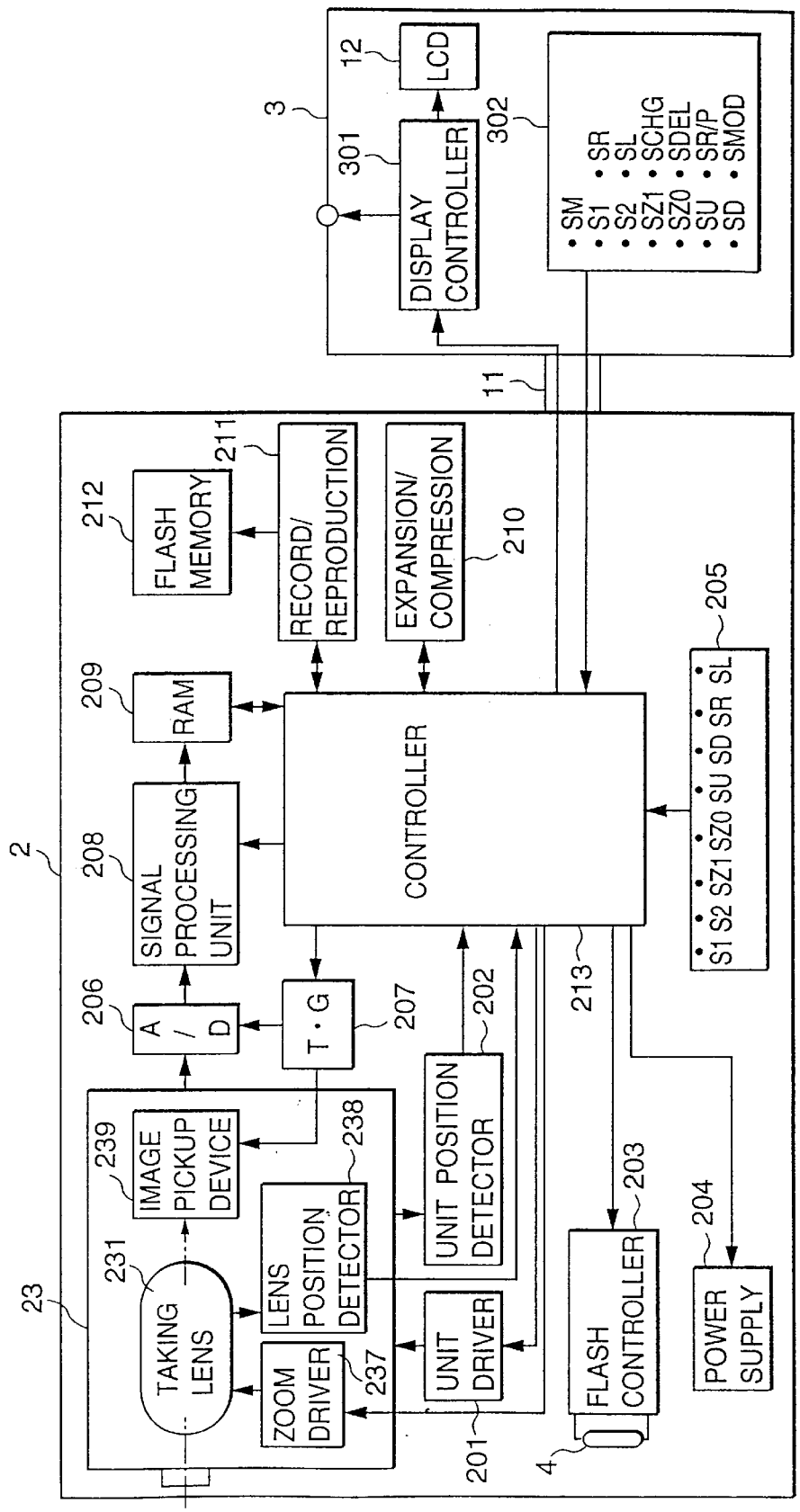
FIG. 18 is a block diagram showing a circuit construction of the electronic camera.

FIG. 18 is a block diagram showing a circuit construction of the electronic camera 1. In FIG. 18, the same elements as those described above are identified by the same reference numerals. An image pickup device 239 in the unit main body 23 corresponds to the aforementioned image pickup device provided with the image pickup device and the signal processing circuit. A zooming driver 237 controls the driving of the focusing lens 231a of the taking lens 231 and corresponds to the aforementioned driving mechanism comprised of the zoom motor 232, the screw member 233 and the nut member 234. The zooming driver 237 controls the position of the lens 231a by driving the zoom motor 232 in accordance with a control signal from a controller 213.

A lens position detector 238 detects the position of the lens 231a and includes the aforementioned encoder 235 and a decoder for decoding a code outputted from the encoder 235 into a position information. The position information outputted from the lens position detector 238 is inputted to the controller 213.

A unit driver 201 controls the rotation of the image pickup unit 22 and includes the aforementioned driving member 26 and a driving circuit therefor. The unit driver 201 controls the position of the image pickup unit 22 by driving the driving member 26 in accordance with a control signal from the controller 213.

A unit position detector 202 detects the rotational position of the image pickup unit 22 and includes the aforementioned position detecting members 27, 28 and a position detecting circuit. An information on the rotating direction and the rotating amount of the image pickup unit 22 outputted from the detector 202 is inputted to the controller 213.

A flash controller 203 controls the firing of the flash device 4 in accordance with a control signal from the controller 213 and includes an emission energy storing circuit and a firing timing control circuit. In the case of predetermined low brightness photographing, a firing command signal is outputted from the controller 213 and the flash controller 203 causes the flash device 4 to automatically fire at the time of photographing.

A power supply unit 204 includes a power supply battery and dc-to-dc (DC/DC) converter and generates and supplies power supplies necessary for various electric circuits. The power supply unit 204 controls power supply in accordance with a control signal from the controller 213.

A group of switches 205 detect the operative states of the zooming buttons 6, 7, the release button 8 and the optical axis changing lever 9, and send detection signals to the controller 213.

The switches 205 include switches S1, S2, SZI, SZO, SU, SD, SR and SL. The functions of the respective switches S1 to SL are as follows:

S1: a switch for detecting that the release button 8 has been pressed halfway,

S2: a switch for detecting that the release button 8 has been fully pressed,

SZI: a zoom-in switch for detecting that the zooming button 6 is being pushed,

SZO: a zoom-out switch for detecting that the zooming button 7 is being pushed,

SU: a switch for detecting that the optical axis changing lever 9 is being inclined upward, SD: a switch for detecting that the optical axis changing lever 9 is being inclined downward, SR: a switch for detecting that the optical axis changing lever 9 is being inclined rightward, SL: a switch for detecting that the optical axis changing lever is being inclined leftward.

An analog-to-digital (A/D) converter 206 converts an image signal (analog signal) outputted from the image pickup device 239 into, for example, an 8-bit digital signal (hereinafter, "image data").

A timing generator 207 generates timing pulses used for the image pickup operation by the image pickup device and for time-series processing applied to pixel data constituting the picked image in the image pickup device 239 and the A/D converter 206. The timing generator 207 has a reference clock, and generates timing pulses having specified frequencies by frequency-dividing this reference clock and sent them to the image pickup device 239 and the A/D converter 206. The timing generator 207 also generates timing signals for the start and end of the integration of the CCD and send them to the image pickup device 239. The timing generator 207 generates the timing signals in accordance with a control signal from the controller 213 and send them to the image pickup device 239 and the A/D converter 206.

The signal processing unit 208 has signal processing circuits including a black level correcting circuit, a white balance adjusting circuit and a γ-correction circuit, and applies specified signal processings such as black level correction, white balance adjustment and gradation correction to the image data outputted from the A/D converter 206.

A RAM (random access memory) 209 temporarily stores the image data outputted from the signal processing unit 208. The RAM 209 has a storage capacity of five picked images. The RAM 209 is so constructed as to store a plurality of picked images in order to enable the photographing of partial images in the high-resolution photographing mode described above. Since the RAM 209 has a spare storage capacity, automatic bracket-photographing is performed in the normal photographing mode.

A record/readout unit 211 records the image data stored in the RAM 209 in the flash memory 212 and reads out the picked image stored in the flash memory 212 to reproduce it on the LCD device 3. This unit 211 records or reads out the image in accordance with a control signal from the controller 213.

An expansion/compression unit 210 compresses the image data stored in the RAM 209 when the image data is to be recorded in the flash memory 212 and expands the image data (compressed data) read from the flash memory 212. The unit 210 compresses or expands the image data according to, for example JPEG (joint photographic coding experts group) system in accordance with a control signal from the controller 213. It should be noted that the compression system used in the present invention is not limited to JPEG system, but may be an other compression system such as MPEG (moving picture coding experts group) system.

The flash memory 212 is an non-volatile reloadable external storage medium. An other kind of storage medium such as MD, PC card or hard disk card may be used as the external storage medium. The flash memory 212 is detachably mountable in the camera main body 2.

In order to distinguish the temporary storage of the image data in the RAM 209 and the storage thereof in the flash memory 212, the former is referred to as "storage" and the latter is referred to as "record" in the description below.

The controller 213 centrally controls the photographing operation of the electronic camera 1 by meaningfully controlling the driving of the respective members in the camera main body 2 and the LCD device 3 and includes a microcomputer. The controller 213 also has a focusing function (AF function) and an exposure controlling function (AE function), so that it can detect a focusing condition using the image data stored in the RAM 209 and an object brightness and set an exposure time of the CCD corresponding to a shutter speed based on the detected object brightness.

In a photographing standby state, the controller 213 drives the image pickup device 239 in specified cycles to store live-view images (video images) in the RAM 209 and successively outputs the stored images to the LCD device 3, causing it to display them on the LCD panel 12. In other words, the controller 213 causes a viewfinder display to be made on the LCD device 3. When the photographer instructs photographing by operating the release button 8 (or 18), the controller 213 causes an object to be photographed during the exposure time after focusing and setting the exposure time of the CCD, and causes the photographed image to be recorded in the flash memory 212.

A display controller 301 in the LCD device 3 controls the display of the image on the LCD panel 12. The display controller 301 has a display image memory corresponding to the number of pixels of the LCD panel 12. The image data is transferred from the controller 213 to the display controller 301 after compressing the image data to be reproduced (i.e., weeding out pixel data constituting the image data at predetermined intervals). The display controller 301 reproduces the image on the LCD panel 12 by writing the image data in the image memory. The display controller 301 also has a digital-to-analog (D/A) converter for converting the image data written in the image memory into a video signal. The video signal generated by the D/A converter is outputted from a VIDEO signal terminal. Thus, by connecting this VIDEO signal terminal with a display device such as a CRT, the same image as the one displayed on the LCD panel 12 can be reproduced and displayed on this display device.

A group of switches 302 detect the operative states of the record/reproduction mode switch 13, the photographing mode switch 14, the bracket-photographing confirmation button 15, the zooming buttons 16, 17, the release button 18, the optical axis changing buttons 19a to 19d, the delete button 20, and the main switch 21, and input their detection signals to the controller 213 via the cable 11.

Switches 302 include switches SM, S1, S2, SZI, SZO, SU, SD, SR, SL, SCHG, SDEL, SR/P, SMOD. The functions of the respective switches S1 to SMOD are as follows:

SM: a switch for detecting that the main switch 21 has been pressed.

S1: a switch for detecting that the release button 18 has been pressed halfway,

S2: a switch for detecting that the release button 18 has been fully pressed,

SZI: a zoom-in switch for detecting that the zooming button 16 is being pushed,

SZO: a zoom-out switch for detecting that the zooming button 17 is being pushed, SU: a switch for detecting that the optical axis changing button 19a is being pressed SD: a switch for detecting that the optical axis changing button 19b is being pressed SR: a switch for detecting that the optical axis changing button 19c is being pressed SL: a switch for detecting that the optical axis changing button 19d is being pressed SCHG: a switch for detecting that the bracket-photographing confirmation button 15 has been pressed, SDEL: a switch for detecting that the delete button 20 has been pressed, SR/P: a switch for detecting the set state of the record/reproduction mode switch 13, SMOD: a switch for detecting the set state of the photographing mode switch 14.

As described above, in this embodiment, the camera main body 2 and the LCD device 3 are electrically connected via the cable 11 and power and the compressed image data are sent from the camera main body 2 to the LCD device 3 while the detection signals of the switches are sent from the LCD device 3 to the camera main body 2. Accordingly, it is easier to handle the signals which transmit through the cable and to deal with less amount of data as compared to, for example, a construction in which an image pickup device and a camera main body are connected via a cable. Therefore, the cable 11 and a circuit construction for transmitting and receiving the signals can be simplified.

The record/reproduction unit 211 and the flash memory 212 may be provided in the LCD device 3. In such a case as well, since the image data transmitted from the camera main body 2 to the LCD device 3 is compressed in the expansion/compression unit 210, a reduced amount of data is dealt with and the cable 11 and a circuit construction for transmitting and receiving the signals can be simplified. Although the camera main body 2 and the LCD device 3 are connected via the cable in this embodiment, they may be connected wireless using infrared rays or radio waves.

Next, the photographing operation of the electronic camera 1 is specifically described with reference to flowcharts.

Figure 19:
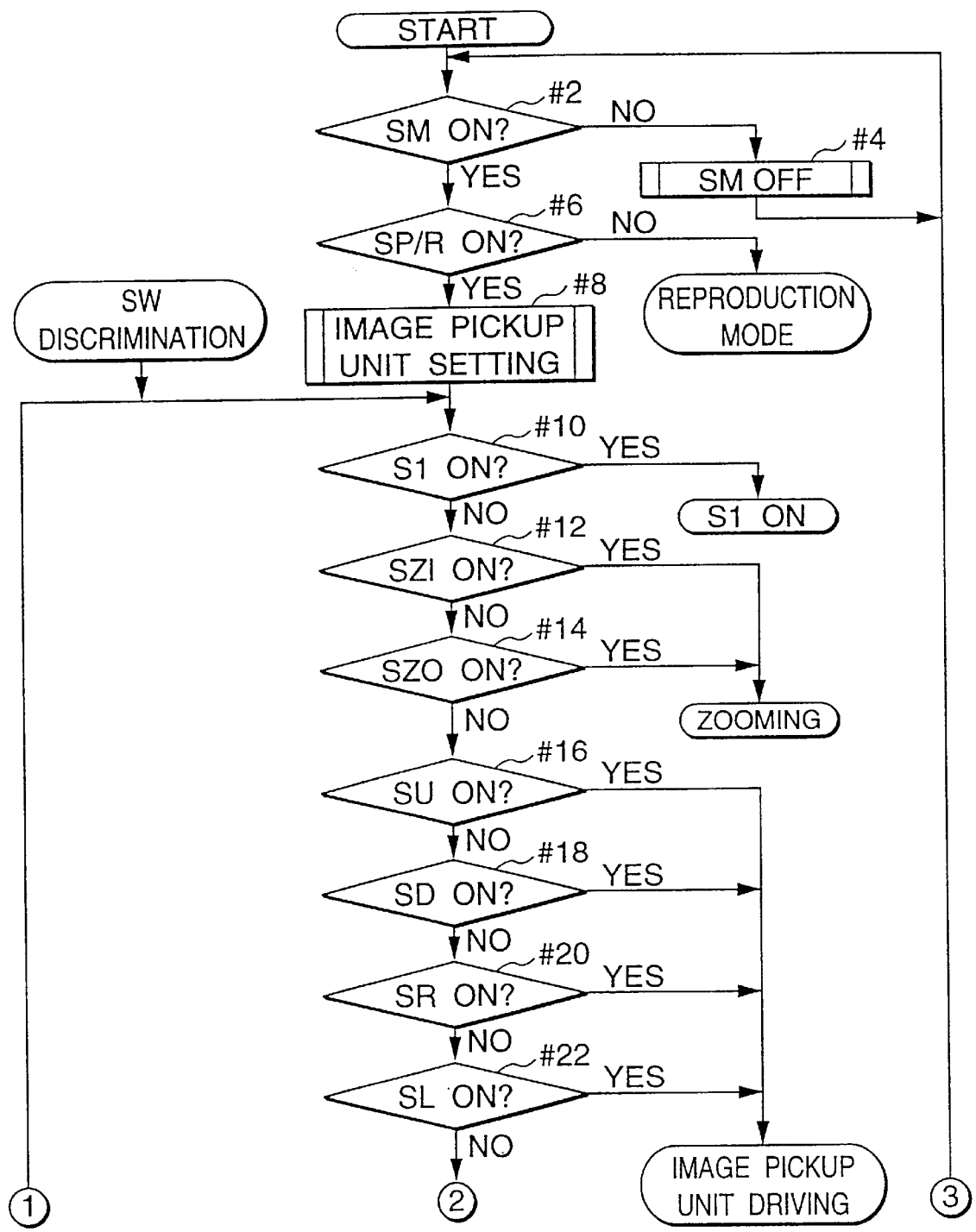
FIGS. 19 and 20 are flowcharts showing a main routine of a photographing operation of the electronic camera.
Figure 20:
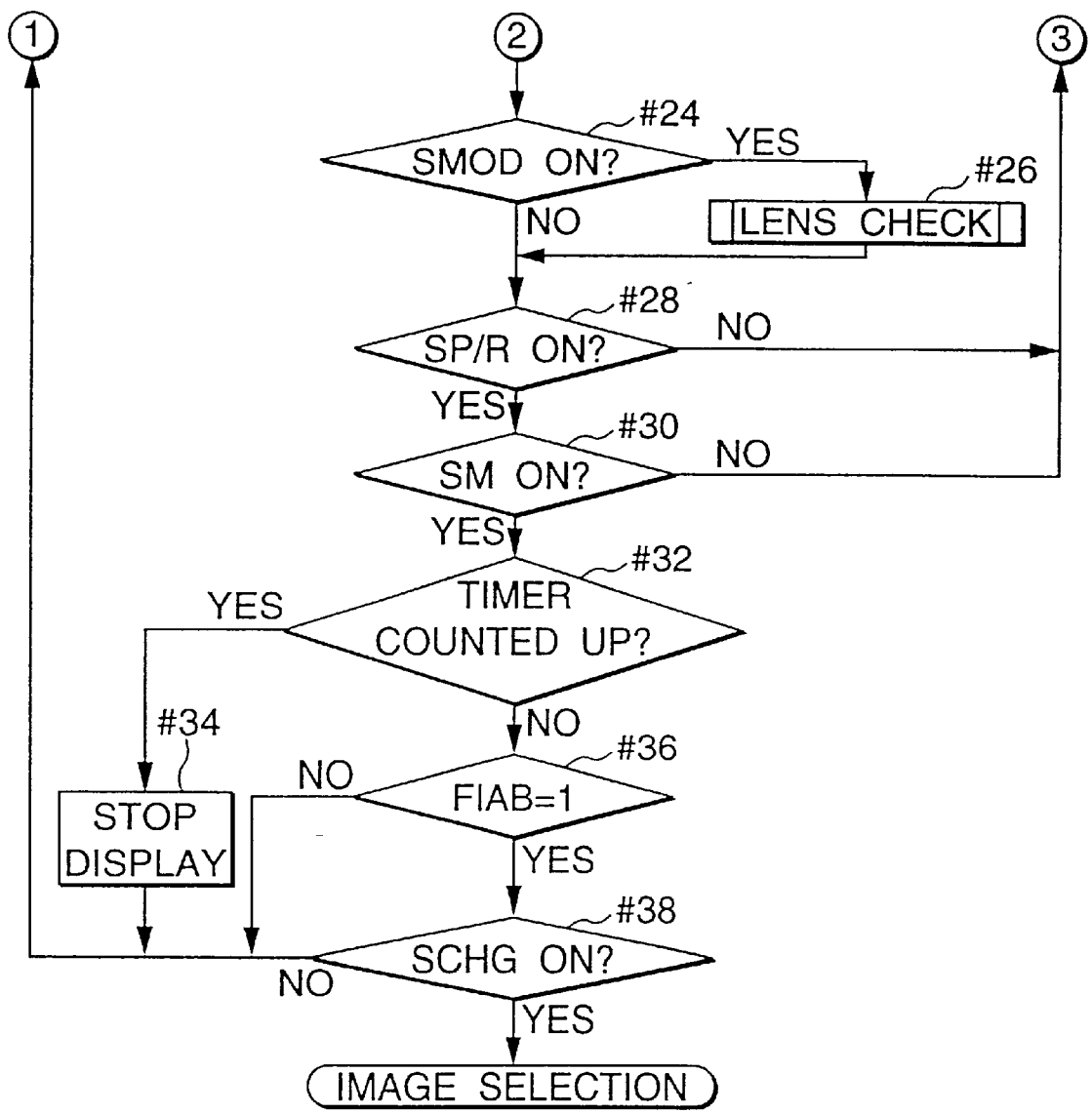

FIGS. 19 and 20 are a flowchart showing a main routine of the photographing operation. This main routine is executed when the power supply battery is mounted in the camera main body 2.

Figure 21:
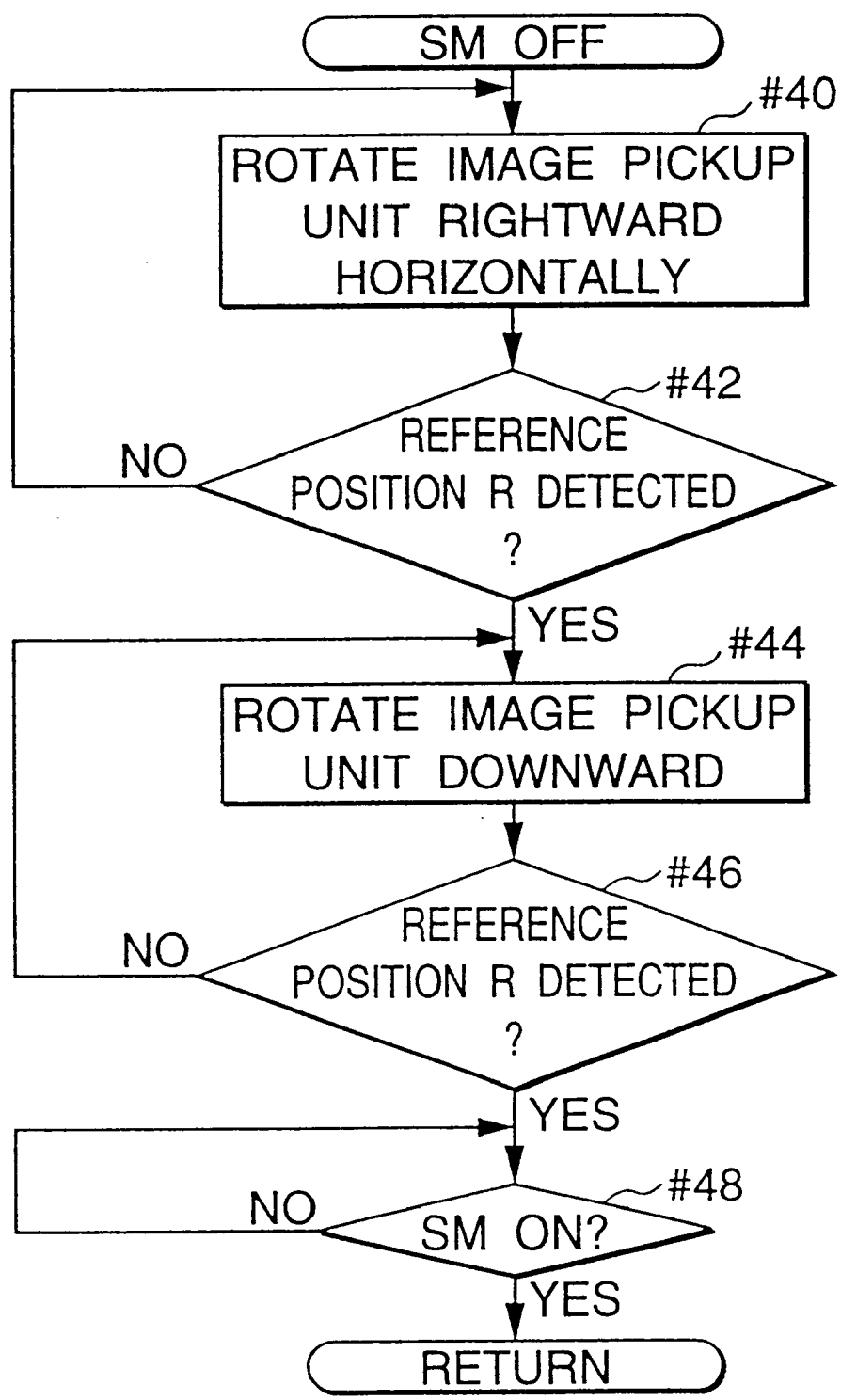
FIG. 21 is a flowchart showing a subroutine "SM OFF"

It is first discriminated whether the main switch 21 is on or off (Step #2). If the main switch 21 is off (NO in Step #2), a subroutine "SM OFF" shown in FIG. 21 is executed to set the image pickup unit 22 in the predetermined reference position R where it closes the opening 5.

Upon entering the subroutine "SM OFF", the image pickup unit 22 is rotated rightward with respect to the front direction in the horizontal direction until the reference position R is detected by the position detecting member 28 (loop of Steps #40 and #42). When the image pickup unit 22 reaches its rightward rotation reference position R, the image pickup unit 22 is rotated downward in the vertical plane until the reference position R is detected by the position detecting member 27 (loop of Steps #44, #46). When the image pickup unit 22 reaches its downward rotation reference position R (i.e., when the image pickup unit 22 reaches a position where the optical axis thereof is oriented in a specified direction extending downward to the right), the driving of the image pickup unit 22 is stopped and this state is kept until the main switch SM is turned on (loop of Step #48). This state corresponds to a state where the power supply battery is mounted in the camera main body 2 and the main switch 21 is off (i.e., a state where the electronic camera 1 is left unattended or stored in its case). In the state where the electronic camera 1 is stored in its case and photographing is not allowed, the image pickup unit 22 is set in such a position as to close the opening 5 of the camera main body 2 as described above. Therefore, the prevention of light-exposure of the CCD and protection of the taking lens 231 are suitably realized.

Figure 35:
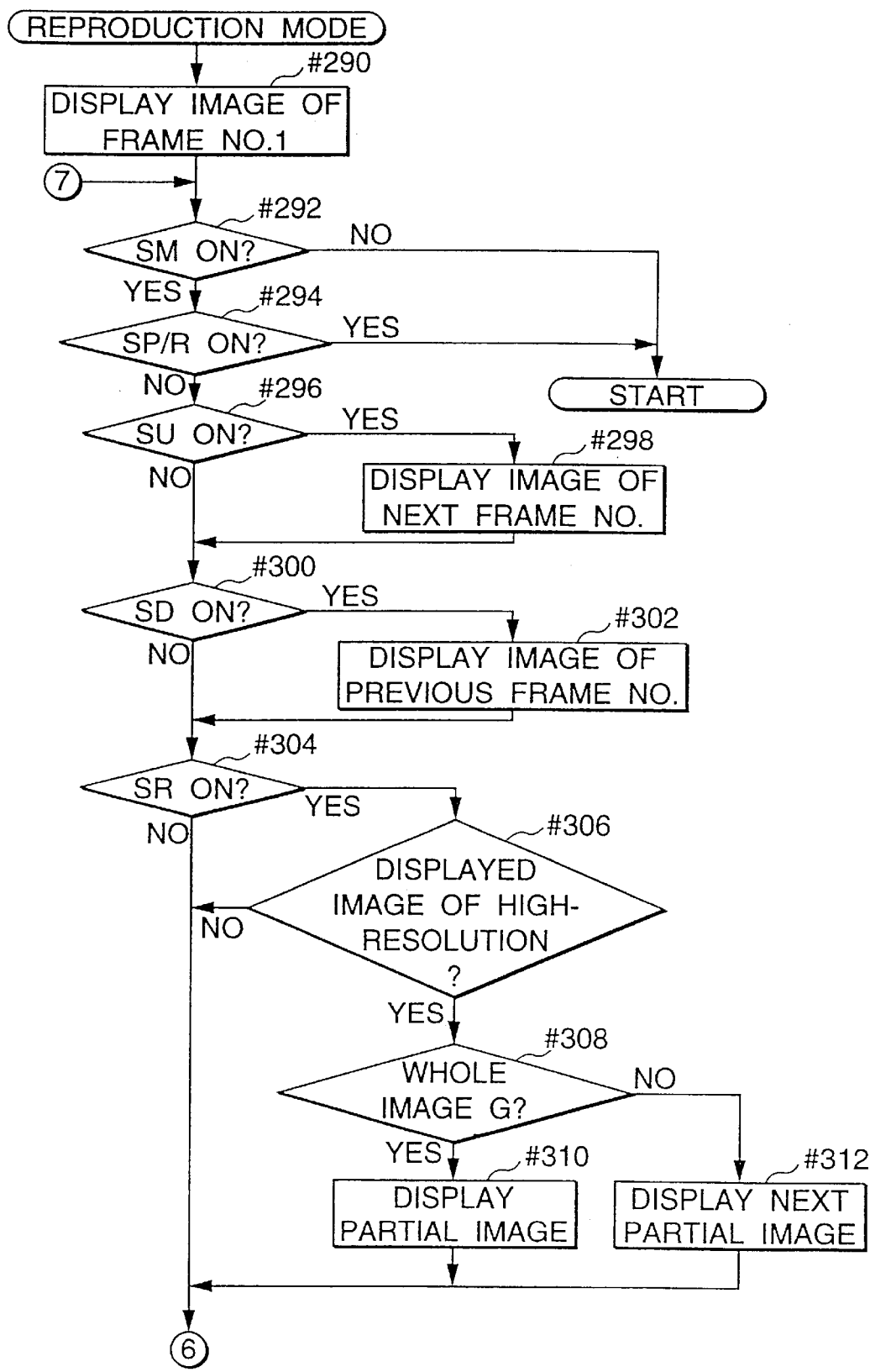
FIGS. 35 and 36 are flowcharts showing a subroutine "Reproduction Mode"
Figure 36:
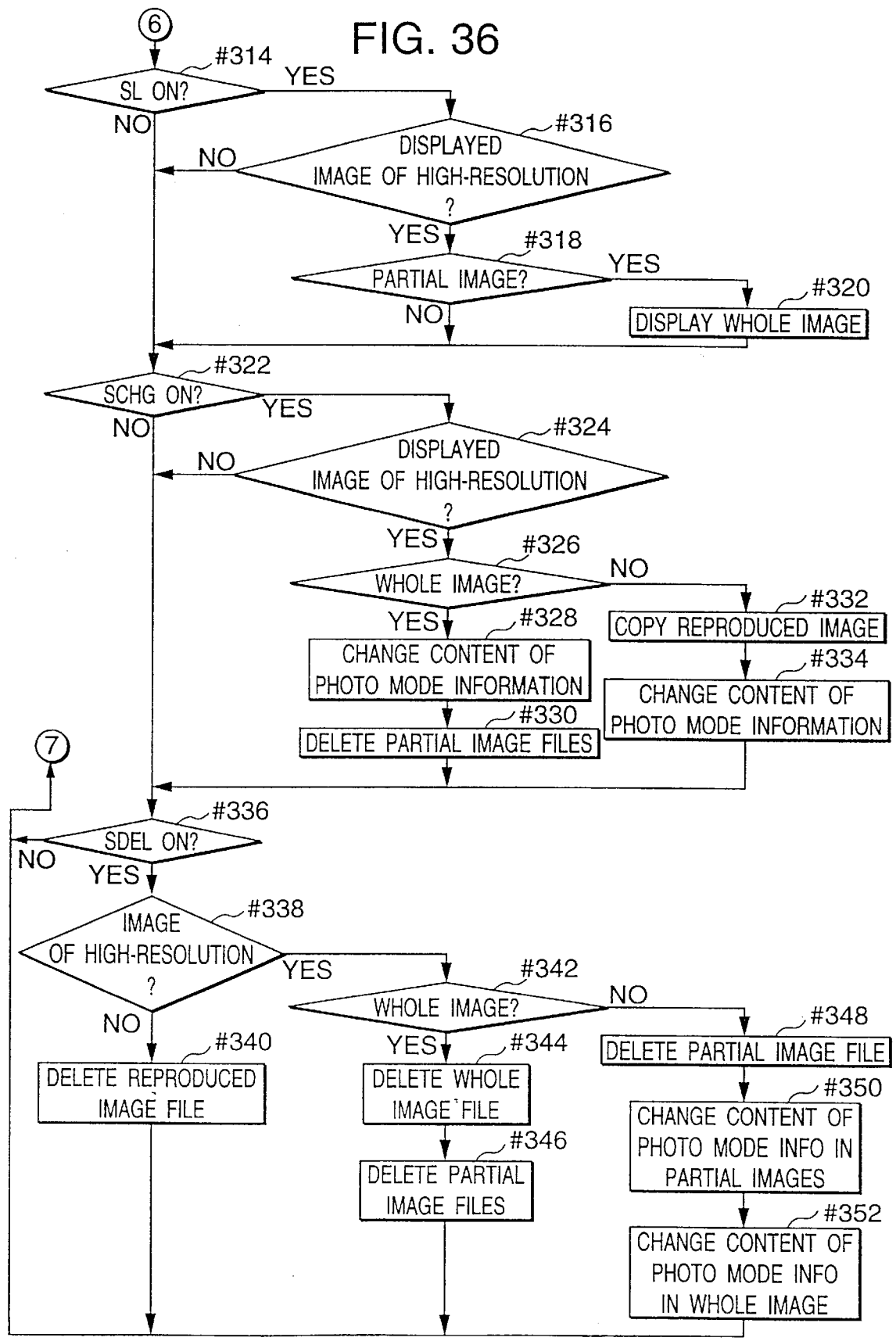

Referring back to FIG. 19, if the main switch 21 is on (YES in Step #2), the set state of the record/reproduction mode switch 13 is discriminated (Step #6). If the reproduction mode is set (NO in Step #6), a subroutine "Reproduction Mode" shown in FIGS. 35 and 36 is executed to reproduce the recorded image on the LCD device 3. Processing in the reproduction mode is described later.

Figure 22:
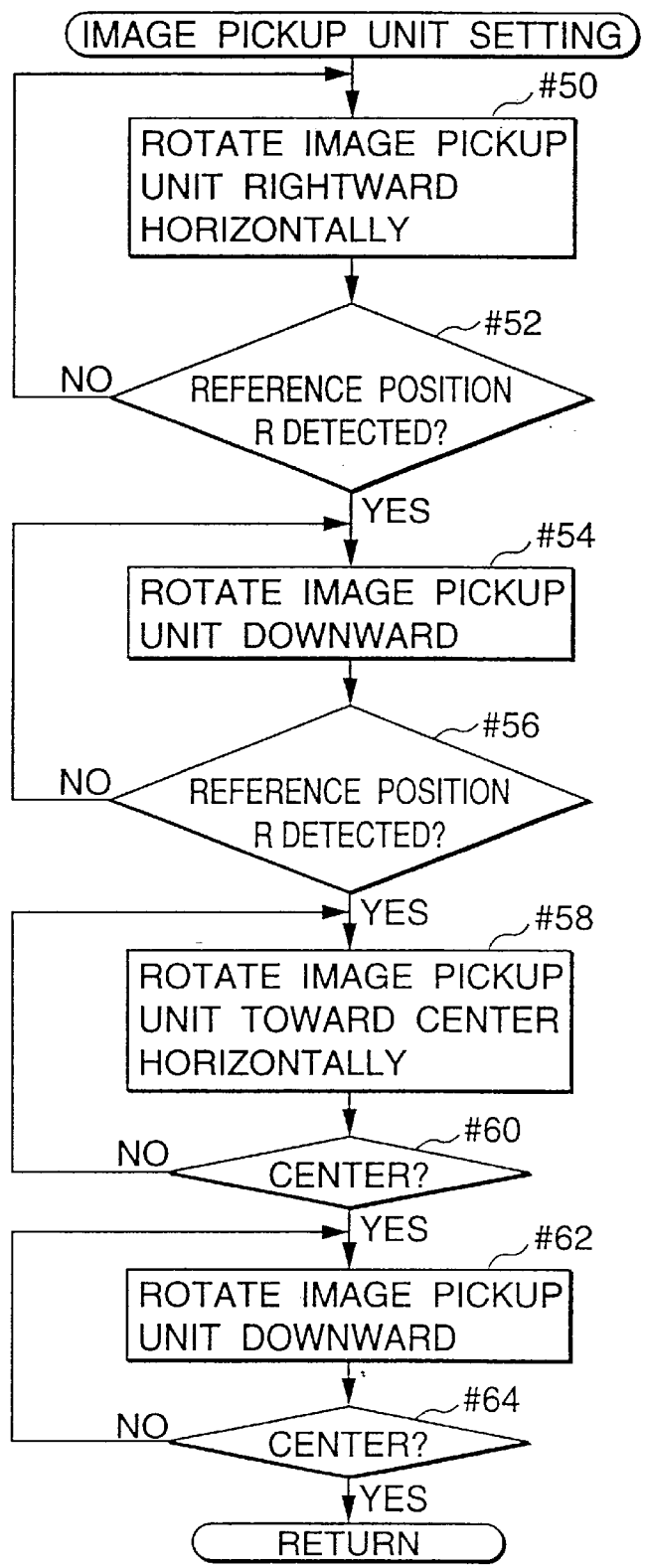
FIG. 22 is a flowchart showing a subroutine "Image Pickup Unit Setting"

On the other hand, if the record mode is set (YES in Step #6), a subroutine "Image Pickup Unit Setting" shown in FIG. 22 is executed to set the image pickup unit 22 in the center position (i.e., a position where the taking lens 231 is exposed through the opening 5 and the optical axis thereof is oriented in the front direction). This operation enables the driving of the image pickup unit 22 to be easily and highly accurately controlled by setting the optical axis of the image pickup unit 22 in the front direction when the main switch 21 is turned on and also enables normal photographing to be immediately performed without the photographer adjusting the image pickup unit 22.

Upon entering the subroutine "Image Pickup Unit Setting", the image pickup unit 22 is rotated rightward with respect to the front direction in the horizontal plane until the reference position R is detected by the position detecting member 28 (loop of Steps #50, #52). Upon reaching the right rotation reference position R, the image pickup unit 22 is rotated downward in the vertical plane until the reference position R is detected by the position detecting member 27 (loop of Steps #54, #56). This operation is performed to set the image pickup unit 22 in the upper, lower, right or left rotation reference position R (a specified position located downward to the right from the center position in this embodiment) for the rotation control.

Upon reaching the lower rotation reference position R, the image pickup unit 22 is rotated leftward by a specified amount in the horizontal plane to be set in the center position in the horizontal plane (loop of Steps #58, #60) and then rotated upward by a specified amount in the vertical plane to be set in the center position in the vertical plane (loop of Steps #62, #64). Then, this subroutine returns to the main routine. In this embodiment, the rotation reference position R is a position rotated downward by 40° and rightward by 40°. Thus, the image pickup unit 22 is set in the center position by being rotated upward by 40° after being rotated leftward by 40° in the horizontal plane.

Referring back to FIG. 19, when the setting of the image pickup unit 22 is completed, changes in the states of various switches S1, S2, SZI, SZO, SU, SD, SR, SL, SMOD, SP/R, SM are discriminated (Steps #10 to #30).

If there is a change in none of the switches (NO in Steps #10 to #24, YES in Steps #28 and #30), it is discriminated whether a display timer has counted up a display time (Step #32). This display timer counts a specified time during which the photographed image is displayed on the LCD device 3 when photographing is performed in a subroutine "S1 ON" to be described later. The display timer is built in the controller 213.

Figure 32:
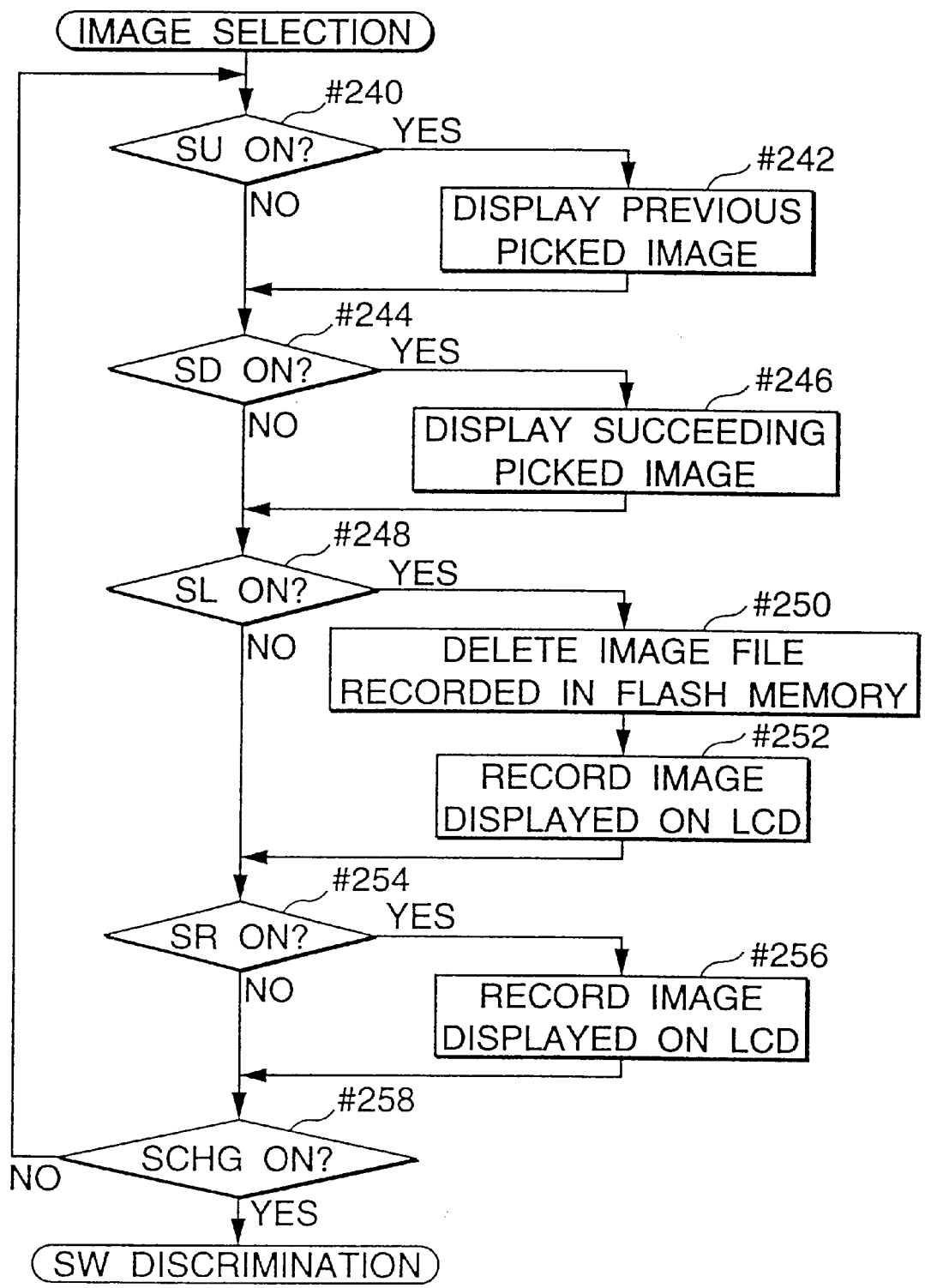
FIG. 32 is a flowchart showing a subroutine "Image Selection"

If the display timer has counted up the display time (YES in Step #32), the display of the photographed image on the LCD device 3 is stopped (Step #34) and this routine returns to Step #10 to discriminate changes in the states of the various switches S1 to SM (hereinafter, "SW-discrimination"). On the other hand, if the display time has not elapsed yet (NO in Step #32), the content of a flag FIAB is discriminated (Step #36). If the flag FIAB is reset to "0" (NO in Step #36), this routine returns to Step #10 to perform the SW discrimination. If the flag FIAB is set to "1" (YES in Step #36), it is further discriminated whether the switch SCHG is on (Step #38). Unless the switch SCHG has been turned by operating the bracket-photographing confirmation button 15 (NO in Step #38), this routine returns to Step #10 to perform the SW discrimination. If the switch SCHG is on (YES in Step #38), a subroutine "Image Selection" shown in FIG. 32 is entered.

The flag FIAB is a flag indicating whether or not the change and addition of the recorded image in the automatic bracket-photographing are possible. If the flag FIAB is set at "1", the recorded image can be changed or added according to the operation of the bracket-photographing confirmation button 15. If the flag FIAB is reset at "0", the recorded image can be neither changed nor added. Accordingly, the discrimination as to the switch SCHG in Step #38 is discrimination as to whether the bracket-photographing confirmation button 15 has been operated. The processing in the subroutine "Image Selection" is performed to select the recorded image to be changed or added. This is described in detail later.

If the set state of the record/reproduction mode switch 13 is switched to the reproduction mode (NO in Step #28) or the main switch SM is turned off (NO in Step #30) in the SW discrimination, this routine returns to Step #2.

Figure 23:
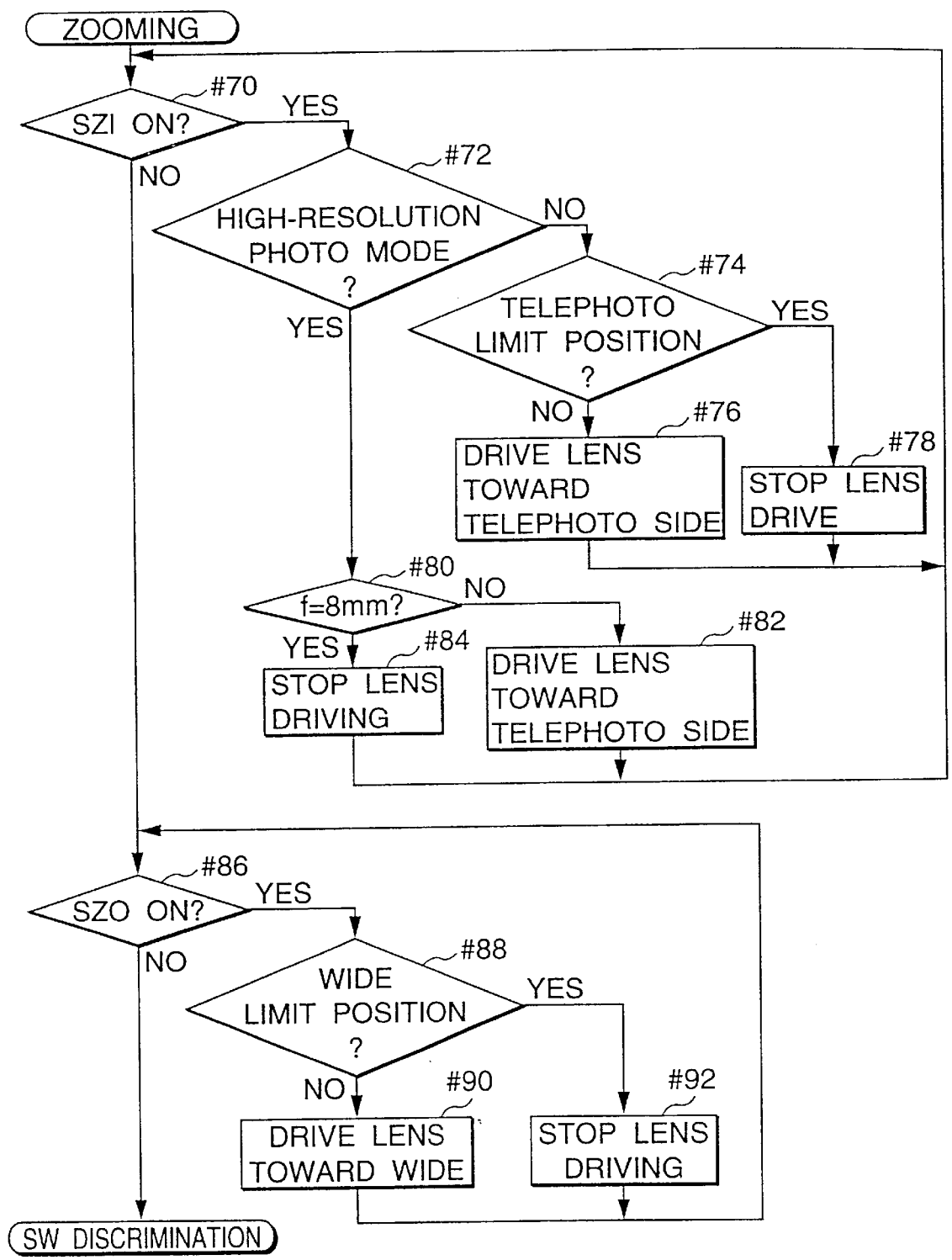
FIG. 23 is a flowchart showing a subroutine "Zooming"

If the zooming button 6 or 7 (or 16 or 17) is operated to turn the switch SZI or SZO on (YES in Step #12 or #14) in the SW discrimination, a subroutine "Zooming" shown in FIG. 23 is executed to zoom the taking lens 231.

Upon entering the subroutine "Zooming", it is discriminated whether the zoom-in switch SZI or the zoom-out switch SZO is still on (Steps #70, #86). If the zoom-in switch SZI is on (YES in Step #70), it is discriminated whether the high-resolution photographing mode has been set by operating the photographing mode switch 14 (Step #72).

If the normal photographing mode is set (NO in Step #72), it is discriminated whether the focusing lens 231a of the taking lens 231 is at a telephoto limit position (Step #74). Unless the focusing lens 231a is at the telephoto limit position (NO in Step #74), it is driven toward the telephoto limit position (Step #76, loop of Steps #70 to #76). The driving of the lens 231a is stopped (Step #78) after the lens 231a reaches the telephoto limit position (YES in Step #74). Specifically, if the zooming button 6 (or 16) continues to be pressed in the normal photographing mode, zooming-in is performed by moving the lens 231a of the taking lens 231 toward the telephoto limit position. If the zooming button 6 (or 16) still continues to be pressed even after the lens 231a reaches the telephoto limit position, the lens 231a is stopped at this limit position and the taking lens 231 is fixed to the telephoto limit (f=15 mm in this embodiment).

On the other hand, if the high-resolution photographing mode is set (YES in Step #72), it is discriminated whether a focal length f of the taking lens 231 is 8 mm (Step #80). If f<8 mm (NO in Step #80), the lens 231a of the taking lens 231 is driven toward the telephoto side (loop of Steps #82,

70, #72, #80, #82). The driving of the lens 231a is stopped (Step #84) when the focal length f of the taking lens 231 reaches 8 mm (YES in Step #80). In other words, the focal length f of the taking lens 231 is controlled to be equal to or shorter than 8 mm in the high-resolution photographing mode.

Zooming in the high-resolution photographing mode is restricted such that the focal length f of the taking lens 231 does not exceed 8 mm for the following reason. In this embodiment, a focal length f2 at which partial images $G_A$ to $G_D$ (see FIG. 5) of the object Q are photographed is 1.8 to 1.9 times a focal length f1 at which the whole image G of the object Q is photographed as shown in TABLE-1 below. The photographing control for the whole image G of the object Q photographed first is made easier and more reliable by restricting the focal length approximately ½ of a maximum focal length fmax=15 mm.

is at the wide-angle limit position (NO in Step #88), it is driven toward the wide-angle side (Step #90, loop of Steps #86 to #90), and the driving of the lens 231a is stopped (Step #92) when the lens 231a reaches the wide-angle limit position (YES in Step #88).

Specifically, if the zooming button 7 (or 17) continues to be pressed, zooming-out is performed by moving the lens 231a of the taking lens 231 toward the wide-angle limit position. If the zooming button 7 (or 17) still continues to be pressed even after the lens 231a reaches the wide-angle limit position, the lens 231a is stopped at this limit position and the taking lens 231 is fixed to the wide-angle limit (f=5 mm in this embodiment). Since the focal length f of the taking lens does not exceed 8 mm in zooming-out, no such restriction as in zooming-in is provided in the high-resolution photographing mode.

Referring back to FIG. 19, if any of the switches SU to SL has been turned on by operating the optical axis changing

TABLE 1

| f1 (mm) | θv1 (DEG) | θh1 (DEG) | f2 (mm) | θv2 (DEG) | Δθv (DEG) | θh2 (DEG) | Δθh (DEG) | K (f2/f1) |
|---|---|---|---|---|---|---|---|---|
| 5 | 39.6 | 51.3 | 9 | 22.6 | 11.3 | 29.9 | 14.9 | 1.80 |
| 6 | 33.4 | 43.6 | 11 | 18.6 | 9.3 | 24.6 | 12.3 | 1.83 |
| 7 | 28.8 | 37.8 | 13 | 15.8 | 7.9 | 20.9 | 10.4 | 1.86 |
| 8 | 25.4 | 33.4 | 15 | 13.7 | 6.3 | 18.2 | 9.1 | 1.88 | f1 focal length at which the whole image is photographed
θv1 vertical angle of view
θh1 horizontal angle of view
f2 focal length at which the partial images are photographed
θv2 vertical angle of view
Δθv vertical optical axis displacement
θh2 horizontal angle of view
Δθh horizontal optical axis displacement
K(f2/f1) focal length ratio TABLE-1 shows four typical focal lengths f1 at which the whole image is photographed, horizontal and vertical angles of view θh1, θv1 corresponding to these focal lengths f1, horizontal and vertical angles of view θh2, θv2 corresponding focal lengths f2 at which the partial images are photographed, displacements Δθh, Δθv of the optical axis L from the front direction when the partial images are photographed, and focal length ratios K(=f2/f1). Any desired focal length f1 other than the typical values below 8 mm can be similarly calculated and set.

Since the whole object is divided into four sections as shown in FIG. 5 in this embodiment, the focal length f2 at which the respective partial images $G_A$ to $G_D$ are photographed is about twice the focal length f1 at which the whole image G is photographed. The focal length K(=f2/f1) is smaller than 2 in order to facilitate the combination of the partial images by overlapping the images at the boundaries and prevent the images from missing in combination positions due to a camera shake during photographing.

Figure 24A:
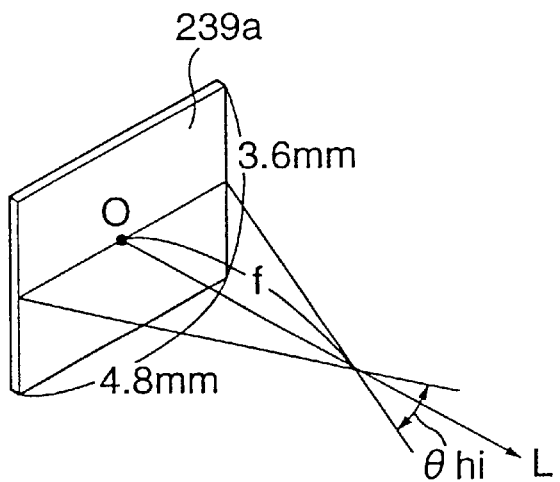
FIGS. 24A and 24B are diagrams showing a horizontal angle of view θh and a vertical angle of view θv, respectively.
Figure 24B:
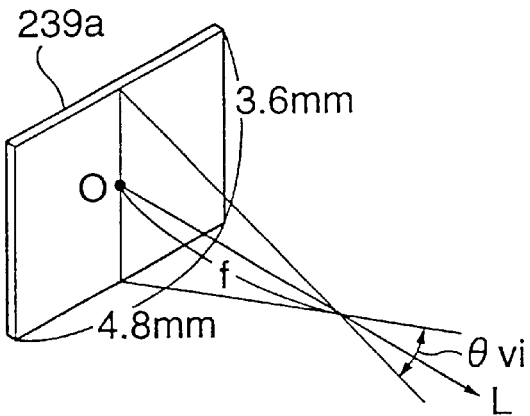
Figure 25:
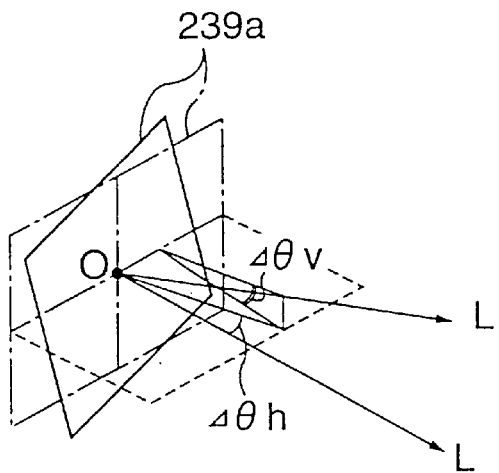
FIG. 25 is a diagram showing a horizontal displacement Δθh and a vertical displacement Δθv.

In TABLE-1, the horizontal and vertical angles of view θhi, θvi (i=1, 2) are angles shown in FIGS. 24A and 24B. Since the CCD 239a of 4.8 mm×3.6 mm is used as the image pickup device, the horizontal and vertical angles of view θhi, θvi (i=1, 2) can be calculated by θhi=2·tan$^{-1}$ (2.4/fi), θvi= 2·tan$^{-1}$ (1.8/fi). The optical axis displacements Δθh, Δθv are an horizontal angle of inclination and a vertical angle of inclination, respectively when the CCD 239a is inclined as shown in FIG. 25.

Figure 26:
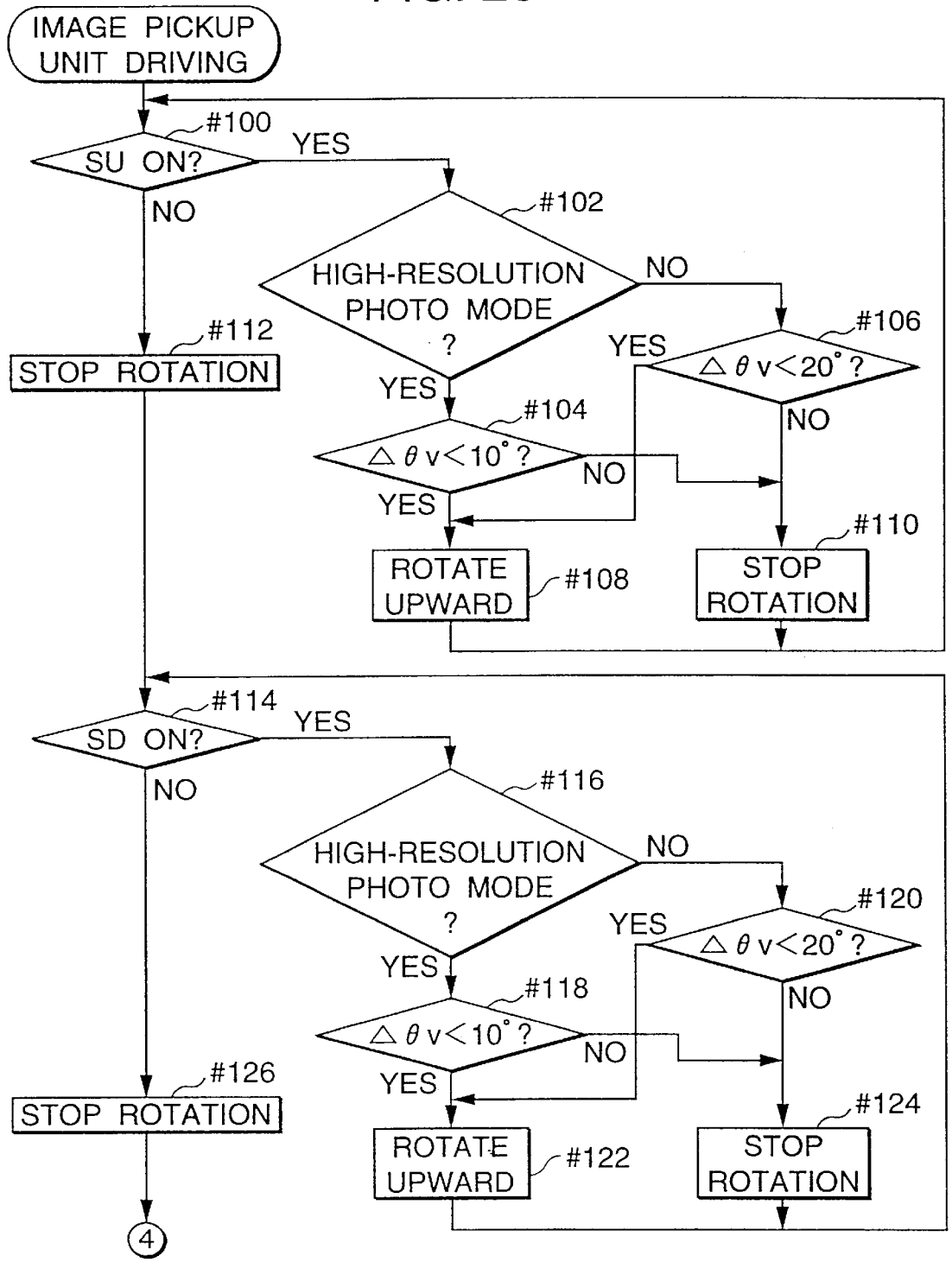
FIGS. 26 and 27 are flowcharts showing a subroutine "Image Pickup Unit Driving"
Figure 27:
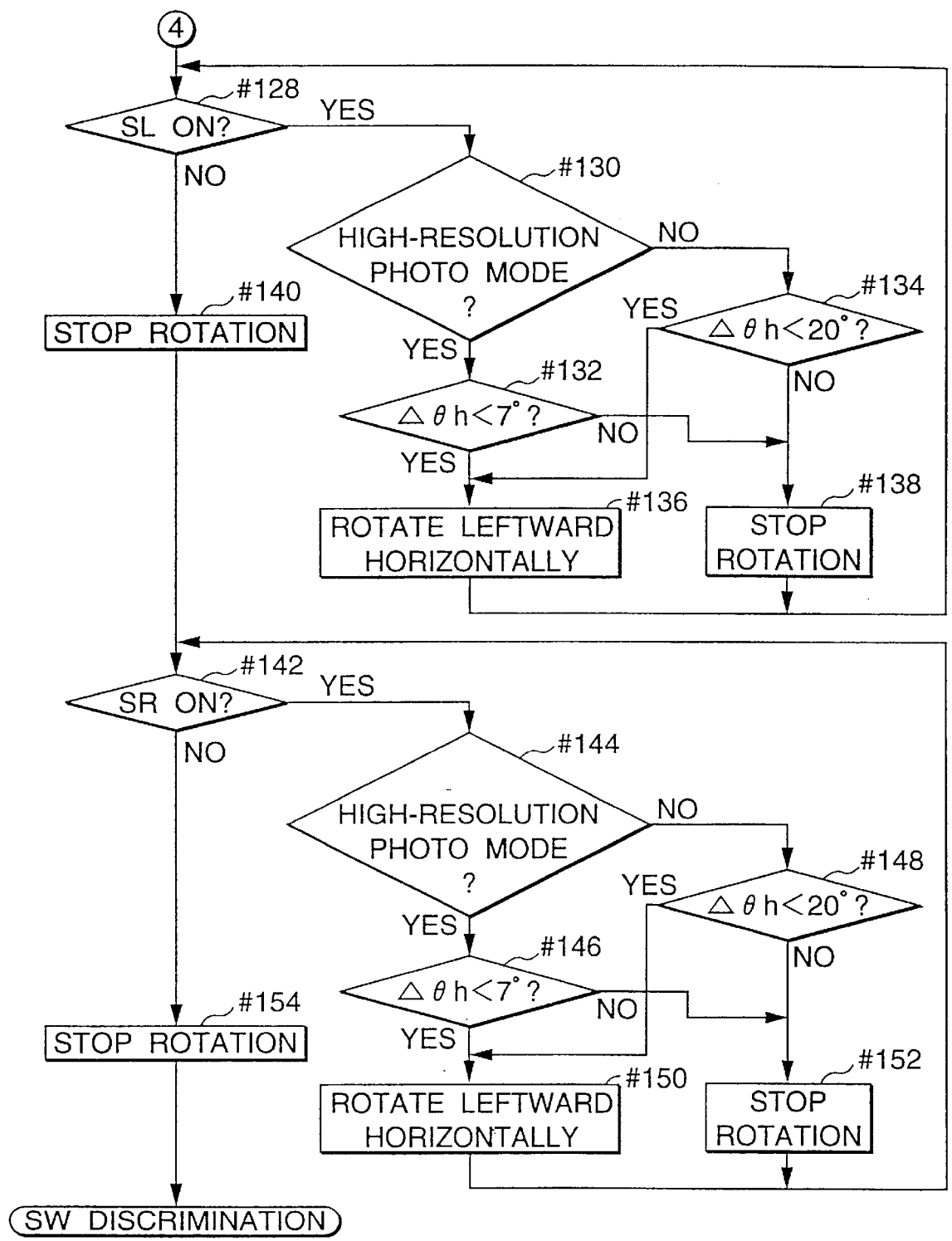

Referring back to FIG. 23, if the zoom-out switch SZO is on (NO in Step #70, YES in Step #86), it is discriminated whether the focusing lens 231a of the taking lens 231 is at a wide-angle limit position (Step #88). Unless the lens 231a lever 9 or optical axis changing button 19a to 19d (YES in any of Steps #16 to #22), a subroutine "Image Pickup Unit Drivin" shown in FIGS. 26 and 27 is executed to change the direction of the optical axis of the image pickup unit 22.

Upon entering the subroutine "Image Pickup Unit Driving", it is discriminated whether the switch SU has been turned on by operating the optical axis changing lever 9 (or the optical axis changing button 19a) (Step #100).

If the switch SU is on (YES in Step #100), it is discriminated whether the high-resolution photographing mode has been set by operating the photographing mode switch 14 (Step #102). If the high-resolution photographing mode is set (YES in Step #102), it is discriminated whether the image pickup unit 22 is in a position displaced upward by Δθv smaller than 10° from its center position (Step #104). If Δθv<10° (YES in Step #104), the image pickup unit 22 is rotated upward in the vertical plane (Step #108, loop of Steps #100 to #104, #108). When the image pickup unit 22 reaches the position displaced upward by 10° from its center position (NO in Step #104), the rotation of the image pickup unit 22 is stopped (Step #110). In other words, the image pickup unit 22 is rotated upward in an angle range of 10° or smaller from the center position according to the operation of the optical axis changing lever 9 (or the optical axis changing button 19a) in the high-resolution photographing mode.

On the other hand, if the normal photographing mode is set (NO in Step #102), it is discriminated whether the image pickup unit 22 is in a position displaced upward by Δθv smaller than 20° from its center position (Step #106). If Δθv<20° (YES in Step #106), the image pickup unit 22 is rotated upward in the vertical plane (Step #108, loop of Steps #100, #102, #106, #108). When the image pickup unit 22 reaches the position displaced upward by 20° from its center position (NO in Step #106), the rotation of the image pickup unit 22 is stopped (Step #110). In other words, the image pickup unit 22 is rotated upward in an angle range of 20° or smaller from the center position according to the operation of the optical axis changing lever 9 (or the optical axis changing button 19a) in the normal photographing mode.

If the switch SU is off or has been turned off (NO in Step #100), the rotation of the image pickup unit 22 is stopped (Step #112).

Subsequently, it is discriminated whether the switch SD has been turned on by operating the optical axis changing lever 9 (or the optical axis changing button 19b) (Step #114), and the rotation of the image pickup unit 22 is controlled substantially in the same manner as the case of the switch SU (Steps #114 to #126). Specifically, the image pickup unit 22 is rotated downward in an angle range of 10° or smaller from the center position according to the operation of the optical axis changing lever 9 (or the optical axis changing button 19b) in the high-resolution photographing mode (Steps #114, #116, #118, #122, #124), and the image pickup unit 22 is rotated downward in an angle range of 20° or smaller from the center position according to the operation of the optical axis changing lever 9 (or the optical axis changing button 19b) in the normal photographing mode (Steps #114, #116, #120, #122, #124). If the switch SD is off or has been turned off (NO in Step #114), the rotation of the image pickup unit 22 is stopped (Step #126).

The upward and downward rotatable ranges of the image pickup unit 22 in the high-resolution photographing mode are restricted to $\Delta\theta v<10°$ because an absolute value $|\Delta\theta v|$ of the displacement of the optical axis L of the image pickup unit 22 will not exceed 10° when the partial images are photographed at f1=8 mm. The upward and downward rotatable ranges of the image pickup unit 22 in the normal photographing mode are restricted to $\Delta\theta v<20°$ because the taking lens 231 of the image pickup unit 22 cannot be exposed through the opening 5 of the camera main body 2 if the absolute value $|\Delta\theta v|$ of the displacement of the optical axis L of the image pickup unit 22 exceeds 20° as shown in TABLE-1, and therefore photographing cannot be performed. Thus, meaningless operations are avoided by restricting the rotation of the image pickup unit 22 in the vertical plane to the ranges substantially necessary for the photographing in both photographing modes.

Subsequently, it is discriminated whether the switch SL has been turned on by operating the optical axis changing lever 9 (or the optical axis changing button 19c) (Step #128). If the switch SL is on (YES in Step #128), it is further discriminated whether the high-resolution photographing mode has been set by operating the photographing mode switch 14 (Step #130).

If the high-resolution photographing mode is set (YES in Step #130), it is discriminated whether the image pickup unit 22 is in a position displaced leftward by $\Delta\theta h$ smaller than 7° from its center position (Step #132). If $\Delta\theta h<7°$ (YES in Step #132), the image pickup unit 22 is rotated leftward in the horizontal plane (Step #136, loop of Steps #128 to #132, #136). When the image pickup unit 22 reaches the position displaced leftward by 7° from its center position (NO in Step #132), the rotation of the image pickup unit 22 is stopped (Step #138). In other words, the image pickup unit 22 is rotated leftward in an angle range of 7° or smaller from the center position according to the operation of the optical axis changing lever 9 (or the optical axis changing button 19c) in the high-resolution photographing mode.

On the other hand, if the normal photographing mode is set (NO in Step #130), it is discriminated whether the image pickup unit 22 is in a position displaced leftward by $\Delta\theta h$ smaller than 20° from its center position (Step #134). If $\Delta\theta h<20°$ (YES in Step #134), the image pickup unit 22 is rotated leftward in the horizontal plane (Step #136, loop of Steps #128, #130, #132, #136). When the image pickup unit 22 reaches the position displaced leftward by 20° from its center position (NO in Step #134), the rotation of the image pickup unit 22 is stopped (Step #138). In other words, the image pickup unit 22 is rotated leftward in an angle range of 7° or smaller from the center position according to the operation of the optical axis changing lever 9 (or the optical axis changing button 19c) in the normal photographing mode.

If the switch SL is off or has been turned off (NO in Step #128), the rotation of the image pickup unit 22 is stopped (Step #140).

Subsequently, it is discriminated whether the switch SR has been turned on by operating the optical axis changing lever 9 (or the optical axis changing button 19d) (Step #142), and the rotation of the image pickup unit 22 is controlled substantially in the same manner as the case of the switch SL (Steps #142 to #154). Specifically, the image pickup unit 22 is rotated rightward in an angle range of 7° or smaller from the center position according to the operation of the optical axis changing lever 9 (or the optical axis changing button 19d) in the high-resolution photographing mode (Steps #142 to #146, #150, #152), and the image pickup unit 22 is rotated rightward in an angle range of 20° or smaller from the center position according to the operation of the optical axis changing lever 9 (or the optical axis changing button 19d) in the normal photographing mode (Steps #142, #144, #148, #150, #152). If the switch SR is off or has been turned off (NO in Step #142), the rotation of the image pickup unit 22 is stopped (Step #154).

The leftward and rightward rotatable ranges of the image pickup unit 22 in the high-resolution photographing mode are restricted to $\Delta\theta h<7°$ because an absolute value $|\Delta\theta h|$ of the displacement of the optical axis L of the image pickup unit 22 will not exceed 7° when the partial images are photographed at f1=8 mm as shown in TABLE-1. The leftward and rightward rotatable ranges of the image pickup unit 22 in the normal photographing mode are restricted to $\Delta\theta h<20°$ because the taking lens 231 of the image pickup unit 22 cannot be exposed through the opening 5 of the camera main body 2 if the absolute value $|\Delta\theta h|$ of the displacement of the optical axis L of the image pickup unit 22 exceeds 20°, and therefore photographing cannot be performed. Thus, meaningless operations are avoided by restricting the rotation of the image pickup unit 22 in the horizontal plane to the ranges substantially necessary for the photographing in both photographing modes.

Figure 28:
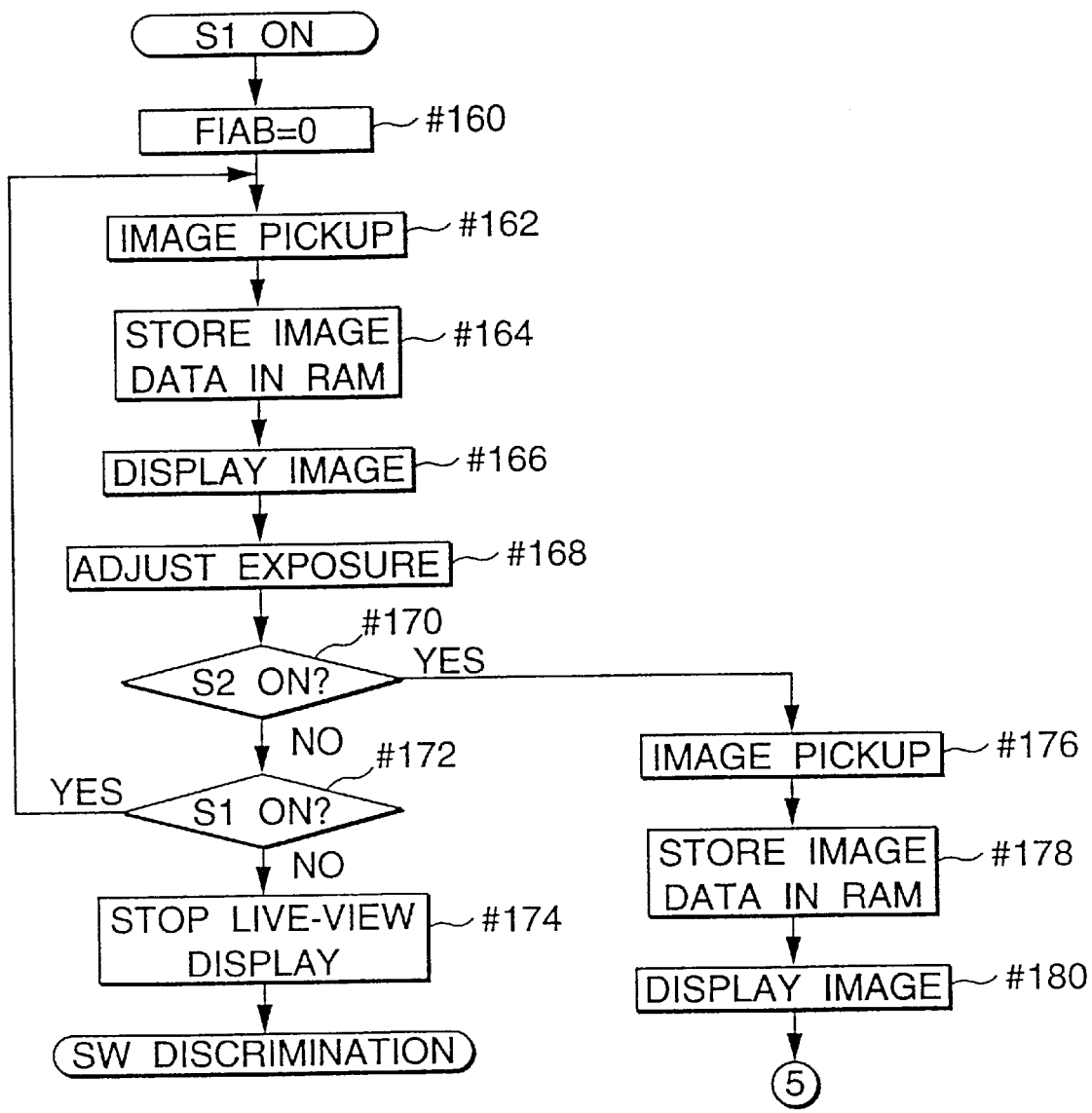
FIGS. 28 and 29 are flowcharts showing a subroutine "S1 ON"
Figure 29:
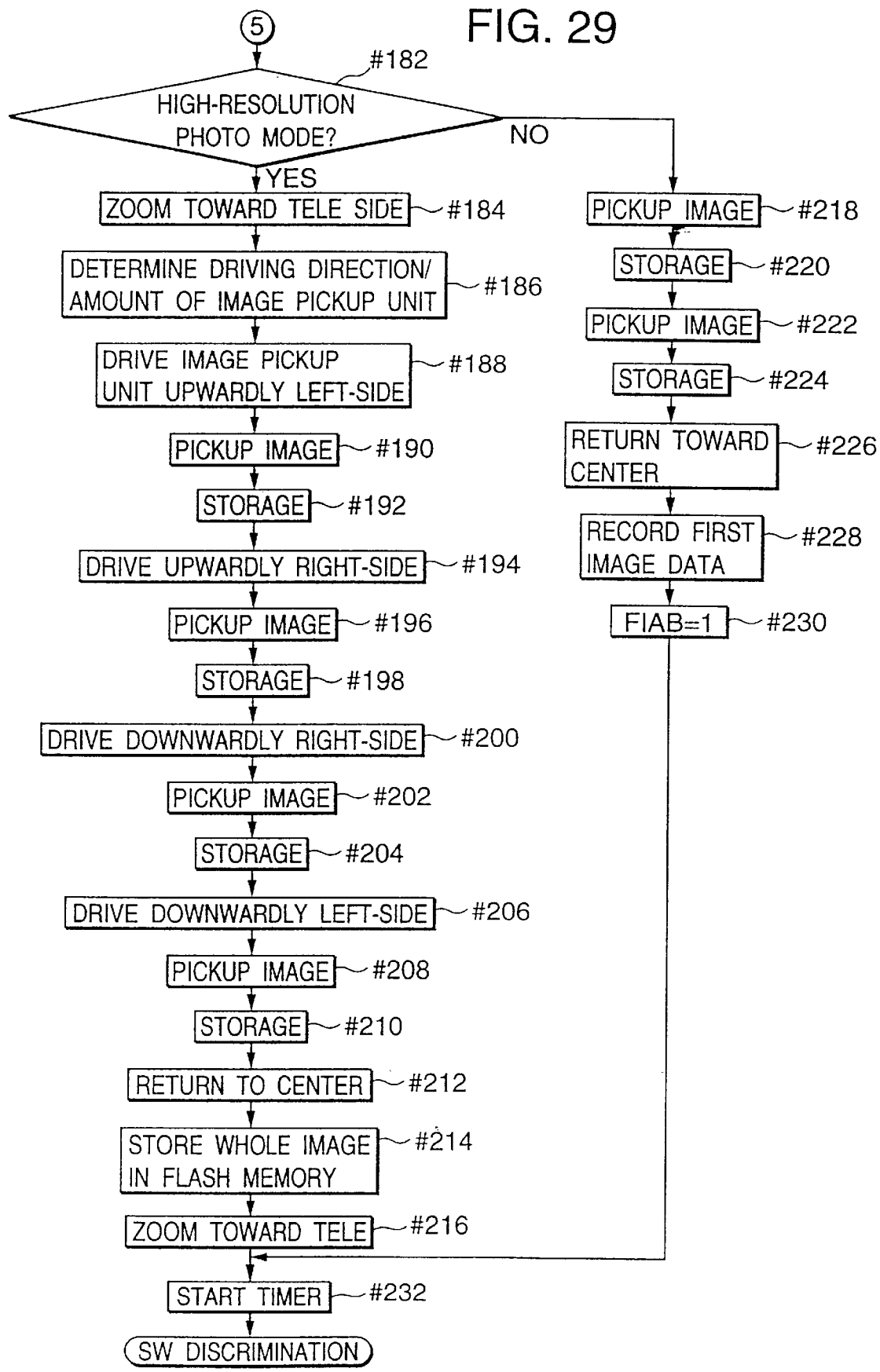

Referring back to FIG. 19, if the switch S1 has been turned on by pressing the release button 8 (or 18) halfway in the SW discrimination (YES in Step #10), a subroutine "S1 ON" shown in FIGS. 28 and 29 is executed to perform photographing.

Upon entering the subroutine "S1 ON", the flag FIAB is first reset to "0"(Step #160). An image pickup operation is performed by the image pickup device 239 (Step #162), and an image signal outputted from the image pickup device is converted into an image data in the A/D converter 206, subjected to specified signal processings in the signal processing unit 208 and temporarily stored in the RAM 209 (Step #164). The image data temporarily stored in the RAM 209 is immediately read out, transferred to the display controller 301 of the LCD device 3 via the cable 11 after the image compression is applied thereto, and displayed on the LCD panel 12 (Step #166). In other words, the live-view display is made on the LCD device 3.

Subsequently, exposure adjustment is performed using the image data temporarily stored in the RAM 209 (Step #168). In the electronic camera 1 according to this embodiment, an aperture value is fixed (e.g., Av=4.0[Ev]) and the exposure control is performed by controlling an exposure time (electric charge storing time) SS of the CCD 239a. This exposure time SS is set based on an object brightness Bv (e.g., an average level value of pixel data of green component) calculated using the image data temporarily stored in the RAM 209. Specifically, since the image is picked up in predetermined cycles (e.g., 1/30 sec.) set in advance in the live-view display, the object brightness Bv is calculated for each picked image and is determined whether it is within a proper range. A next image pickup operation is performed by shortening the presently set exposure time SS by one stage if the object brightness Bv is excessively bright beyond the proper range, while lengthening the presently set exposure time SS by one stage if the object brightness Bv is excessively dark. In this way, such an exposure time SS as to provide the object brightness Bv lying within the proper range can be set.

TABLE-2 is a table used to control the exposure time SS. In TABLE-2, the shaded exposure time SS (11 ms) is an initial value which is set when the camera is activated. Further, minimum and maximum values of the exposure time SS are 0.25 ms and 32 ms, respectively.

TABLE 2

| Exposure Time SS [ms] | Flash Firing |
| --- | --- |
| 0.25 | NO |
| 0.35 | NO |
| 0.50 | NO |
| 1.00 | NO |
| 1.40 | NO |
| 2.00 | NO |
| 2.80 | NO |
| 4.00 | NO |
| 5.60 | NO |
| 8.00 | NO |
| 11.00 | NO |
| 16.00 | NO |
| 22.00 | NO |
| 32.00 | NO |
| 32.00 | YES |

TABLE-3 shows an example of the method for adjusting the exposure time SS based on the object brightness Bv.

In TABLE-3, values of the object brightness Bv are represented by 8-bit data. Brightness is classified into three levels of "high", "medium" and "low". If the average value of the pixel data of green component lies within a "medium" level range (85 to 169), the object brightness Bv is assumed to lie within the proper range and the exposure time SS is not changed. If the average value lies within a "low" level range (0 to 84), underexposure is assumed and the exposure time SS is lengthened by one stage. On the other hand, if the average value lies within a "high" level range (170 to 255), overexposure is assumed and the exposure time SS is shorted by one stage. The flash device 4 is automatically fired when the exposure time SS is 32 ms and the object brightness lies within the "low" level range (Bv=84).

TABLE 3

| Object Brightness Bv | Exposure Time SS |
| --- | --- |
| 170 to 255 | Shortened by one stage |
| 85 to 169 | No change |
| 0 to 84 | Lengthened by one stage |

Accordingly, when the switch S1 is turned on, the first image pickup operation is performed after setting the exposure time SS at the initial value (11 ms). The exposure time SS is adjusted based on the object brightness Bv calculated using the picked image. In other words, the exposure time SS is changed to 8.0 [ms] if $170 \leq Bv \leq 255$ and to 16.0 [ms] if $0 \leq Bv \leq 84$, and is not changed if $85 \leq Bv \leq 169$.

It is then discriminated whether the switch S2 has been turned on (Step #170). If the switch S2 is on, this subroutine returns to Step #162 to repeat the respective operations including the image pickup operation, display and exposure adjustment (loop of Steps #162 to #172) as long as the switch S1 continues to be on (YES in Step #172). If the switch S1 is turned off without the switch S2 being turned on during this time (NO in Step #172), the live-view display on the LCD device 3 is stopped (Step #174) and this subroutine returns to the SW discrimination of the main routine.

On the other hand, if the switch S2 is turned on by fully pressing the release button 8 (or 18) during the live-view display (YES in Step #170), this subroutine proceeds to Step #176 to pick up the image and to record the picked image in the flash memory 212.

More specifically, the image pickup operation is performed by the image pickup device 239 at the exposure time SS adjusted immediately before (Step #176). The image signal outputted from the image pickup device 239 is converted into an image data by the A/D converter 206, and temporarily stored in the RAM 209 after being subjected to the specified signal processings in the signal processing unit 208 (Step #178). Since the RAM 209 has a storage capacity of five frames of images as described above, this image data is stored in the first image storage area.

The image data temporarily stored in the RAM 209 is immediately read out, transferred to the display controller 301 of the LCD device 3 via the cable 11 after the image compression is applied thereto, and displayed on the LCD panel 12 (Step #180). In other words, the picked image is displayed on the LCD device 3 so that the photographer can monitor the picked image.

Subsequently, the set photographing mode is discriminated (Step #182). The high-resolution photographing operation is performed in Steps #184 to #216, and #232 if the high-resolution photographing mode is set (YES in Step #182), while the normal photographing operation is performed in Steps #218 to #232 if the normal photographing mode is set.

Upon proceeding to the high-resolution photographing operation, the taking lens 231 is zoomed toward the telephoto side at a specified focal length ratio K (=f2/f1) (#184, see TABLE-1), and photographing is performed four times for an upper left section (partial image $G_A$), an upper right section (partial image $G_B$), a lower right section (partial image $G_D$) and a lower left section (partial image $G_C$) of the object Q of FIG. 5 in this order (Steps #186 to #210).

More specifically, the driving direction and amount of the image pickup unit 22 are determined for the respective partial images $G_A$ to $G_D$ (Step #186). First, the image pickup unit 22 is so driven that the optical axis thereof is aligned with a direction (a in FIG. 5) in which the partial image $G_A$ is picked up (Step #188), and the partial image $G_A$ is picked up by the image pickup device 239 (Step #190). This picked image is converted into an image data by the A/D converter 206 and temporarily stored in the second image storage area of the RAM 209 after being subjected to the specified signal processings in the signal processing unit 208 (Step #192).

Secondly, the image pickup unit 22 is so driven that the optical axis thereof is aligned with a direction (b in FIG. 5) in which the partial image $G_B$ is picked up (Step #194), and the partial image $G_B$ is picked up by the image pickup device 239 (Step #196). This picked image is converted into an image data by the A/D converter 206 and temporarily stored in the third image storage area of the RAM 209 after being subjected to the specified signal processings in the signal processing unit 208 (Step #198). Thirdly, the image pickup unit 22 is so driven that the optical axis thereof is aligned with a direction (d in FIG. 5) in which the partial image $G_D$ is picked up (Step #200), and the partial image $G_D$ is picked up by the image pickup device 239 (Step #202). This picked image is converted into an image data by the A/D converter 206 and temporarily stored in the fourth image storage area of the RAM 209 after being subjected to the specified signal processings in the signal processing unit 208 (Step #204). Finally, the image pickup unit 22 is so driven that the optical axis thereof is aligned with a direction (c in FIG. 5) in which the partial image $G_C$ is picked up (Step #206), and the partial image $G_C$ is picked up by the image pickup device 239 (Step #208). This picked image is converted into an image data by the A/D converter 206 and temporarily stored in the fifth image storage area of the RAM 209 after being subjected to the specified signal processings in the signal processing unit 208 (Step #210).

After all partial images $G_A$ to $G_B$ are picked up, the image pickup unit 22 is returned to its center position (Step #212) and the five image data (the image G of the whole object photographed first and image data of the four partial images $G_A$ to $G_D$) temporarily stored in the RAM 209 are recorded in the flash memory 212 via the record/readout unit 211 after being compressed by the expansion/compression unit 210. At this stage, independent image files are generated for the whole image G and the partial images $G_A$ to $G_D$ and recorded in the flash memory 212 (Step #214). Further, the taking lens 213 is zoomed toward the wide-angle side so as to attain the original focal length (i.e., from the focal length f2 for photographing the partial images to the focal length f1 for photographing the whole image) (Step #216). While the image data of the photographed image is being recorded, non-image data concerning this photographed image (e.g., pieces of information on the photographing mode information and the date of photographing) are also recorded.

Figure 30:
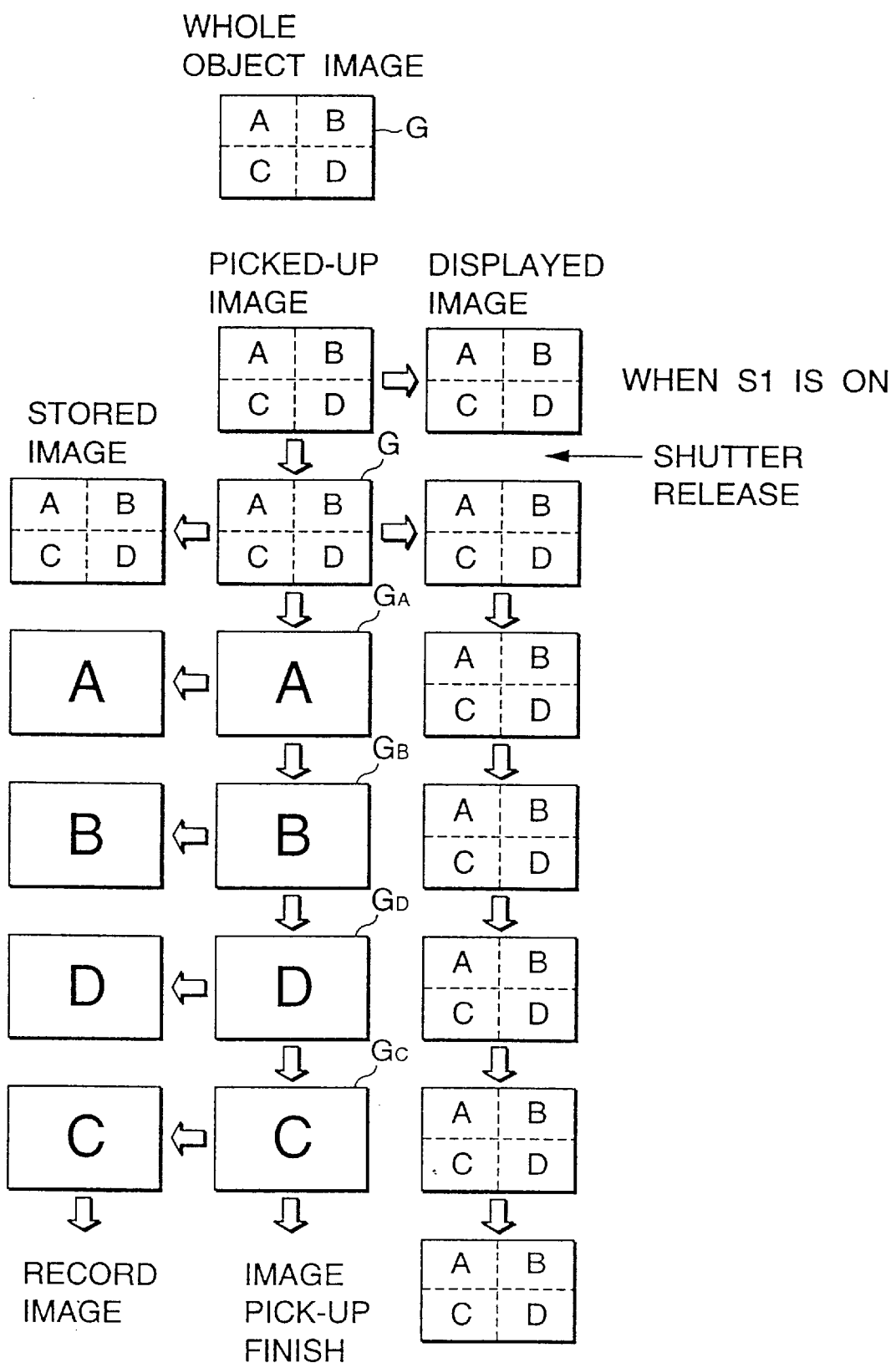
FIG. 30 is a diagram showing the photographing operation in a high-resolution photographing mode.

FIG. 30 is a diagram showing the photographing operation (Steps #160 to #170, #176 to #216) in the high-resolution photographing mode described above.

In FIG. 30, A, B, C and D in the whole image G are images included in the partial images $G_A$ to $G_D$; the display images are images displayed on the LCD device 3; and the stored images are images temporarily stored in the RAM 209.

As shown in FIG. 30, the whole object image G is picked up when the switch S1 is on and the picked image is displayed on the LCD device 3. When exposure is instructed, the whole image G of the object is picked up, stored in the RAM 209 and displayed on the LCD device 3 for monitoring purpose. Subsequently, the partial images $G_A$ to $G_D$ are picked up in the order of $G_A$, $G_B$, $G_D$, $G_C$ and stored in the RAM 209. On the other hand, the whole image G continues to be displayed on the LCD device 3 without displaying the partial images $G_A$ to $G_C$. The partial images $G_A$ to $G_D$ are not displayed for monitoring purpose because the photographer normally wishes to photograph the whole object and monitor the photographed image (whole image of the object) in the high-resolution mode.

FIG. 31 is a diagram showing the configuration of an image file of the whole image G or the partial image $G_A$ to $G_D$ recorded in the flash memory 212.

Each image file is comprised of a header AR1 and an image recording portion AR2. Various pieces of information (non-image data) of the recorded image such as the information concerning the photographing mode, the date of photographing, the title of the image and the exposure time SS are recorded in the header AR1, and the image data of the photographed image is recorded in the image recording portion AR2.

As pieces of information concerning the photographing mode, the photographing mode information, image type information, image position information, frame number and focal length are recorded in the form of bit-data as shown in TABLE-4.

TABLE 4

| | PHOTO. MODE (N/HR) | IMAGE TYPE (W/P) | POSITION INFO. | FRAME NUMBER | FOCAL LENGTH |
|---|---|---|---|---|---|
| Normally Photographed Image HR | 0 | — | — | **** | f1 |
| Whole Image (G) | 1 | 1 | — | #### | f1 |
| Partial Image ($G_A$) Image | 1 | 0 | 00 | #### | f2 |
| Partial Image ($G_B$) | 1 | 0 | 01 | #### | f2 |
| Partial Image ($G_C$) | 1 | 0 | 10 | #### | f2 |
| Partial Image ($G_D$) | 1 | 0 | 11 | #### | f2 |

Note) Photographing Mode:
"0" Normal Photographing
"1" High-Resolution Photographing
Image Type:
"1" Whole Image,
"0" Partial Image
Focal Length: f1, f2 see TABLE 1 (4-bit data)
"—": unused data The photographing mode information is a 1-bit data used to distinguish the normal photographing mode and the high-resolution photographing mode from each other. For example, it indicates the high-resolution photographing mode when being set at "1" while indicating the normal photographing mode when being set at "0". The image type information is an information used to distinguish the five images, i.e., one whole image and four partial images photographed in the high-resolution photographing mode from each other. This information is also a 1-bit data. For example, it indicates the whole image when being set at "1" in while indicating the partial image when being set at "0". The position information is an information indicating to which position of the whole image the partial image corresponds. Since the whole object is divided into four sections in this embodiment, the position information is comprised of a 2-bit data. For example, bit data "00", "01", "10" and "11" are allotted to the upper left, upper right, lower left and lower right sections of the whole image. It should be noted that any desired method for allotting the bit data can be employed.

The frame number is an information used to discriminate to the whole image of which frame number the partial image belongs. A frame number comprised of 4-bit data is given to each photographed image. Since the frame number of the whole image G is "####" in TABLE-4, the frame numbers of the corresponding partial images $G_A$ to $G_C$ are also "####". The focal length information indicates the focal length of the taking lens 231 at the time of photographing. Since the whole image is photographed at the focal length f1 and the partial images are photographed at the focal length of f2 (=K·f1) as shown in TABLE-1 in the high-resolution photographing mode, the corresponding focal length f1 or f2 is recorded in the form of, e.g., 4-bit data in each image file.

All image data are recorded as independent image files in the flash memory 212 regardless of the photographing mode as described above. However, since the photographing mode information is recorded in the header AR1 of each image file, there is no likelihood that the relation of the partial image $G_1$ (i=A, B, C, D) photographed in the high-resolution photographing mode to the other partial images Gi and the whole image G becomes unclear. The images can be reliably searched, for example, in the case that a whole image G' is generated by combining the partial images $G_A$ to $G_D$ by a computer system.

Referring back to FIG. 29, upon the completion of the zooming of the taking lens 231 toward the wide-angle side (Step #216), the display timer starts counting a time during which the photographed image is displayed on the LCD device 3 for monitoring purpose (Step #232), and this subroutine returns to the SW discrimination (see FIG. 19).

On the other hand, upon entering the normal photographing operation in Step #182, photographing is successively performed twice (Steps #218, #222). The respective photographed images are converted into image data in the A/D converter 206, and temporarily stored in the second and third image storage areas of the RAM 209 after being subjected to the specified signal processings in the signal processing unit 208 (Steps #220, #224). This continuous photographing is the aforementioned automatic bracket-photographing.

Subsequently, the image pickup unit 22 is returned to its center position (Step #226) and, among the three image data temporarily stored in the RAM 209, the image data stored in the first image storage area is recorded as an independent image file in the flash memory 212 via the record/readout unit 211 (Step #228) after being compressed in a specified manner in the expansion/compression unit 210. Then, the flag FIAB is set to "1" (Step #230) and this subroutine returns to the SW discrimination (see FIG. 19) after counting by the display timer is started (Step #232).

The flag FIAB is set to "1" in order to enter the subroutine "Image Selection" shown in FIG. 32 in the aforementioned Step #38 and to enable a change or addition of the recorded image in the flash memory 212 based on the operation of the bracket-photographing confirmation button 15.

Here, the processing performed in the subroutine "Image Selection" is described.

Upon entering the subroutine "Image Selection", it is discriminated whether any of the switches SU, SD, SL, SR has been turned on by operating the optical axis changing lever 9 (or the optical axis changing buttons 19a to 19d) (Steps #240, #244, #248, #254). If none of the switches is on, it is discriminated whether the switch SCHG has been turned on by operating the bracket-photographing confirmation button 15 (Step #258). Unless the switch SCHG is on (NO in Step #258), this subroutine returns to Step #240 to repeat the discrimination as to the change in the state of the switches SU, SD, SL, SR. If the switch SCHG is on (YES in Step #258), this subroutine returns to the SW discrimination (see FIG. 19).

If the switch SU is on (YES in Step #240), the image displayed on the LCD device 3 is changed to one preceding picked image (Step #242). If the switch SD is on (YES in Step #244), the image displayed on the LCD device 3 is changed to one succeeding picked image (Step #256).

If the switch SL is on (YES in Step #248), the first image file recorded in the flash memory 212 is deleted (Step #250), and the photographed image displayed on the LCD panel 12 is recorded in this image file (Step #252). Further, if the switch SR is on (YES in Step #254), the photographed image displayed on the LCD panel 12 is newly recorded in addition to the first image file recorded in the flash memory 212 (Step #256).

Figure 33:
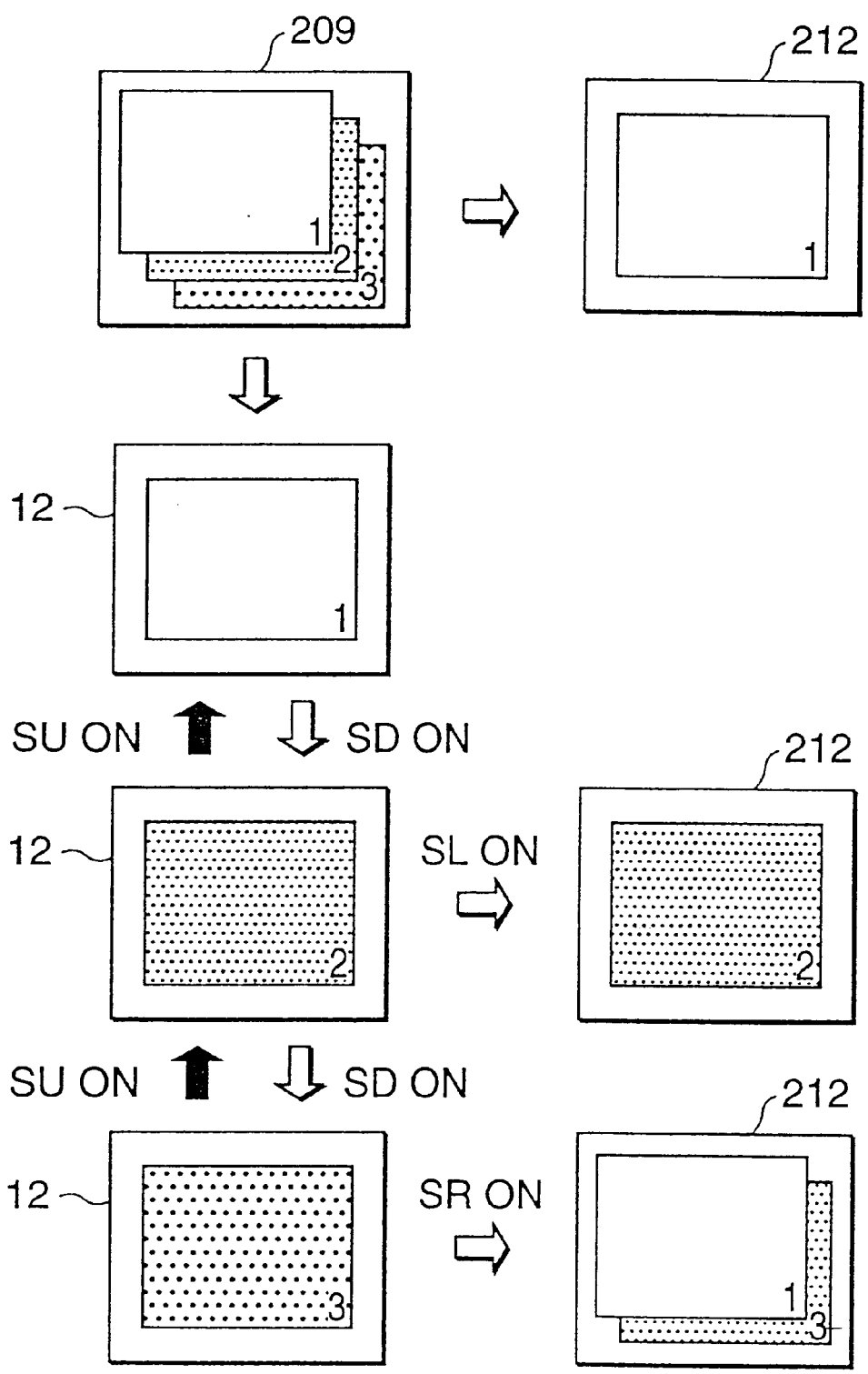
FIG. 33 is a diagram showing selection of a recorded image in a normal photographing mode.

FIG. 33 is a diagram showing the processing performed in the subroutine "Image Selection". Upon the completion of photographing in the normal photographing mode, the first picked image stored in the RAM 209 is displayed on the LCD panel 12 for monitoring purpose and is recorded in the flash memory 212 (see operations in Steps #180 and #228). If the switch SD is turned on by pressing the downward extending part of the optical axis changing lever 9 (or the optical axis changing button 19b) in this state, the image displayed on the LCD panel 12 is changed in the order of $1^{st} \to 2^{nd} \to 3^{rd} \to 1^{st}$ (descending order) as shown by white arrows in FIG. 33 every time the switch SD is turned on. On the other hand, if the switch SU is turned on by pressing the upward extending part of the optical axis changing lever 9 (or the optical axis changing button 19a), the image displayed on the LCD panel 12 is changed in the order of $1^{st} \to 3^{rd} \to 2^{nd} 1^{st}$ (ascending order) as shown in black arrows in FIG. 33 every time the switch SU is turned on.

For example, if the switch SL is turned on by operating the leftward extending part of the optical axis changing lever 9 (or the optical axis changing button 19c) with the second photographed image displayed on the LCD panel 12, the first photographed image recorded in the flash memory 212 is deleted and the second photographed image is recorded in the flash memory 212 instead. Further, if the switch SR is turned on by operating the rightward extending part of the optical axis changing lever 9 (or the optical axis changing button 19d) with the third photographed image displayed on the LCD panel 12, the first photographed image recorded in the flash memory 212 is deleted and the third photographed image is recorded in the flash memory 212 instead.

As described above, photographing is successively performed three times even if the photographer instructs the exposure once. The photographed images are temporarily stored in the RAM 209 and the first photographed image is recorded in the flash memory 212. If the photographer instructs the next exposure without operating the bracket-photographing confirmation button 15, photographing is successively performed three times again. The photographed images are temporarily stored in the RAM 209 and the first photographed image is recorded in the flash memory 212.

Accordingly, the first photographed image is recorded in the flash memory 212 as long as the photographer operates the release button 8 (or 18) without operating the bracket-photographing confirmation button 15. Thus, the automatic bracket-photographing function is substantially hidden and an operation similar to the normal photographing operation (one photographing during one exposure) is performed. On the other hand, if the photographer operates the bracket-photographing confirmation button 15 after the completion of photographing, thereby setting the confirmation mode in which the recorded image can be changed or added, the automatic bracket-photographing function starts acting, and the content recorded in the flash memory 212 can be changed or added as the photographer operates the optical axis changing lever 9 (or the optical axis changing buttons 19a to 19d).

Specifically, the photographer can decide whether the photographed image is satisfactory if necessary since he can choose the use of the automatic bracket-photographing function immediately after the completion of photographing. A more satisfactory photographed image can replace the recorded image or can be added according to the result of decision. Therefore, photographing failure occurs at a reduced frequency and operability can be improved.

Although three consecutive photographing operations are simply performed in the automatic bracket-photographing in this embodiment, photographing may be successively performed while slightly changing the exposure time SS in each photographing operation. Alternatively, photographing may be successively performed while changing the in-focus condition or the focal length of the taking lens 231 or changing the direction of the optical axis of the image pickup unit 22. Since the RAM 209 has a storage capacity capable of storing five images, photographing may be performed five times one after another and the images to be recorded may be selected from the photographed images.

Figure 34:
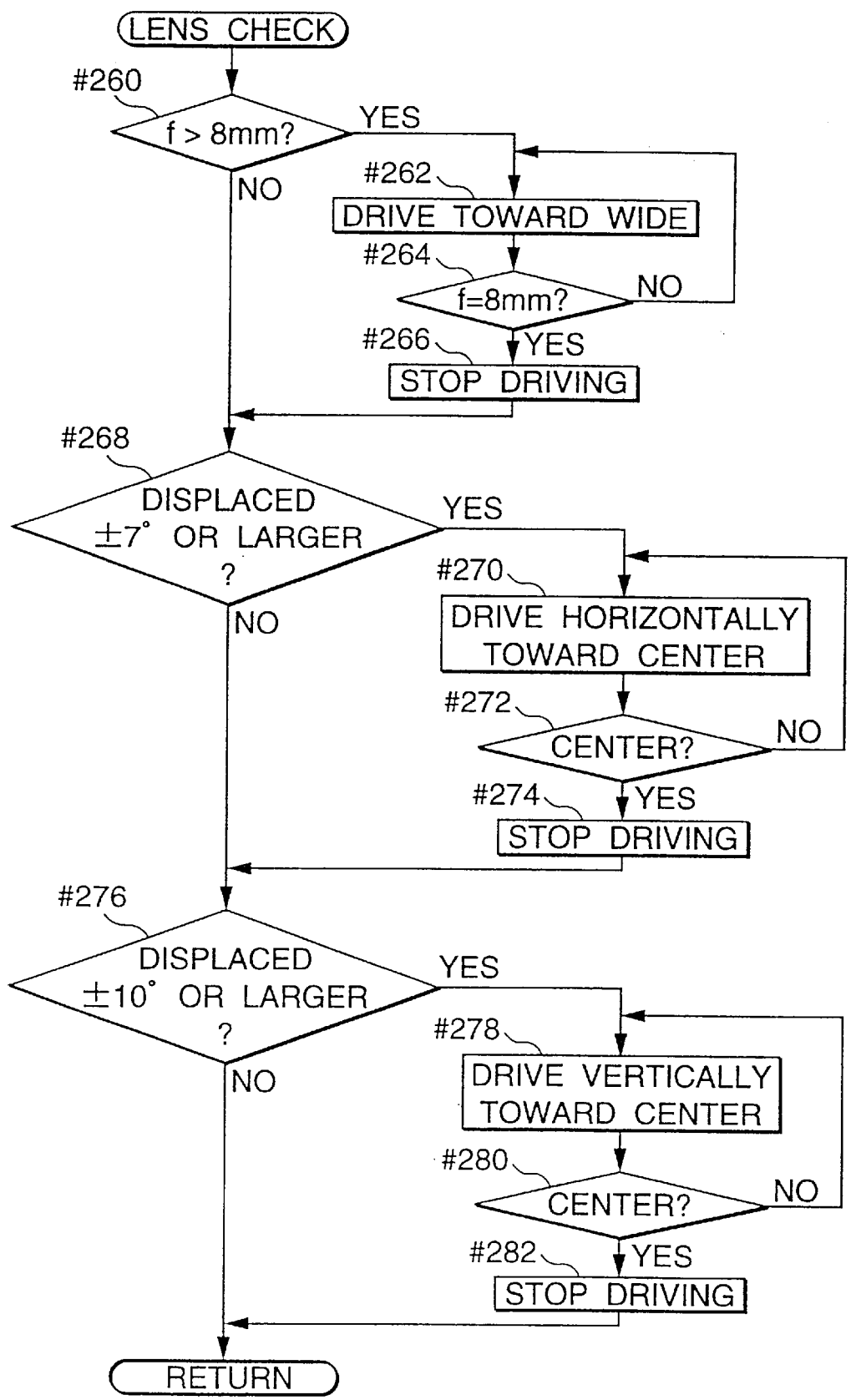
FIG. 34 is a flowchart showing a subroutine "Lens Check"

Referring back to FIG. 20, if the high-resolution photographing mode has been set by operating the photographing mode switch 14 in the SW discrimination (YES in Step #24), a subroutine "Lens Check" shown in FIG. 34 is executed to adjust the position of the image pickup unit 22 and the focal length of the taking lens 231 (Step #26).

Upon entering the subroutine "Lens Check", it is discriminated whether the focal length f of the taking lens 231 exceeds 8 mm (Step #260). If f>8 mm (YES in Step #260), the focusing lens 231a of the taking lens 231 is driven toward the wide-angle side until f=8 mm (Steps #262, #264, #266).

If f=8 mm (NO in Step #260), it is discriminated whether the position of the image pickup unit 22 is displaced in the horizontal plane by ±7° or larger with respect to a vertical plane including the center position (Step #268). If the displacement is larger than ±7° (YES in Step #268), the image pickup unit 22 is driven in the horizontal plane so as to be set in the vertical plane including the center position (Steps #270, #272, #274).

Subsequently, it is discriminated whether the position of the image pickup unit 22 is displaced in the vertical plane by ±10° or larger with respect to the horizontal plane including the center position (Step #276). If the displacement is larger than ±10° (YES in Step #276), the image pickup unit 22 is driven in the vertical plane so as to be set in the horizontal plane including the center position (Steps #278, #280, #282). Then, this subroutine returns to the main routine.

This processing in the subroutine "Lens Check" is performed to adjust the position of the image pickup unit 22 and the focal length f of the taking lens 231 so as to enable photographing in the high-resolution photographing mode since the whole image G of the object is picked up by setting the image pickup unit 22 in its center position and setting the focal length f of the taking lens 231 to 8 mm or shorter as shown in TABLE-1 in the high-resolution photographing mode. Specifically, the focal length f of the taking lens 231 is set at its maximum value of 8 mm, and the image pickup unit 22 is set in its center position (where the optical axis L extends in the front direction) if displacements of the optical axis L of the image pickup unit 22 lie beyond the ranges Δθh, Δθv when f=8 mm. Thus, high-resolution photographing can be securely performed by automatically setting the position of the image pickup unit 22 and the focal length f of the taking lens 231 even in the case that the photographer has not changed the focal length f.

Next, processing performed in the reproduction mode is described. Upon entering the subroutine "Reproduction Mode" shown in FIG. 35 in Step #6, the photographed image of frame No. 1 recorded in the flash memory 212 is read by the record/readout unit 211, expanded in the expansion/compression unit 210, transferred to the display controller 301 in the LCD device 3 via the cable 11, and reproduced and displayed on the LCD panel 12 (Step #290).

Subsequently, changes in the states of the switches SM, SP/R, SU, SD, SR, SL, SCHG, SDEL are successively discriminated (Steps #292, #294, #296, #300, #304, #314, #322, #336).

If the change in the state is discriminated for none of the switches, this subroutine returns to Step #292 to repeat the discrimination as to the changes in the states of the switches SM to SDEL (hereinafter, "RSW discrimination") (loop of Steps #292, #294, #296, #300, #304, #314, #322, #336).

In the RSW discrimination, this subroutine returns to Step #2 of the main routine (see FIG. 19) if the main switch SM is turned off (Step #292) or the set state of the record/reproduction mode switch 13 is changed (YES in Step #294).

If the switch SU is turned on by operating the optical axis changing lever 9 (or the optical axis changing button 19a) (YES in Step #296) while the reproduction mode is set, the photographed image of the next frame number is read from the flash memory 212 by the record/readout unit 211, expanded in the expansion/compression unit 210, transferred to the display controller 301 in the LCD device 3 via the cable 11, and reproduced and displayed on the LCD panel 12 (Step #298).

If the switch SD is turned on by operating the optical axis changing lever 9 (or the optical axis changing button 19b) (YES in Step #300), the photographed image of the preceding frame number is read from the flash memory 212 by the record/readout unit 211, expanded in the expansion/compression unit 210, transferred to the display controller 301 in the LCD device 3 via the cable 11, and reproduced and displayed on the LCD panel 12 (Step #302).

Figure 37:
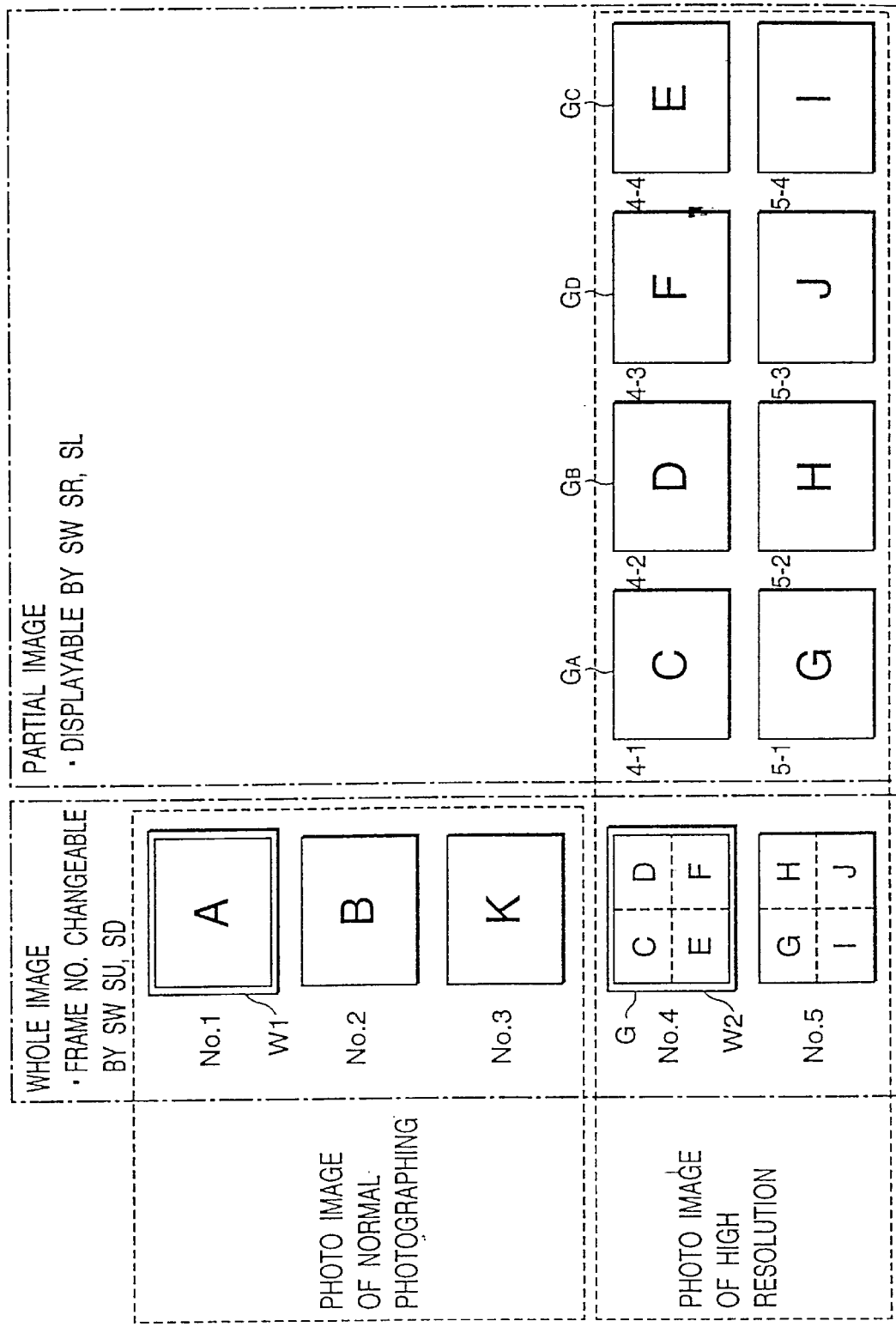
FIG. 37 is a diagram showing an image displayed on an LCD device in reproduction of a recorded image.

Specifically, as shown in FIG. 37, the photographed images recorded in the flash memory 212 are successively reproduced on the LCD panel 12 in an increasing order of the frame numbers (ascending direction) every time the switch SU is turned on or in a decreasing order of the frame numbers (descending direction) every time the switch SD is turned on. In this case, among the images of No. 4 and No. 5 photographed in the high-resolution photographing mode, only the whole images G are reproduced on the LCD panel 12, but the partial images $G_1$ (No. 4-1 to 4-4, No. 5-1 to 5-4) are not reproduced thereon. The partial images $G_1$ planned to be combined are not reproduced since an operator is thought to be demanding to monitor the photographed images (i.e., whole object images in the high-resolution photographing mode). Further, the images to be reproduced on the LCD panel 12 are fitted with frames W1, W2 (see frames in No. 1 and No. 4). The operator is enabled to distinguish in which photographing mode the image was photographed by differing the color of the frame W1 for the image photographed in the normal photographing mode and that of the frame W2 for the image photographed in the high-resolution photographing mode from each other.

Referring back to FIG. 35, if the switch SR is turned on by operating the optical axis changing lever 9 (or the optical axis changing button 19d (YES in Step #304), it is discriminated whether the image displayed on the LDC panel 12 was photographed in the high-resolution photographing mode based on the photographing mode information thereof (Step #306). If this image is not an image photographed in the high-resolution photographing mode (NO in Step #306), this subroutine proceeds to Step #314. Unless otherwise (YES in step #306), it is discriminated whether this image is a whole image G based on the photographing mode information (Step #308).

If the reproduced image is a whole image G (YES in step #308), the first picked partial image $G_A$ is read from the flash memory 212 by the record/readout unit 211, expanded in the expansion/compression unit 210, transferred to the display controller 301 in the LCD device 3 via the cable 11, and reproduced and displayed on the LCD panel 12 (Step #310). If the reproduced image is a partial image $G_1$ (i=A, B, C, D) (NO in Step #308), the partial image $G_1$ photographed next to the reproduced partial image $G_1$ is read from the flash memory 212 by the record/readout unit 211, expanded in the expansion/compression unit 210, transferred to the display controller 301 in the LCD device 3 via the cable 11, and reproduced and displayed on the LCD panel 12 (Step #312).

Specifically, if the image reproduced and displayed on the LCD panel 12 is an image photographed in the high-resolution photographing mode, the partial images $G_1$ are cyclically reproduced on the LCD panel 2 in the order of $G_A$ (upper left image), $G_B$ (upper right image), $G_D$ (lower right image) and $G_C$ (lower left image) every time the switch SR is turned on. For example, if the operator inclines the optical axis changing lever 9 toward the right (or presses the optical axis changing button 19d) with the whole image G of No. 4 in FIG. 37 displayed on the LCD panel 12, the partial images $G_1$ are cyclically reproduced on the LCD panel 2 in the order of No. 4-1→No. 4-2→No. 4-3→No. 4-4→No. 4-1 every time the operator operates the lever 9 (or the button 19d).

Framing is also applied when the partial images $G_1$ are displayed on the LCD panel 12. The operator is enabled to distinguish the reproduced partial images from the reproduced whole images by differing the color of the frames from those of the images photographed in the normal and high-resolution photographing modes.

Although the content of the reproduced image is made distinguishable by providing the images displayed on the LCD panel 12 with the frames W1, W2 of different colors in this embodiment, it may be done so by displaying, for example, the frame numbers, the character information of the photographing mode or pictorial symbols.

Referring back to FIG. 36, if the switch SL is turned on by operating the optical axis changing lever 9 (or the optical axis changing button 19c) (YES in Step #314), it is discriminated whether the image displayed on the LCD panel 12 is an image photographed in the high-resolution photographing mode based on its photographing mode information (Step #316). Unless this image is an image photographing in the high-resolution photographing mode (NO in Step #316), this subroutine proceeds to Step #322. If so (YES in Step #316), it is discriminated whether the image reproduced on the LCD panel 12 is a partial image $G_1$ based on the photographing mode information (Step #318).

This subroutine proceeds to Step #322 if the reproduced image is the whole image G (No in Step #318). If the reproduced image is a partial image $G_1$ (YES in Step #318), the whole image G corresponding to this partial image $G_1$ is read from the flash memory 212 by the record/readout unit 211, expanded in the expansion/compression unit 210, transferred to the display controller 301 in the LCD device 3 via the cable 11, and reproduced and displayed on the LCD panel 12 (Step #320).

Specifically, if the image reproduced on the LCD panel 12 is a partial image $G_1$ photographed in the high-resolution photographing mode, the partial image $G_1$ reproduced on the LCD panel 12 is switched to its corresponding whole image G when the switch SL is turned on. For example, if the operator inclines the optical axis changing lever 9 to the left (or presses the optical axis changing button 19c) with the partial image $G_A$ of No. 4-1 in the example of FIG. 37 displayed on the LCD panel 12, the whole image G of No. 4 is reproduced on the LCD panel 12. Even if the operator inclines the optical axis changing lever 9 to the left (or presses the optical axis changing button 19c) with the whole image G of No. 4 reproduced on the LCD panel 12, the whole image G of No. 4 continues to be displayed without changing the display content of the LCD panel 12.

If the switch SCHG is turned on by operating the bracket-photographing confirmation button 15 with the reproduction mode set (YES in step #322), it is discriminated whether the image displayed on the LCD panel 12 is an image photographed in the high-resolution photographing mode based on its photographing mode information (Step #324). Unless this image is an image photographed in the high-resolution photographing mode (NO in Step #324), this subroutine proceeds to Step #336. If so (YES in Step #324), it is discriminated whether the image reproduced on the LCD panel 12 is a whole image G based on the photographing mode information (Step #326).

If the reproduced image is a whole image G (YES in Step #326), the content of the "photographing mode information" recorded in the header of the corresponding image file of the flash memory 212 is changed from "high-resolution photographing mode" to "normal photographing mode" (Step #328). In other words, the bit data representing the photographing mode information is changed from "1" to "0" (see TABLE-4).

Further, the image files of the four partial images $G_1$ corresponding to the whole image G in the flash memory 212 are all deleted (Step #330). If the reproduced image is a partial image $G_1$ (NO in Step #326), the image of this partial image $G_1$ is copied in the flash memory 212 (Step #332), and the content of the "photographing mode information" recorded in the header of the copied image file is changed from "high-resolution photographing mode" to "normal photographing mode" (Step #334).

Specifically, if the image reproduced and displayed on the LCD panel 12 is the whole image G photographing in the high-resolution photographing mode, a group of the image files in the high-resolution photographing mode comprised of the whole image G recorded in the flash memory 212 and the partial images $G_1$ corresponding thereto are changed to the image files in the normal photographing mode by changing the image file of the whole image G to that in the normal photographing mode and deleting the image files of the partial images $G_1$.

If the switch SDEL is turned on by operating the delete button 20 with the reproduction mode set (YES in Step #336), it is discriminated whether the image reproduced and displayed on the LCD panel 12 is an image photographed in the high-resolution photographing mode based on its photographing mode information (Step #338). Unless this image is an image photographed in the high-resolution photographing mode (NO in Step #338), the image file corresponding to the reproduced image is deleted from the flash memory 212 (Step #340).

If the reproduced image is an image photographed in the high-resolution photographing mode (YES in Step #338), it is discriminated whether this image is a whole image G based on the photographing mode information (Step #342). If so (YES in Step #342), the image file of this whole image G and those of the four partial images $G_1$ corresponding thereto are deleted from the flash memory 212 (Steps #344, #346). If the image reproduced on the LCD panel 12 is a partial image $G_1$ (NO in Step #342), the image file of this partial image is deleted from the flash memory 212 (Step #348), and the content of the "photographing mode information" recorded in the headers of the image files of the remaining three partial images $G_1$ and its corresponding whole image G is changed from "high-resolution photographing mode" to "normal photographing mode" in the flash memory 212 (Steps #350, #352).

For example, if the image reproduced on the LCD panel 12 is the partial image $G_A$ of No. 4-1 in the example of FIG. 37, the image file of the partial image $G_A$ is deleted from the flash memory 212, and the content of the "photographing mode information" recorded in the headers of the image files of the remaining partial images $G_B$, $G_D$, $G_C$ of No. 4-2, 4-3, 4-4 and of the image file of the whole image G is changed from "high-resolution photographing mode" to "normal photographing mode".

Next, a method for generating a whole image having a higher resolution than the whole image G by image adhesion and combination using the whole image G and the partial images $G_A$ to $G_D$ photographed in the high-resolution photographing mode is described.

In this embodiment, image combination is performed by a special image processing apparatus or an image processing apparatus constructed by a computer system after photographing in order to reduce a burden of image combination at the time of photographing. Accordingly, a high-resolution image generating system is constructed by the aforementioned electronic camera 1 and the image processing apparatus. It should be noted that the high-resolution image generating system may be constructed only by the electronic camera 1 by providing an image combining function described below in the electronic camera 1. In such an electronic camera 1, a whole image having a higher resolution than the whole image G is generated by adhering and combining the whole image G and the partial images $G_A$ to $G_D$ stored in the RAM 209 after photographing, and this high-resolution image is recorded in the flash memory 212.

Figure 38:
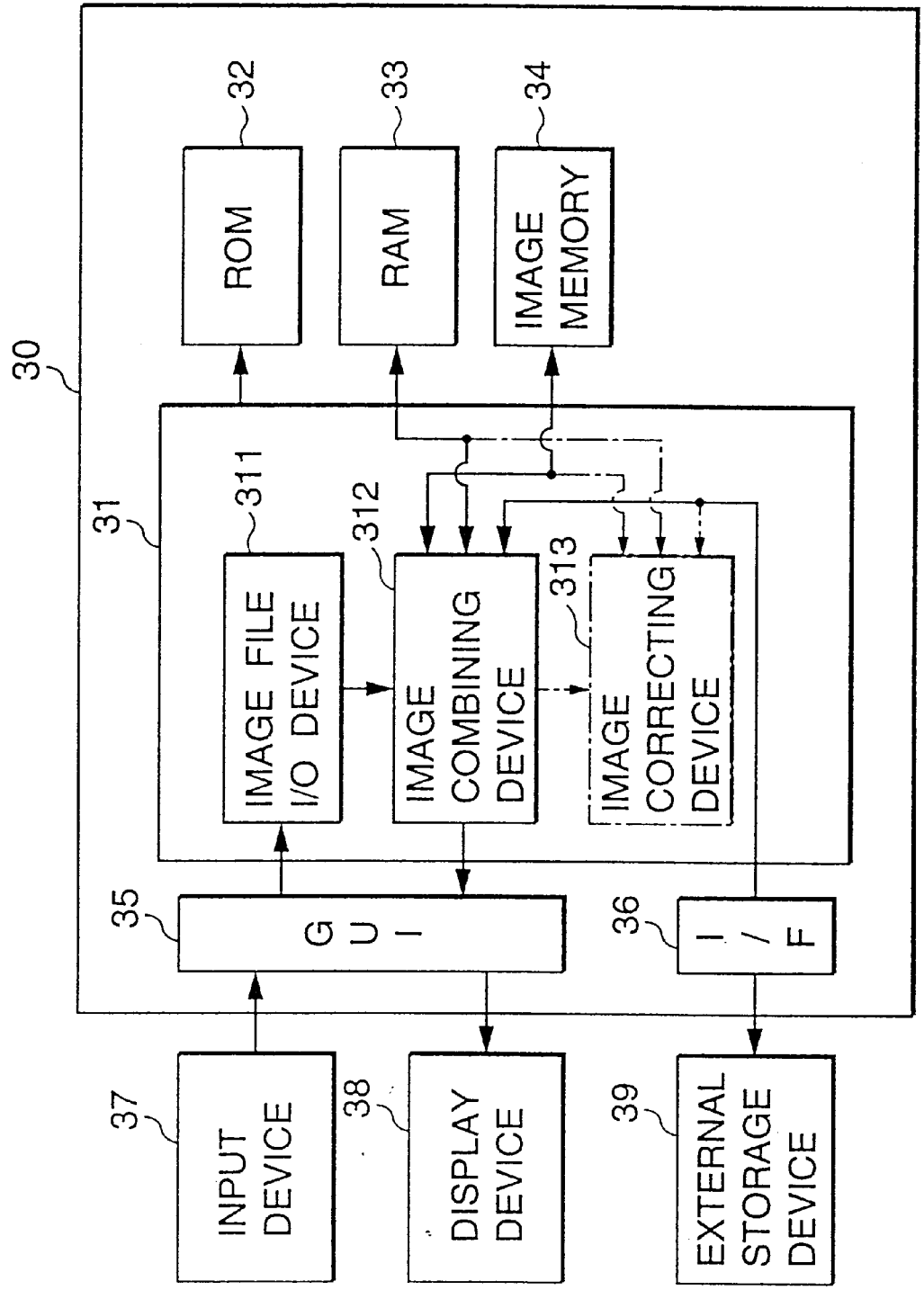
FIG. 38 is a block diagram showing a construction of an image processing unit for generating a high-resolution image.

FIG. 38 is a block construction diagram of an image processing apparatus. The image processing apparatus shown in FIG. 38 is provided with a controller 31, a ROM (read only memory) 32, a RAM (random access memory) 33, an image memory 34, a GUI (graphical user interface) 35, an interface 36, an input device 37, a display device 38 and an external storage device 39. The controller 31, the ROM 32, the RAM 33, the image memory 34, the GUI 35 and the interface 36 are built in an apparatus main body 31, whereas the input device 37 and the display device 38 are connected with the controller 31 via the GUI 35 and the external storage device 39 is connected with the controller 31 via the interface 36.

The controller 31 is provided with an image file input/output device 311 and an image combining device 312 in order to perform the image combination using the whole image G and the partial images $G_A$ to $G_D$.

The image file input/output device 311 reads a color image (electric image) of an image file inputted from the input device 37 from a storage medium (e.g., the external storage device 39 or an internal storage device if there is) in which this image file is stored, and outputs an image data after image combination to a specified output end (storage medium, printer or other peripheral equipment) designated by the input device 37.

The image combining device 312 performs image adhesion/combination using the whole image G and the partial image $G_A$ to $G_D$ read from the flash memory 212 via the external storage device 39 to generate a photographed image of the whole object having a high resolution. This device 312 generates a whole image G" of high resolution by extracting image sections in specified areas to be combined from the respective partial images $G_A$ to $G_D$ while enlarging the whole image G into a whole image G' as described later to determine the size of the image (i.e., frame of the combined image) after the image combination, and adhering the extracted images of the partial images $G_A$ to $G_D$ to the enlarged whole image G' in the determined frame to combine them together.

The ROM 32 is a memory for storing a program for the image combination to be described later. The RAM 33 is a memory for temporarily storing various data calculated during the image combination. The image memory 34 stores the image data read from the flash memory 212 for the image combination. The image memory 34 has a capacity for storing at least 15 frames of image data, and image data constituting the whole image G and the partial images $G_A$ to $G_D$ are stored therein while being separated into respective color components of R (red), G (green) and B (blue).

The display device 38 operates to make various displays including a work menu, processed states and processed results (also including the display of the high-resolution image for monitoring after image combination), and is comprised of a CRT (cathode-ray tube), LCD (liquid crystal display) or like electronic display. On the display device 38, an image correction item is displayed in the form of an icon in the work menu. An operator can cause the image processing apparatus to perform the image combination described later by selecting this icon.

The external storage device 39 is constructed such that the flash memory 212 is detachably mountable therein, and adapted to read the image files recorded in the flash memory 212 and write a newly generated image file in the flash memory 212.

Figure 39:
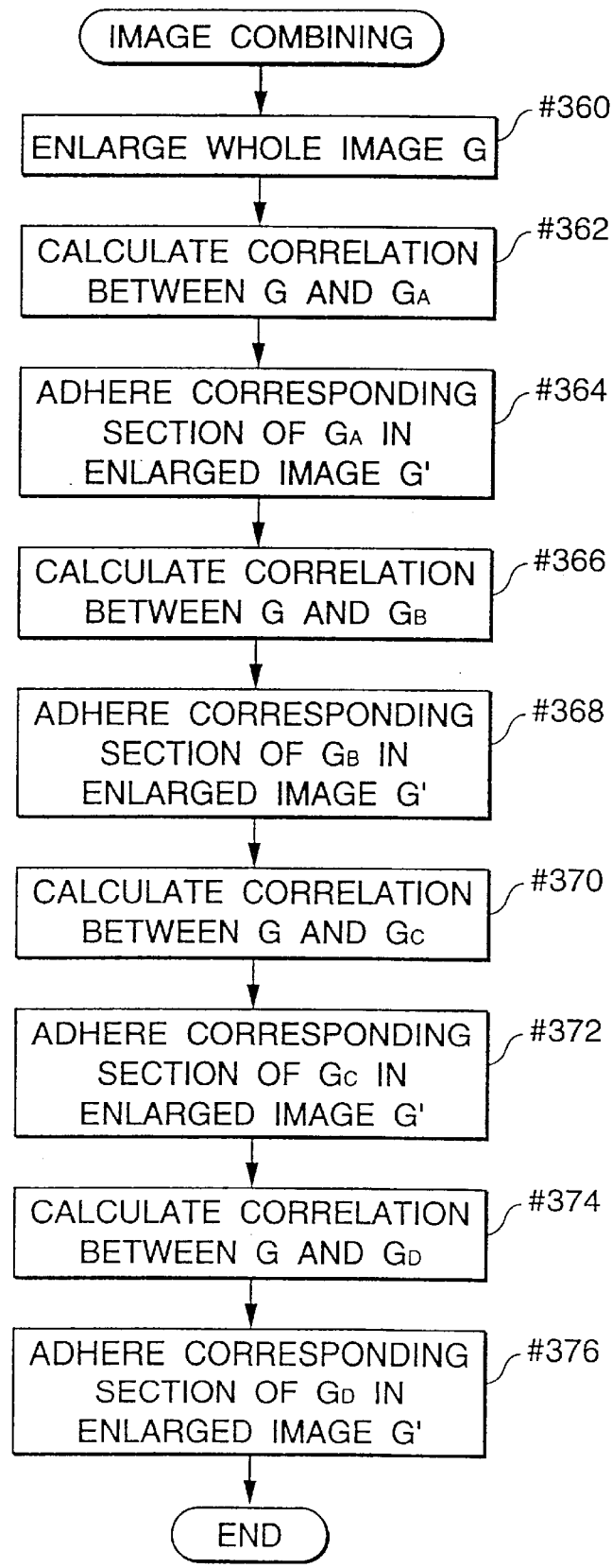
FIG. 39 is a flowchart showing an image combination.
Figure 40:
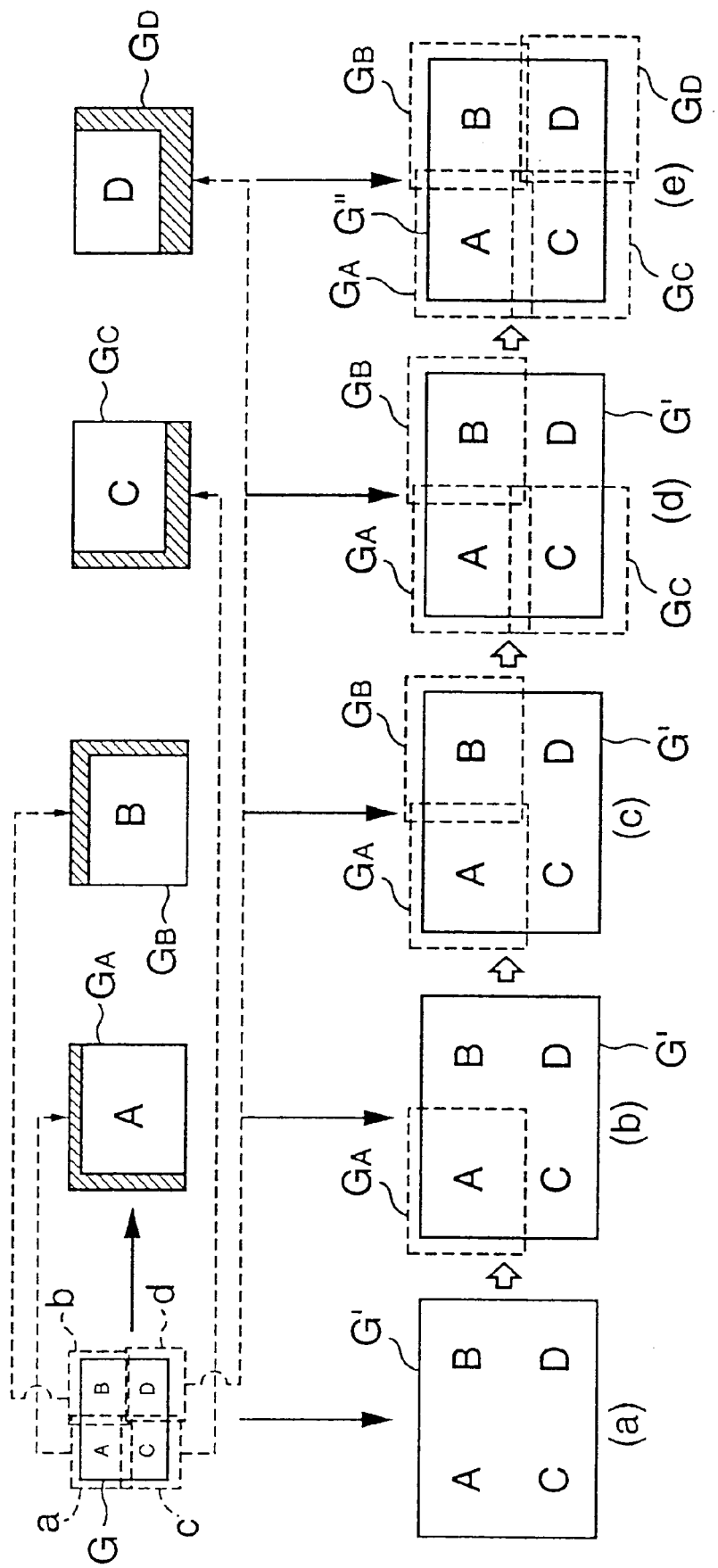
FIG. 40 is a diagram showing a procedure of the image combination.

FIG. 39 is a flowchart showing the image combination performed in the image combining device 312, and FIG. 40 is a diagram showing a procedure of the image combination. In FIG. 40, the partial images $G_A$ to $G_D$ are obtained by enlargedly photographing areas a, b, c, d enclosed by dotted lines for the whole image G. Hatched sections of the respective images show sections outside the frame of the whole image G.

During the image combination, the image files of the images photographed in the high-resolution photographing mode and recorded in the flash memory 212 (i.e., five image files of the whole image G and the partial images $G_A$ to $G_D$) are transferred to the image memory 34 in the image combining device 312, and a combined image of high resolution is generated in accordance with the procedure shown in FIG. 39.

First, the image data is read from the image file of the whole image G and enlarged (Step #360, see FIG. 40(a)).

This enlargement is adapted to conform the size of the whole image G to that of the partial images $G_1$, i.e., to determine the frame of the combined image. In other words, the size of the combined image is determined in advance.

Since the partial images $G_1$ are photographed while being enlarged in relation to the whole image G at a magnification equal to the focal length ratio K as shown in TABLE-4, the whole image G is enlarged at the focal length ratio K in this enlargement.

The focal length ratio K can be obtained by reading the photographing mode information recorded in the image files of the partial images $G_1$. In the case that the focal length ratio K recorded in the image files of the partial images $G_1$ is not used or the focal length ratio K is not recorded in the image files of the partial images $G_1$, the enlarging magnification of the whole image G can be set by performing a correlation calculation while changing the size of the partial images $G_1$ or the whole image G. This method has an advantage of suitably calculating matching positions and performing the image combination even if the sizes of the respective partial images $G_1$ slightly differ from each other due to a variation in the distance to the object caused by the movement of the electronic camera 1 for a certain reason while the partial images $G_1$ are picked up.

Subsequently, the image data is read from the image file of the partial image $G_A$, and correlation between this partial image $G_A$ and the enlarged whole image G' is calculated. Based on this calculation result, a position where the partial image $G_A$ matches the enlarged whole image G' (hereinafter, "matching position") is calculated (Step #362). The image combination is performed in such a manner that a corresponding section of the partial image $G_A$ is adhered in the calculated matching position of the enlarged whole image G' (Step #364, see FIG. 40(b)). In other words, the image data in this matching position of the enlarged whole image G' is replaced by the image data in a corresponding position of the partial image $G_A$.

The correlation calculation is, for example, such that a plurality of characteristic points included in the enlarged whole image G' are extracted and the partial image $G_A$ is compared with the enlarged whole image G' while performing a geometric transformation such as parallel displacement, rotation, or size enlargement/reduction, and an amount of geometric transformation where the characteristic points overlap with the maximum degree is calculated. Since the combined image is generated by replacing the image data in the matching positions of the enlarged whole image G' by the image data of the respective partial images $G_A$ to $G_D$ as described above, the amount of geometric transformation calculated by the correlation calculation serves as an information for providing positions where the partial images $G_A$ to $G_D$ are combined (i.e., matching positions).

Figure 41:
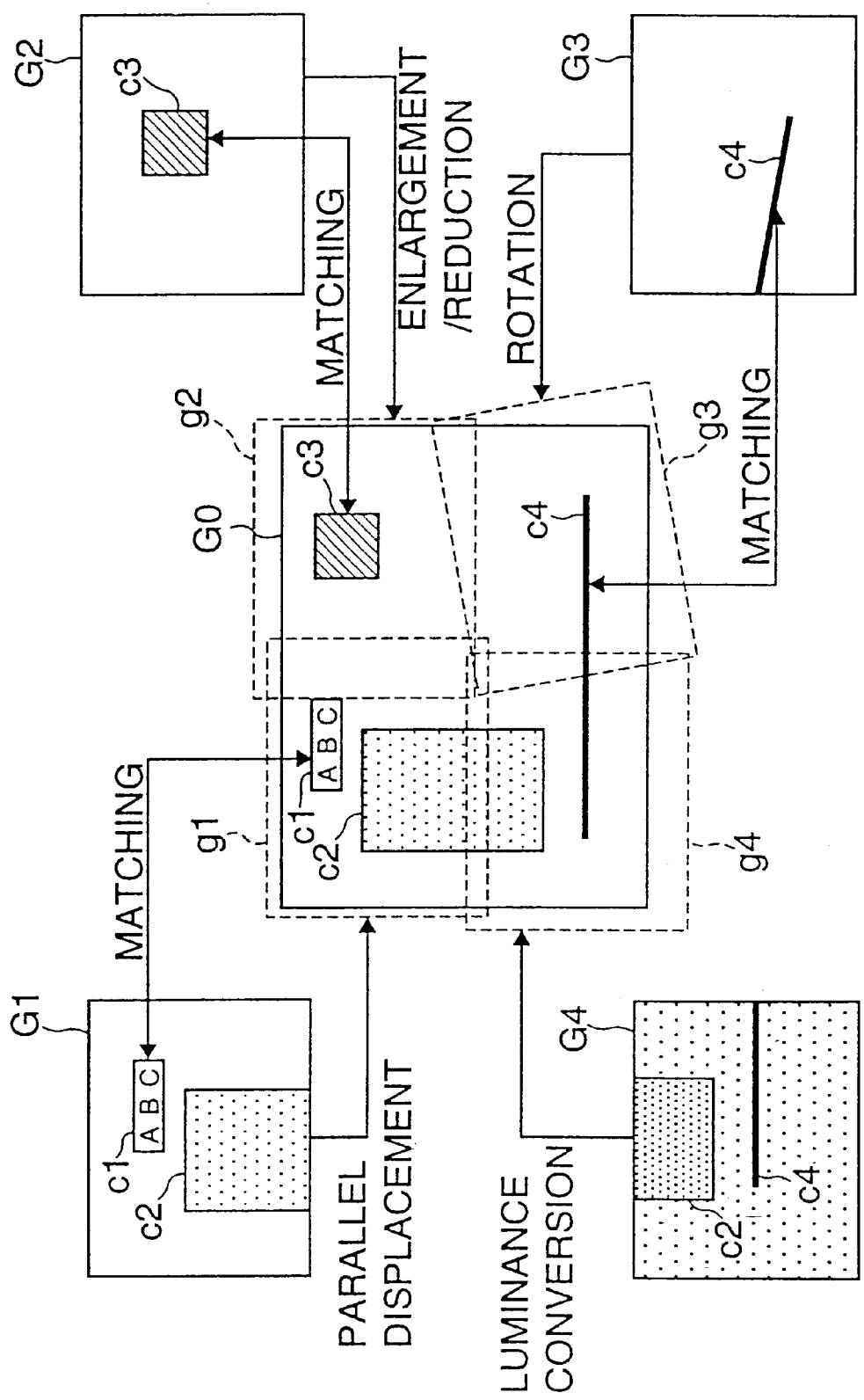
FIG. 41 is a diagram showing a correlation calculation.

In FIG. 41, g1, g2, g3, g4 denote positions where upper left, upper right, lower right and lower left partial images G1, G2, G3, G4 match an enlarged whole image G0 with maximum degrees (i.e., matching positions). For the upper left partial image G1, the matching position g1 is calculated by parallel displacement method using a character sequence "ABC" or a rectangle C as a characteristic point. For the upper right partial image G2, the matching position g2 is calculated by size enlargement/reduction method using a square C3 as a characteristic point. For the upper right partial image G3, the matching position g3 is calculated by rotation method using a bold line C4 or the edge of the bold line C4 as a characteristic point. For the lower left partial image G4, the matching position g4 is calculated by luminance conversion method using a rectangle C2 or a bold line as a characteristic point.

The characteristic point is an image data of an area having a characteristic image information such as a sequence of specific characters, specific line, specific geometric shape (e.g., triangle, circle, ellipse, or the like), or a specific edge portion. The characters or character sequence as a characteristic point are extracted by known character recognition method; the geometric shape as such is extracted by known texture analysis; and the edge portion as such is extracted by known edge detecting method.

The matching degree of the characteristic point is determined using a correlational value of the image data constituting the characteristic point of the enlarged whole image G0 and the image data of the pixel positions of the geometrically transformed partial image G1 to G4 corresponding to the characteristic points, or an absolute value of a sum of the two image data or a square of a difference between the two image data.

Referring back to FIG. 39, the image data is read from the image file of the partial image $G_B$, and correlation between this partial image $G_B$ and the enlarged whole image G' is calculated. Based on this calculation result, the matching position of the partial image $G_B$ with the enlarged whole image G' is calculated (Step #366). The image combination is performed in such a manner that a corresponding section of the partial image $G_B$ is adhered in the calculated matching position of the enlarged whole image G' (Step #368, see FIG. 40(c)). In other words, the image data in this matching position of the enlarged whole image G' is replaced by the image data in a corresponding position of the partial image $G_B$.

Hereafter, the matching positions of the partial images $G_C$, $G_D$ with the enlarged whole image G' are successively calculated by similar method (Steps #370, #374). A combined image G" of high resolution (photographed image of the whole object) is generated by replacing the image data of the enlarged whole image G' in the calculated matching positions by the image data of corresponding sections of the partial images $G_C$, $G_D$ (Steps #372, #376, see FIGS. 40(d), 40(e)).

In this embodiment, the image combination is performed by, after the size of the combined image G" is determined (i.e., the frame of the combined image G") by enlarging the whole image G, adhering the partial images $G_1$ together within the frame. Alternatively, the size of the combined image G" may be determined by deleting an unnecessary peripheral portion (hatched portions of the partial images $G_A$ to $G_D$ in FIG. 40) using the enlarged whole image G' after combining the partial images $G_1$.

According to the former method, unnecessary image data (hatched portions of the partial images $G_A$ to $G_D$ in FIG. 40) located outside the frame of the combined image G" are deleted when the image data are replaced since the whole image G" of high resolution is generated by replacing the image data of the enlarged whole image G' by the image data of the partial images $G_A$ to $G_D$. Thus, the image combination can be more easily performed according to this method than according to the latter method.

Figure 42:
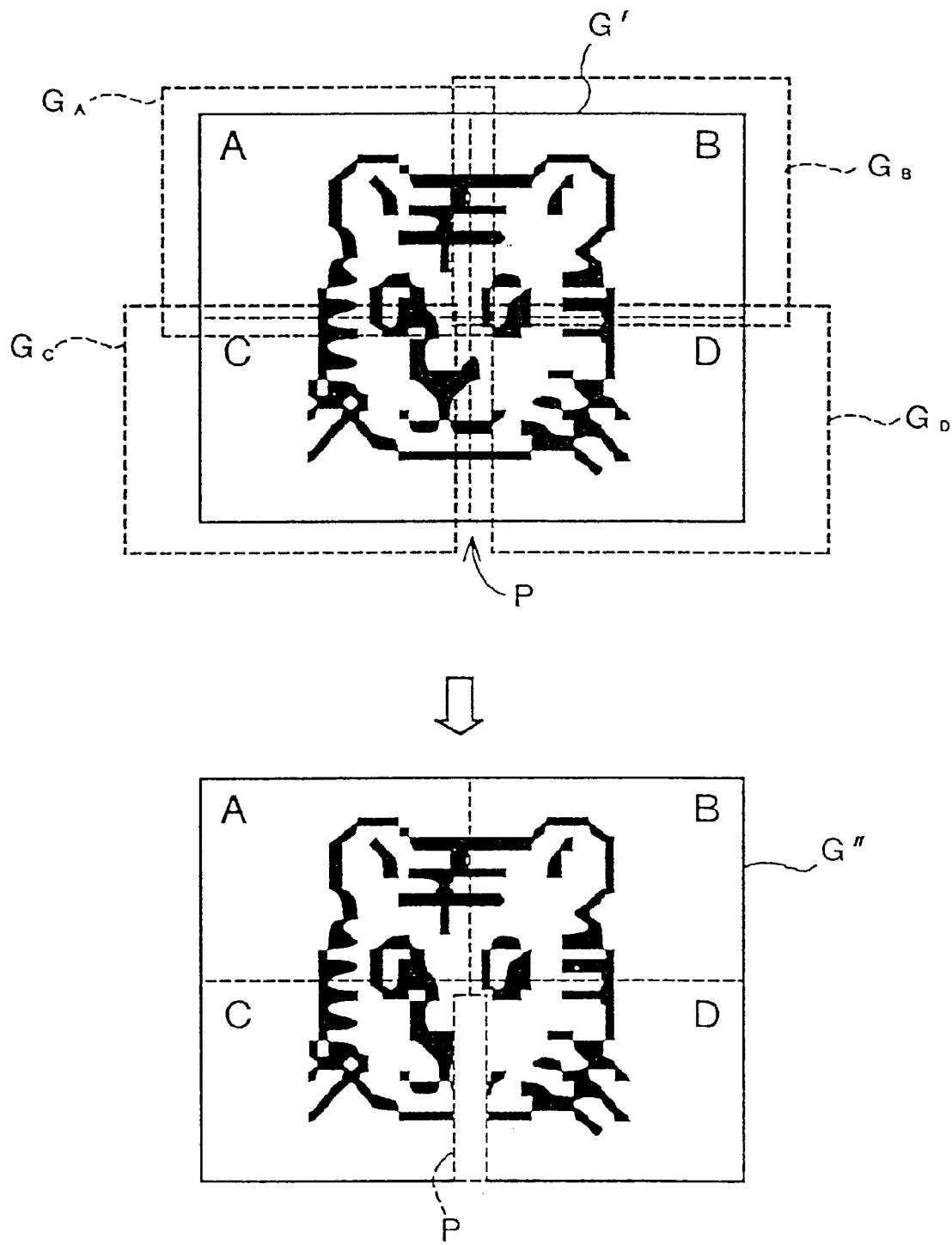
FIG. 42 is a diagram showing a combined image obtained by simply adhering partial images together when there are partial images having no overlapping image sections at a joint area.
Figure 43:
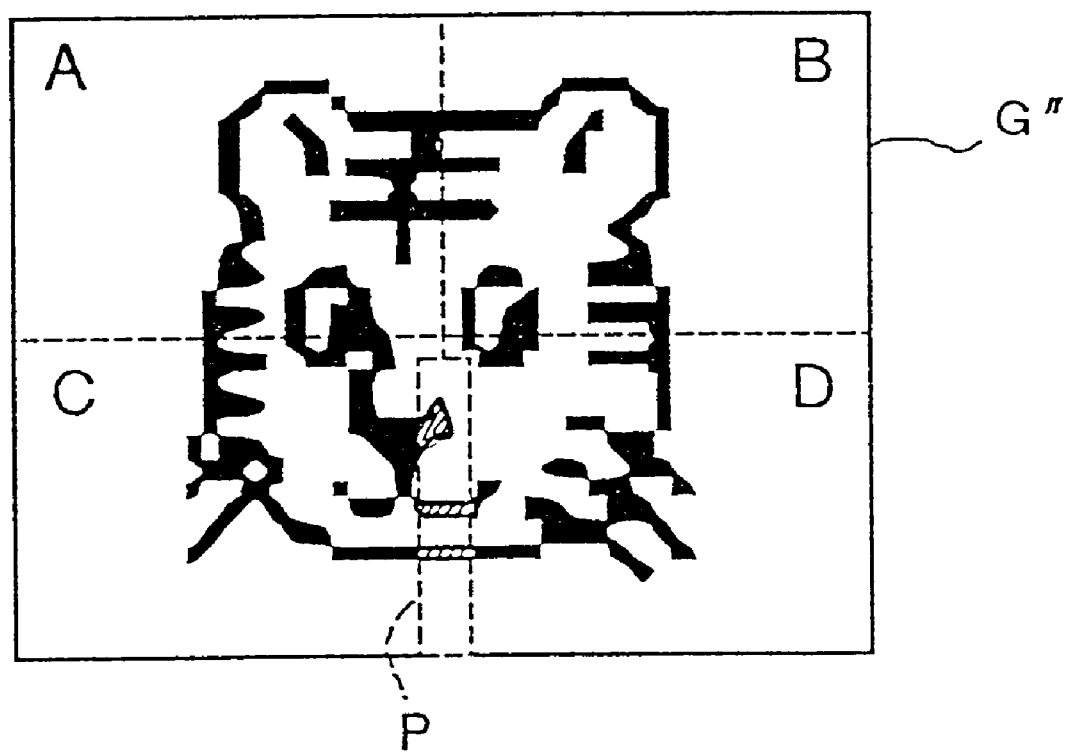
FIG. 43 is a diagram showing a combined image obtained by, when there are partial images having no overlapping image sections at a joint area, replacing a corresponding section of the whole image by a partial image.

Further, if there is a portion P where images are not overlapped at a boundary, for example, between the partial images $G_C$ and $G_D$ as shown in FIG. 42, image data are missing in this boundary portion P and the combined image cannot be actually generated according to the latter method. However, according to the method of this embodiment, the image data in the matching positions of the enlarged whole image G' are replaced by the image data of the partial images $G_A$ to $G_D$ in corresponding positions, and the image data (hatched portion in FIG. 43) of the enlarged whole image G' remain in the boundary portion P of the combined image G" between the partial images $G_C$ and $G_D$ as shown in FIG. 43. Although the boundary portion P has a slightly lower resolution than the remaining part, this method does not experience such an inconvenience that no combined image can be generated due to missing image data.

Some taking lens has such a characteristic that a light amount is less in its middle part than in its peripheral part. If an object is photographed using a taking lens having such a characteristic, the photographed image has lower luminance in its peripheral portion than in its middle portion, i.e., has a large luminance variation as shown in FIG. 44.

Figure 44:
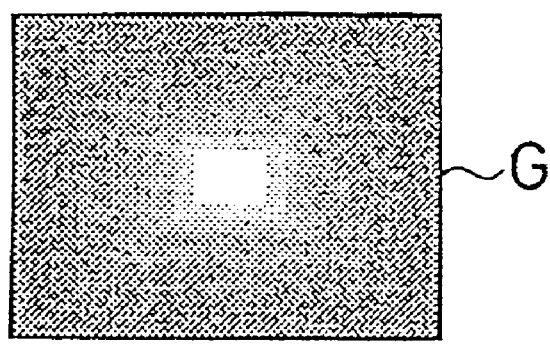
FIG. 44 is a diagram showing a brightness distribution of an image photographed by a taking lens having such a characteristic that a light amount at the peripheral portion thereof is smaller than that at the central portion thereof.
Figure 45:
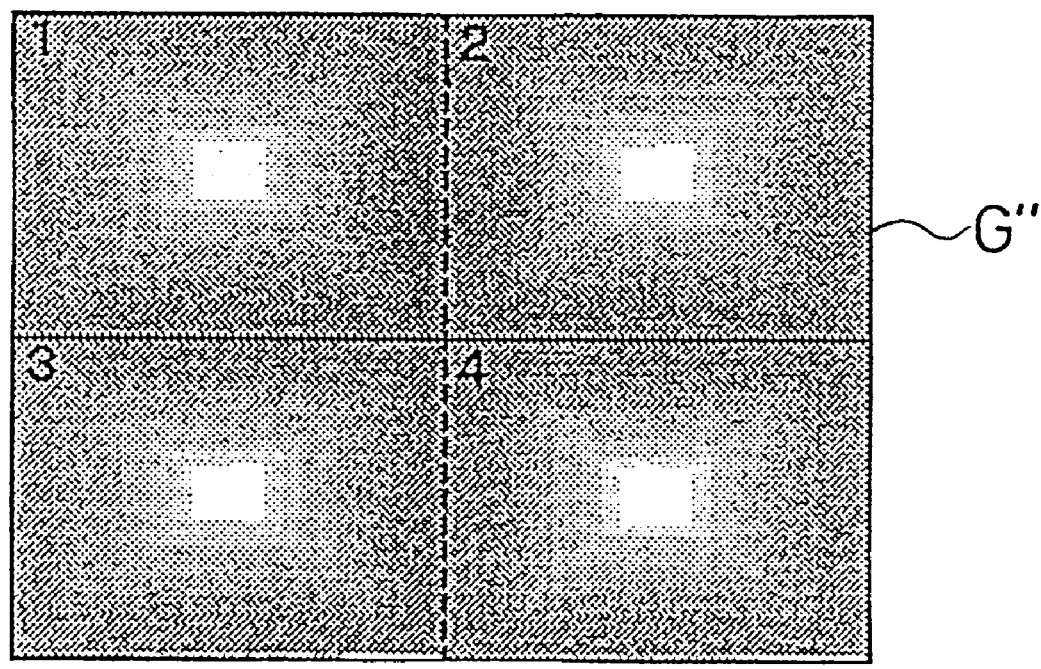
FIG. 45 is a diagram showing a brightness distribution of a a high-resolution image obtained by combining images photographed by a taking lens having such a characteristic that a light amount at the peripheral portion thereof is smaller than that at the central portion thereof.

If photographing is performed in the high-resolution photographing mode, each partial image $G_1$ has a luminance distribution as shown in FIG. 44. A whole image G" of high resolution generated by combining these partial images Gi has such a luminance distribution that bright and dark areas alternately appear in its frame as shown in FIG. 45, and accordingly has an unnatural luminance distribution although having an improved resolution. Thus, image quality is considerably reduced as a whole. Further, if there is a difference in white balance between the partial images Gi, color difference may occur in the boundary portions, thereby reducing image quality.

Since the image deterioration of the photographed image resulting from the light transmitting characteristic of the taking lens becomes more evident by the image combination in the high-resolution photographing mode, it is desirable to suppress the image deterioration by correcting the luminance distribution of the combined image G" to at least equal that of the whole image G. By providing an image correcting device 313 in the controller 31 as shown by phantom line in FIG. 38, the luminance distribution of the image G" combined by the image combining device 312 can be corrected by the image correcting device 313 if necessary.

Figure 46:
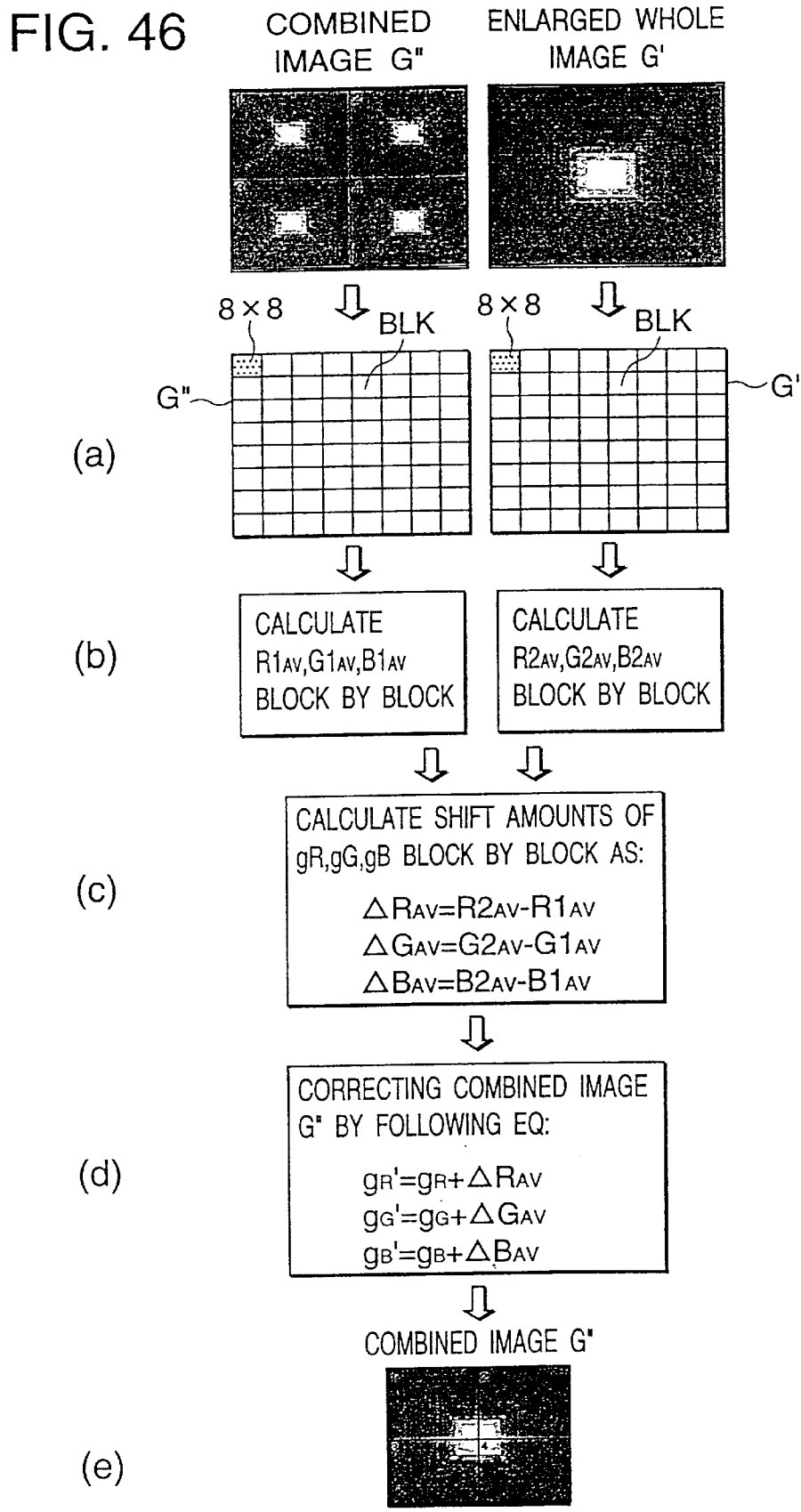
FIG. 46 is a conceptional diagram showing an image correction.

FIG. 46 is a concept diagram showing an image correcting method for suppressing the aforementioned image deterioration.

The image correction is made as follows. First, the enlarged whole image G' and the combined image G" are divided into small blocks BLK of (8×8) pixels (see (a) in FIG. 46), and average values $R1_{AV}$, $G1_{AV}$, $B1_{AV}$, $R2_{AV}$, $G2_{AV}$, $B2_{AV}$ of pixel data $g_R$, $g_G$, $g_B$ are calculated block by block for the respective color components of R, G, B (see (b) in FIG. 46). Subsequently, shift amounts of the image data $g_R$, $g_G$, $g_B$ of the combined image G" are calculated so that the average values become substantially equal to each other between the corresponding blocks BLK of the enlarged whole image G' and the combined image G" (see (c) in FIG. 46). The shift amounts may be differences $\Delta R_{AV}$, $\Delta G_{AV}$, $\Delta B_{AV}$ between the average values of the corresponding blocks BK of the enlarged whole image G' and the combined image G".

Finally, the combined image G" is corrected by adding the shift amounts $\Delta R_{AV}$, $\Delta G_{AV}$, $\Delta B_{AV}$ to the respective pixel data $g_R$, $g_G$, $g_B$ of the combined image G" (see (d) in FIG. 46). By this correction, since the average value of the pixel data of each small block of the combined image G" becomes substantially equal to that of the pixel data of each small block of the enlarged whole image G', the luminance distribution of the combined image G" after the correction approximates to that of the enlarged whole image G' as shown in (e) in FIG. 46.

Although the size of the small blocks BLK is (8×8) pixels in this embodiment, the size and shape thereof can be desirably set. If the size of the small blocks BLK is excessively large, discontinuity of luminance at the boundaries of the blocks BLK becomes evident since differences in the pixel data between individual pixels are not taken account of in the same block BLK. Conversely, if the size of the small blocks BLK is excessively small, the pixel data are largely changed by the image correction when there is a displacement between the enlarged whole image G' and the combined image G", thereby undesirably deteriorating the quality of the combined image G". Therefore, the size and shape of the small blocks BLK may be suitably decided in view of the above problems and the light transmitting characteristic of the taking lens.

Figure 47:
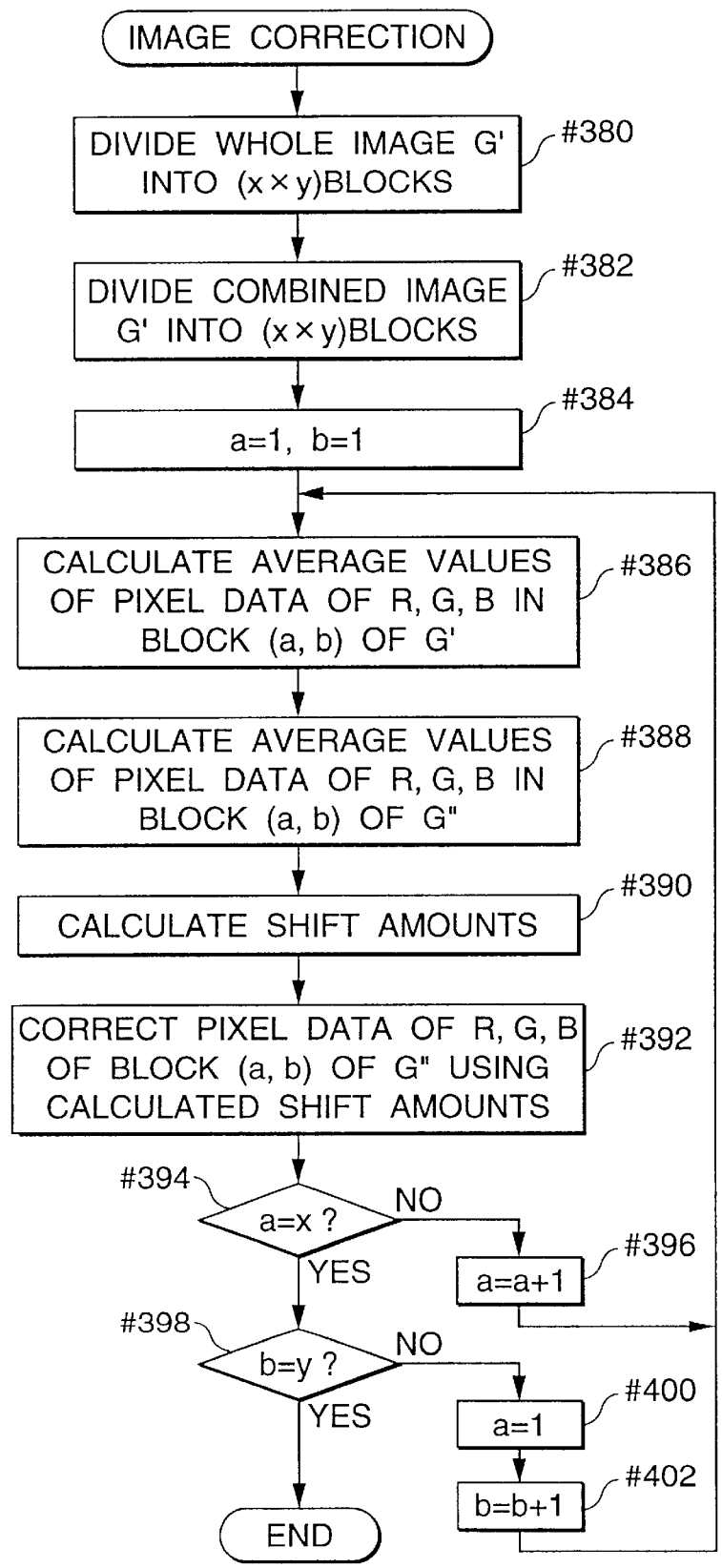
FIG. 47 is a flowchart showing a procedure of the image correction.
Figure 48:
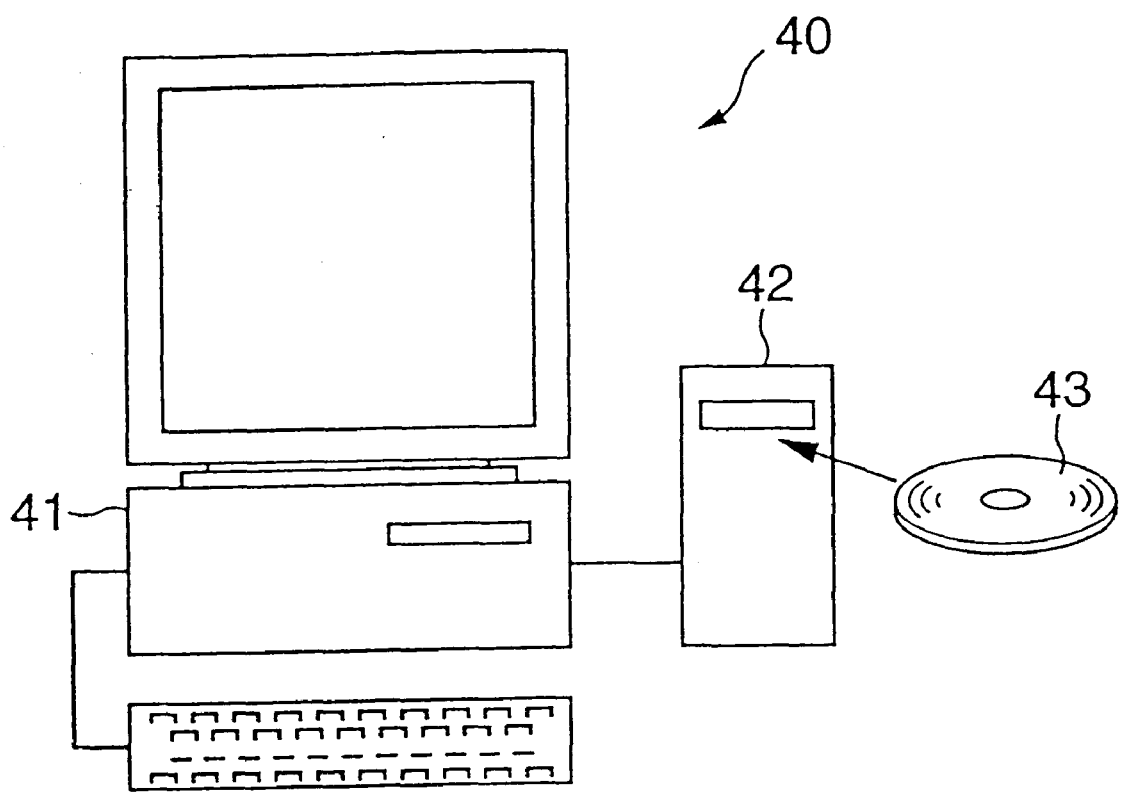
FIG. 48 is a diagram showing an image processing system constructed by a computer system.

Next, a procedure of the image correction performed by the image correcting device 313 is described with reference to a flowchart of FIG. 47.

First, the enlarge whole image G' is divided into (x×y) small blocks BLK (Step #380), and the combined image G" is divided into (x×y) small blocks BLK (Step #382). Then, count values a, b counting a row number x and a column number y of the small blocks BLK are set to "1", respectively (Step #384).

Subsequently, average values $R1_{AV}(1,1)$, $G1_{AV}(1,1)$, $B1_{AV}(1,1)$ of the pixel data $g_1(i=R, G, B)$ included in the small block BLK (1,1) located in the first row, first column of the enlarged whole image G' are calculated for the respective color components R, G, B (Step #386). Similarly, average values $R2_{AV}(1,1)$, $G2_{AV}(1,1)$, $B2_{AV}(1,1)$ of the pixel data $g_i(i=R, G, B)$ included in the small block BLK (1,1) are calculated for the respective color components R, G, B (Step #388). It should be noted that (1,1) denotes the small block in the first row, first column. Hereinafter, (a, b) is affixed to the small block BLK in the a-th row, b-th column.

Subsequently, the shift amounts $\Delta R_{AV}(1,1)$, $\Delta G_{AV}(1,1)$, $\Delta B_{AV}(1,1)$ are calculated using the averages values $R1_{AV}(1, 1)$, $G1_{AV}(1,1)$, $B1_{AV}(1,1)$ and $R2_{AV}(1,1)$, $G2_{AV}(1,1)$, $B2_{AV}(1, 1)$ (Step #390). The shift amounts $\Delta R_{AV}(1,1)$, $\Delta G_{AV}(1,1)$, $\Delta B_{AV}(1,1)$ are calculated, for example, by $\Delta R_{AV}(1,1)=R2_{AV}(1,1)-R1_{AV}(1,1)$, $\Delta G_{AV}(1,1)=G2_{AV}(1,1)-G1_{AV}(1,1)$, $\Delta B_{AV}(1, 1,)=B2_{AV}(1,1)-B1_{AV}(1,1)$, respectively.

Subsequently, the pixel data gi(1,1) of the respective color components of the small block BLK(1,1) of the combined image G" are corrected using the shift amounts $\Delta R_{AV}(1,1)$, $\Delta G_{AV}(1,1)$, $\Delta B_{AV}(1,1)$ (Step #392). Correction data $g_{R'}(a,b)$, $g_{G'}(a,b)$, $g_{B'}(a,b)$ are calculated by $g_{R'}(a,b)=g_R(a,b)+\Delta R_{AV}(a, b)$, $g_{G'}(a,b)=g_G(a,b)+\Delta G_{AV}(a,b)$, $g_{B'}(a,b)=g_B(a,b)+\Delta B_{AV}(a, b)$, respectively.

It is then discriminated whether the count value a has reached the row number x (Step #394). If a<x (NO in Step #394), the count value a is incremented by 1 and this routine returns to Step #386 to perform the aforementioned correction for the small block BLK (a+1, b) located in the (a+1)th row, b-th column. Since a+1=2 at the present stage, this routine returns to Step #386 and the above correction is performed for the small block BLK(2,1) located in the second row, first column. Hereafter, the above correction is successively performed in the same manner for the respective small blocks BLK(a,1)(a=3, 4, . . . x).

Upon completion of the image correction for the small blocks BLK(a,1) in the first column, a=x in Step #394 and this routine proceeds to Step #398 in which it is discriminated whether the count value b has reached the column number y. If b<y (NO in Step #398), this routine returns to Step #386 after setting the count value a to "1" and incrementing the count value b by "1" in order to perform the above correction for the small block BLK (1,b+1) located in the first row, (b+1)th column. Since b+1=2 at the present stage, this routine returns to Step #386 and the above correction is successively performed for the small block BLK(a,2) (a=1, 2, ... x) (loop of Steps #386 to #396).

Hereafter, the above correction is successively performed for the small blocks BLK(a,b) in the respective columns by the same method (loop of Steps #386 to #402). Upon completion of the image correction for all small blocks BLK(a,b)(a=1, 2, ... x; b=1, 2, ... y) (YES in Step #398), this processing is completed.

The special image processing apparatus installed with the image combination program is described in the foregoing embodiment. In an alternative embodiment, the image combination program and the image correction program may be stored in an external storage medium 43 which could be a magnetic storage medium such as a floppy disk or a magnetic tape, or an optical storage medium such as CD-ROM, an optical disk card or a photomagnetic disk, and be transferred to a computer main body 41 via an external storage driving device 42 or via a network such as Internet. In other words, an image processing apparatus 40 may be constructed by a computer system.

As described above, in the electronic camera 1 in which the image pickup unit 22 is rotatable upward, downward, leftward and rightward and the direction of the optical axis of the image pickup unit 22 is made adjustable by the optical axis changing lever 9 (or the optical axis changing buttons 19a to 19d), the image pickup unit 22 is automatically set in its center position when the main switch 21 is turned on. Accordingly, photographing can be immediately performed in the front direction, and the rotation of the image pickup unit 22 according to the operation of the optical axis changing lever 9 (or the optical axis changing buttons 19a to 19d) can be easily and accurately controlled.

Further, when the main switch 21 is turned off, the image pickup unit 22 is rotated to the specified position where the taking lens 231 is not exposed through the opening 5 to close the opening 5 by the unit main body 23 of the image pickup unit 22. Accordingly, the opening 5 can be securely closed without providing a special closing member to reliably prevent the adherence of dirt and smear to the taking lens 231 and the exposure of the image pickup device to light.

As described above, in the inventive electronic camera in which the image pickup unit is rotatable to the position where it faces the opening formed in the front surface of the camera main body to let an object light image in, the optical means of the image pickup unit is exposed through the opening, and the direction of the optical axis thereof is automatically set in the front direction when the state of the camera is changed from the photographing impossible state to the photographing enabled state. Accordingly, even if the camera is in the photographing impossible state with the image pickup unit oriented in a desired direction, photographing can be immediately performed without adjusting the direction of the optical axis of the image pickup unit when the state of the camera is changed to the photographing possible state.

Further, when the state of the camera is changed from the photographing possible state to the photographing impossible state, the optical means of the image pickup unit is set in the position where it is not exposed through the opening to thereby close the opening by the image pickup unit. Accordingly, a mechanism for automatically closing the opening can be simplified and the adherence of dirt and smear to the optical means of the image pickup unit and the exposure of the image pickup device to light can be securely prevented.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An electronic camera comprising:
    a casing formed with an opening;
    an image pickup unit provided in the casing at a position opposite to the opening, the image pickup unit including:
        an image pickup device which converts an optical image of an object into an image signal; and
        an optical system which introduces the optical image onto the image pickup device;
    a rotating mechanism which rotates the image pickup unit;
    a changer which changes over a photographing possible state and a photographing impossible state; and
    a controller which controls the rotating mechanism to rotate the image pickup unit into a target position in response to the changer,
        wherein the controller controls the rotating mechanism to rotate the image pickup unit into a second position where an optical axis of the optical system does not intersect the opening when the changer changes from the photographing possible state to the photographing impossible state.

2. An electronic camera according to claim 1, wherein the controller controls the rotating mechanism to rotate the image pickup unit into a first position where an optical axis of the optical system intersects a plane bearing the opening perpendicularly when the changer changes from the photographing impossible state to the photographing possible state.

3. An electronic camera according to claim 2, wherein the changer includes a switch which switches on and off supply of power to activate and deactivate the camera.

4. An electronic camera according to claim 1, wherein the opening is closed by the image pickup unit when the image pickup unit is in the second position.

5. An electronic camera according to claim 4 wherein the changer includes a switch which switches on and off supply of power to activate and deactivate the camera.

6. An electronic camera according to claim 1, further comprising a designator which designates a photographing direction of the image pickup unit, wherein the controller controls the rotating mechanism to rotate the image pickup unit in accordance with a photographing direction designated by the designator.

* * * * *